(12) United States Patent
VanKirk et al.

(10) Patent No.: US 7,748,615 B2
(45) Date of Patent: Jul. 6, 2010

(54) CHECK ACCEPTING AND CASH DISPENSING AUTOMATED BANKING MACHINE THAT OPERATES RESPONSIVE TO DATA BEARING RECORDS

(75) Inventors: Thomas A. VanKirk, Wooster, OH (US); Jon E. Washington, Clinton, OH (US); Brian Jones, Navarre, OH (US); William D. Beskitt, Canton, OH (US); Harry Thomas Graef, Bolivar, OH (US); David A. Peters, Tallmadge, OH (US); Damon J. Blackford, Akron, OH (US); Dale H. Blackson, Canton, OH (US); Edward L. Laskowski, Seven Hills, OH (US); Songtao Ma, Wadsworth, OH (US); Tim Crews, Alliance, OH (US); Kenneth Turocy, Wadsworth, OH (US); Douglas T. Dominick, North Canton, OH (US); Jason J. Smolk, Fairlawn, OH (US); Brian E. Lucas, Cincinnati, OH (US); Bradley Lightner, Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 6 days.

(21) Appl. No.: 12/291,538

(22) Filed: Nov. 10, 2008

(65) Prior Publication Data
US 2009/0145959 A1 Jun. 11, 2009

Related U.S. Application Data

(60) Continuation of application No. 11/789,936, filed on Apr. 26, 2007, now Pat. No. 7,448,536, which is a division of application No. 11/370,525, filed on Mar. 8, 2006, now Pat. No. 7,213,746.

(60) Provisional application No. 60/659,994, filed on Mar. 9, 2005, provisional application No. 60/660,128, filed on Mar. 9, 2005, provisional application No. 60/677,767, filed on May 3, 2005, provisional application No. 60/677,804, filed on May 3, 2005, provisional application No. 60/677,805, filed on May 3, 2005, provisional application No. 60/677,846, filed on May 3, 2005, provisional application No. 60/677,891, filed on May 4, 2005, provisional application No. 60/678,091, filed on May 4, 2005, provisional application No. 60/678,094, filed on May 4, 2005, provisional application No. 60/678,102, filed on May 4, 2005, provisional application No. 60/678,916, filed on May 6, 2005.

(51) Int. Cl.
*G07F 19/00* (2006.01)
(52) U.S. Cl. .......................... 235/379; 902/13; 902/14; 902/15
(58) Field of Classification Search ................. 235/379; 902/13, 14, 15
See application file for complete search history.

(56) References Cited

U.S. PATENT DOCUMENTS 5,982,918 A * 11/1999 Mennie et al. ............... 382/135

* cited by examiner

*Primary Examiner*—Karl D. Frech
(74) *Attorney, Agent, or Firm*—Ralph E. Jocke; Daniel D. Wasil; Walker & Jocke

(57) ABSTRACT

An automated banking machine system and method includes ATMs which accept checks and dispense cash to users. The ATMs are operated to acquire image and magnetic data from deposited checks to determine the genuineness of checks and the authority of a user to receive cash for such checks. Cash may be dispensed to the user from the ATM in exchange for the deposited check. The ATMs are also operated to read particular data from deposited currency bills in order to determine counterfeit bills. The ATMs dispense cash responsive to communications with a transaction host.

20 Claims, 89 Drawing Sheets

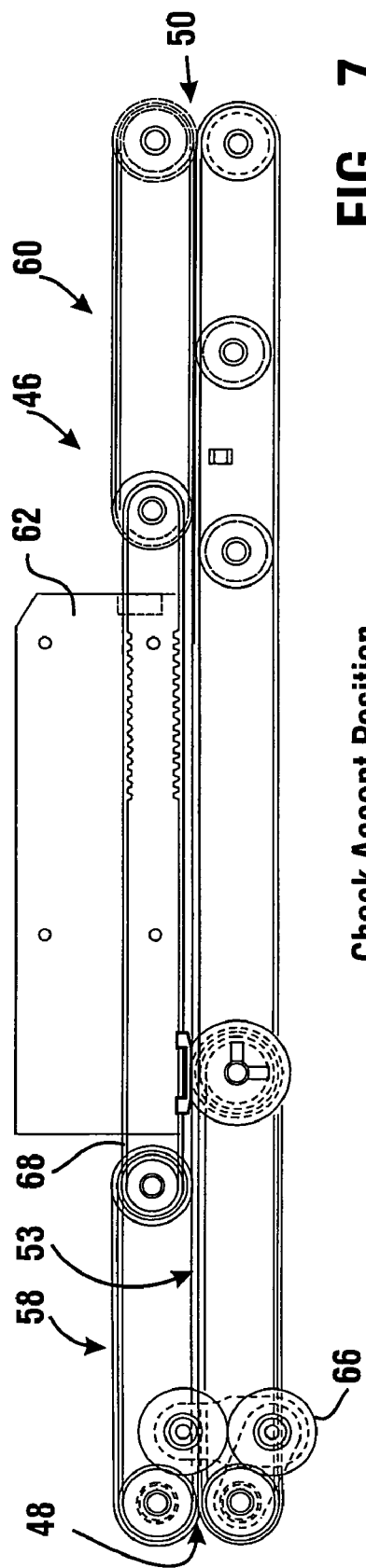
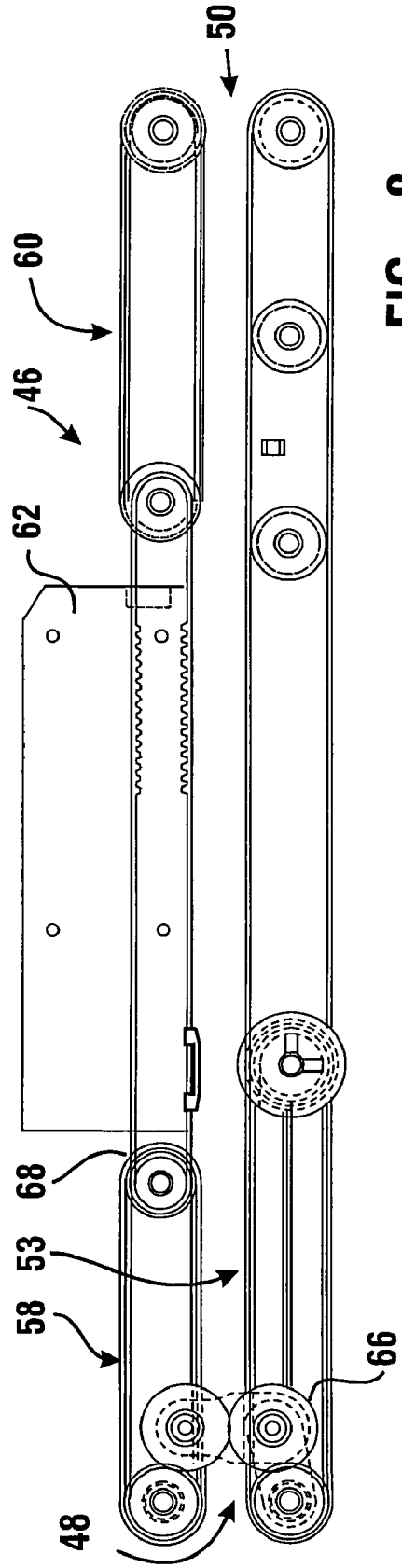

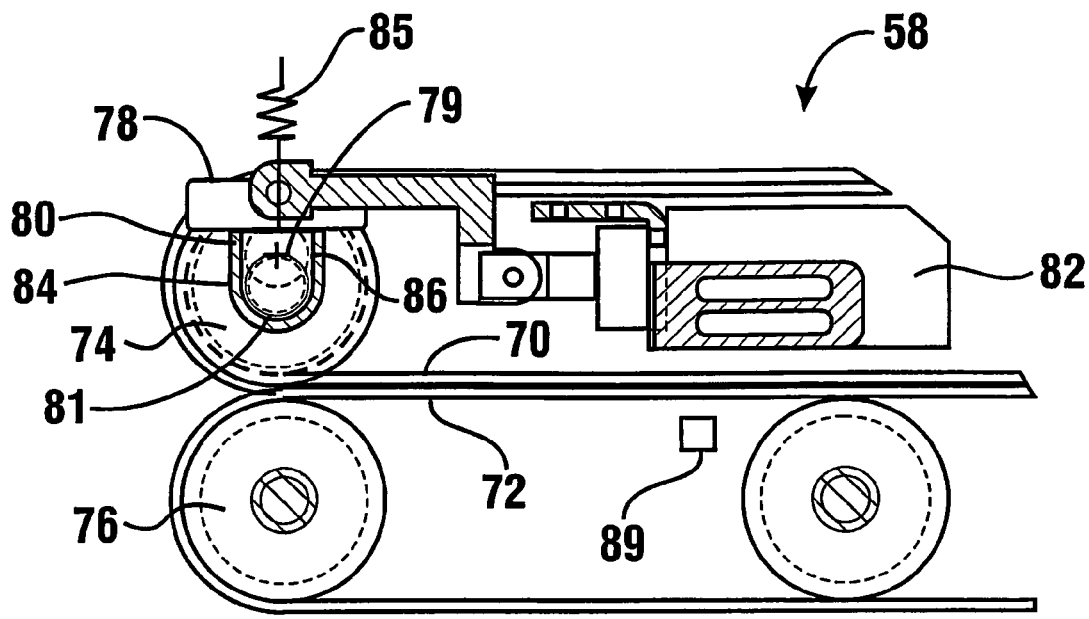
Low Drive Position  FIG. 9
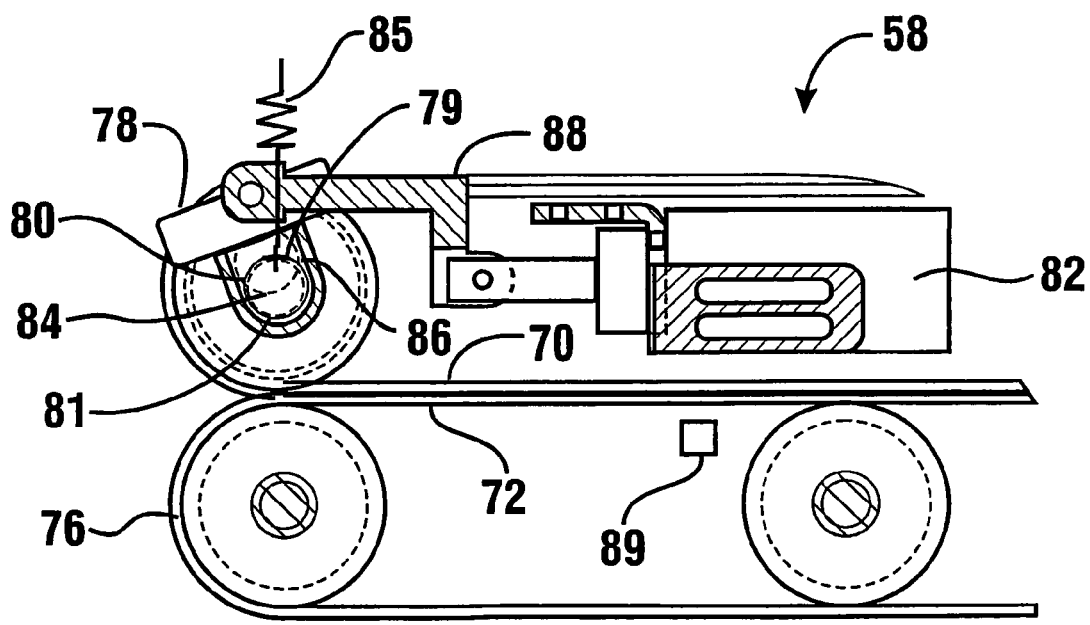
High Drive Position  FIG. 10

Printing Position

Envelope Deposit

1. RECEIVE ID DATA (PAN/PIN:BIOMETRIC)
2. RECEIVE INPUT TXN TYPE (ENVELOPE DEPOSIT)
3. RECEIVE INPUT AMOUNT
4. ⇐ SEND AUTHORIZATION REQUEST TO HOST
5. ⇒ RECEIVE AUTHORIZATION RESPONSE FROM HOST (AUTHORIZED)
6. OPEN DEPOSITORY GATE
7. MOVE ENVELOPE DEPOSITORY TO RECEIVE POSITION
8. RUN TRANSPORT
9. SENSE ENVELOPE
10. MOVE TO PRINT POSITION
11. PRINT IDENTIFYING DATA ON ENVELOPE
12. PRINT TXN RECEIPT
13. PROMPT FURTHER TXN (DECLINE)
14. TXN CLOSE (RETURN CARD)
15. ⇐ SEND COMPLETION TO HOST

FIG. 29

Check - Deposit

1. RECEIVE ID DATA
    (PAN/PIN: BIOMETRIC)

2. RECEIVE TXN TYPE
    (CHECK DEPOSIT: CASH CHECK: OTHER DOCUMENT)

3. RECEIVE INPUT AMOUNT 4. (OPTIONAL) OUTPUT CHECK CASHING FEE ACKNOWLEDGMENT PROMPT - CONTINUE OR CLOSE BASED ON RESPONSE

5. OPEN GATE

6. MOVE DEPOSITORY TO DOCUMENT RECEIVE POSITION

7. RUN TRANSPORT

8. SENSE DOCUMENT

9. MEASURE DOCUMENT LENGTH

10. RUN TO READY TO SCAN POSITION

11. RUN TO SCAN
    (ACQUIRE IMAGE DATA)
    (ACQUIRE MAGNETIC PROFILE DATA)

12. APPLY RULES CONCERNING DOCUMENT TYPE

13. DESKEW IMAGE
    - FIND 3 CORNERS
    - CALCULATE ANGLE - SHIFT IMAGE
    - MOVE TO REFERENCE - SHIFT IMAGE

FIG. 30

| | |
|---|---|
| 14 | APPLY TEMPLATE FOR DOCUMENT TYPE |
| 15 | READ DATA IN MICR LINE<br>(MICR LINE : OPTICALLY READ) |
| 16 | PASS CROPPED DATA FROM MICR LINE WINDOW TO RECOGNITION SOFTWARE<br>(MICR LINE  E - 13B) |
| 17 | RETURN ASC II VALUES |
| 18 | CHECK MICR DATA FOR ROUTING AND TRANSFER VALUES |
| 19 | DETERMINE IF MICR VALUES ARE ABOVE THRESHOLD<br>(IF YES - GO TO 26)<br>(IF NO - GO TO 20) |
| 20 | FLIP IMAGE 180 DEGREES |
| 21 | READ DATA IN MICR LINE |
| 22 | PASS CROPPED DATA FROM MICR LINE TO RECOGNITION SOFTWARE |
| 23 | RETURN ASC II VALUES |
| 24 | CHECK MICR DATA FOR ROUTING AND TRANSFER VALUES |
| 25 | DETERMINE IF MICR VALUES ARE ABOVE THRESHOLD<br>(IF NO - CHECK CANNOT BE READ RETURN CHECK AND CLOSE TXN)<br>(IF YES - GO TO 26) |

FIG. 31

| | | |
|---|---|---|
| | 26 | READ DATA IN COURTESY AMOUNT WINDOW (US CHARACTERS) |
| | 27 | USE LANDMARK RULES TO FIND COURTESY AMOUNT (LOOK FOR BOX, "$", "$\frac{XX}{100}$", "**") |
| | 28 | BINARIZE COURTESY AMOUNT DATA (BLACK/WHITE) |
| | 29 | RETURN ASC II VALUE FOR COURTESY AMOUNT |
| | 30 | CHECK FOR SENSING MAGNETIC INK IN CORRECT LOCATIONS BASED ON DOCUMENT TYPE AND IMAGE DATA (IF NOT PROPER MAGNETIC PROFILE RETURN CHECK AND CLOSE TXN) (IF PROPER MAGNETIC PROFILE - GO TO 31) |
| ⇐ | 31 | SEND AUTHORIZATION MESSAGE TO HOST (INCLUDING CUSTOMER DATA, TXN TYPE, AMOUNT INPUT, MICR LINE AND COURTESY AMOUNT READ) |
| ⇒ | 32 | RECEIVE AUTHORIZATION (AUTHORIZED) |
| | 33 | DISPLAY IMAGE ON ATM DISPLAY |
| | 34 | STORE IMAGE FILE AT ATM |
| | 35 | PRINT CUSTOMER RECEIPT (MAY INCLUDE IMAGE) |
| | 36 | RUN TRANSPORT |

FIG. 32

| | |
|---|---|
| 37 | SENSE CHECK |
| 38 | PRINT CANCELLATION DATA ON CHECK |
| 39 | MOVE CHECK TO DOCUMENT STORAGE |
| 40 | TAMP DOCUMENT STORAGE |
| 41 | IF DEPOSIT ONLY TXN GO TO 45<br>IF CHECK CASHING TXN GO TO 42 |
| 42 | DISPENSE CASH TO CUSTOMER PER AUTHORIZATION |
| 43 | (OPTIONAL) PRINT CUSTOMER VOUCHER FOR UNDISPENSED AMOUNT |
| 44 | PRINT RECEIPT FOR CASH DISPENSE |
| 45 | PROMPT FURTHER TRANSACTION (DECLINES) |
| 46 | TXN CLOSE (RETURN CARD) |
|  47 | SEND COMPLETION TO HOST |

FIG. 33

Terminal Status Info

Check Transactions

Download Files

Upload Maker Authorization Files

Edit Customer Authorization File

Change Password

Customer 000009400 Terminal List

| Terminal ID | Terminal Type | Terminal Location | Terminal Status | Settle Status | Dial-up Terminal |
|---|---|---|---|---|---|
| BG05<br>Status \| Open<br>\| Close | 912 IX ATM | 3800 TABS DRIVE UNIONTOWN OH | OPEN | NO | NO |
| D005<br>Status \| Open<br>\| Close | 912 IX ATM | 5995 MAYFAIR ROAD NORTH CANTON OH | LOADING | NO | NO |
| FT01<br>Status \| Open<br>\| Close | 912 IX ATM | 1075 MAIN STREET - #3 WALTHAM MA | OPEN | YES | NO |
| F000<br>Status \| Open<br>\| Close | 912 IX ATM | 1075 MAIN STREET - #2 WALTHAM MA | OPEN | NO | NO |
| F003<br>Status \| Open<br>\| Close | 912 IX ATM | 1075 MAIN STREET - #1 WALTHAM MA | OPEN | NO | NO |

Start at the Top | Next Terminals

Operation Status　　　Device Statuses　　　Connection Status

Terminal State OPEN　Depository　　IN SERVICE　Session Status ACQUIRED
Settled State　　YES　Card Reader　IN SERVICE　Session Status IN SERVICE
　　　　　　　　　　　Aux. Printer　IN SERVICE
| Open Terminal ▼ |　Receipt Printer IN SERVICE
|　Submit　|　　　　Securamatic　OUT SERVICE Dispenser 1 (A) $1.00　Dispenser 2 (B) $5.00　Dispenser 3 (D) $20.00　Dispenser 4(e) $50.00
　　IN SERVICE　　　　　IN SERVICE　　　　　　IN SERVICE　　　　　　　IN SERVICE Initial Units　　990 Initial Units　　2,998 Initial Units　　20,000 Initial Units　　25,000
Dispensed Units　17 Dispensed Units　　14 Dispensed Units　　0 Dispensed Units　　56

Current Units　　973 Current Units　2,984 Current Units　20,000 Current Units　24,944

Coin 1 (*) $0.00　Coin 2(*) $0.00　Coin 3 (*) $0.00　Coin 4 (*) $0.00
　　OUT SERVICE　　　OUT SERVICE　　　OUT SERVICE　　　OUT SERVICE Initial Units　　0 Initial Units　　0 Initial Units　　0 Initial Units　　0
　　Dispensed Units 0 Dispensed Units　0 Dispensed Units　0 Dispensed Units　0

Current Units　0 Current Units　0 Current Units　0 Current Units　0

Deposits & Payments

7 Deposit Transaction(s) for $2,884.00
0 Payment Transactions(s) for　　$0.00

<u>Next Terminal Status</u>
Check Customer Transactions
at terminal

Return To Terminal Page
<u>Return To Main Page</u>

FIG. 41

Research Customer Transactions

230

Select database to search: Current Business Date
Select Search Type: Transaction Detail

[Process selection] [Clear Selection]

Enter desired search criteria (case sensitive)

Transaction: All Transactions

| | | | |
|---|---|---|---|
| From Business Date (month/day/year) | □/□/2002 | To Business Date (month/day/year) | □/□/2002 |
| From Transaction Date (month/day/year) | □/□/2002 | To Transaction Date (month/day/year) | □/□/2002 |
| From Transaction Time (hours : minutes) | □:□ | To Transaction Time (hours : minutes) | □:□ |
| Transaction Sequence Number | | Terminal ID | |
| Completion Code | All Completion Codes | Customer PAN | |
| Denial Description | All Denials | Denial Code | |
| Amount Requested | | Amount Completed | |

First Sort by: Terminal ID
Second Sort by: Transaction Date
Third Sort by: Transaction Time Return to Main Page

FIG. 42

Customer Transaction Search Results

↙ 232

| TRAN SEQ# | TRAN DATE | TRAN TIME | BUSINESS DATE | COMPLETION CODE | TRAN DESCRIPTION | DENIAL CODE | DENIAL DESCRIPTION |
|---|---|---|---|---|---|---|---|
| 0001 | July 30, 2002 | 9:46 AM | July 30, 2002 | 1 | CHECK CASH | 53 | INV Mix |
| 0002 | July 30, 2002 | 11:30 AM | July 30, 2002 | 0 | ADD NOTE 1 | 00 | |
| 0003 | July 30, 2002 | 11:31 AM | July 30, 2002 | 0 | ADD NOTE 2 | 00 | |
| 0004 | July 30, 2002 | 11:31 AM | July 30, 2002 | 0 | ADD NOTE 3 | 00 | |
| 0005 | July 30, 2002 | 11:31 AM | July 30, 2002 | 0 | ADD NOTE 4 | 00 | |
| 0001 | July 30, 2002 | 9:54 AM | July 30, 2002 | 0 | ADD NOTE 1 | 00 | |
| 0002 | July 30, 2002 | 9:55 AM | July 30, 2002 | 0 | ADD NOTE 2 | 00 | |

| TERM ID | PAN | PRIMARY ACCOUNT | SECONDARY ACCOUNT | AMT REQUEST | AMT COMPLETE |
|---|---|---|---|---|---|
| F000 | 9920020001199 | 0110001389408773702 | 0110001389408773702 | $112.53 | $0.00 |
| F000 | 999999999999999 | | | $2,000.00 | $2,000.00 |
| F000 | 999999999999999 | | | $2,000.00 | $2,000.00 |
| F000 | 9999999999999999 | | | $20,000.00 | $20,000.00 |
| F000 | 9999999999999999 | | | $40,000.00 | $40,000.00 |
| F003 | 9999999999999999 | | | $2,000.00 | $2,000.00 |
| F003 | 9999999999999999 | | | $5,000.00 | $5,000.00 |

| FEE REQUEST | FEE COMPLETE |
|---|---|
| $0.00 | $0.00 |
| $0.00 | $0.00 |
| $0.00 | $0.00 |
| $0.00 | $0.00 |
| $0.00 | $0.00 |
| $0.00 | $0.00 |
| $0.00 | $0.00 |

FIG. 43

RETURN TO MAIN PAGE

Download Transaction Files

Available Transaction Files

Available Daily Report Files

Available Monthly Report Files

RETURN TO MAIN PAGE

REPORTS

← 236

ATM DAILY TRANSACTION SUMMARY

ATM MONTHLY TRANSACTION SUMMARY

CHECKS BY MAKER - DAILY

CHECKS BY MAKER - MONTHLY

CHECK CASHING SUMMARY - DAILY

CHECK CASHING SUMMARY - MONTHLY

CHECK CASHING BY ATM - DAILY

CHECK CASHING BY ATM - MONTHLY

ATM BALANCE REPORT

FIG. 45

Upload Authorization File

To verify the file that was just uploaded please press the button below.
ADD - BANK ACCOUNT . TXT

| Verify Authorization File |

The verification process could take a couple of minutes or more depending on the size of the upload file.

Authorization File Conversion

| 0 | Checking Accounts |
| 0 | Saving Accounts |
| 0 | Credit Accounts |
| 9 | Other Accounts |
| 0 | Cards |

9 Total Records to be Applied

File has been verified

To apply the file to HOST please press the button below.

| Apply Authorization File to HOST |

Maker Account Records

| Field | Content |
|---|---|
| Bin No. | Institution I.D. No. |
| Command Type | Change File<br>Delete File<br>Add New File |
| Account Type | Checking<br>Savings<br>Other |
| Account No. | Numerical Value |
| Account Status | Open<br>Closed |
| Account Description | Text Description |
| Days Locked Out | Minimum Time Between Transactions |
| Maximum Check Amount | Maximum Amount of Check Cashed |

FIG. 48

Authorization File Conversion

File has been Applied

Messages returned from the Apply Process

Apply authorization file for customer 992002 - Started May 30, 2002 1:41:40 PM

Total Records Submitted = 8
Total Records Applied = 8
Total Errors = 0

Apply authorization file for customer 992002 - Ended May 30, 2002 1:41:44 PM

Upload Another File

242

Return to Main Page

FIG. 49

Edit Customer Records

Check Cashing
Card Number

[          ]

[ Get Customer Information ]

[ Add Customer ] [ Delete Customer ]

Customer Authorization Information

USER CARD Number 9920020000199

Account Code [Normal ▼]   Account Status [Active ▼]

Customer Information

First Name [John]   Last Name [Doe]

Social Security # [ ]-[ ]-[ ]

Account Limits

Max Check Amount [$0.00]

Last Account Activity

Cash Check   $277.91   on Friday July 26, 2002

This customer can cash 1 check every 1 Day(s).
Next available date: Saturday, July 27, 2002

Maker / Employer's Account   Account Status
[0119006520111794124 ▼]   Open

Account Description   Lock Out Days   Max Check Amount
[Test Account 4]   [1]   [$2,000.00]

[ Save Customer Information ]
[Delete Customer] [ Cancel Edit]

Check Customer's Transaction History

Return To Customer Authorization
Main Page

246   Return to Main Page

FIG. 51

Transaction History

Card Number 9920020000199

Friday, July 26, 2002 4:09:02 PM EDT
Terminal                            BG05 Transaction Sequence #           0007
Original Amount              $277.91 Actual Amount                  $277.91
Account Number: 0119006520111794124   MICR Account    0119006520111794124
Transaction Description            CHECK CASH
Denial Description             WITHDRAWAL LIMIT REACHED
Friday, July 26, 2002 4:08:05 PM EDT
Terminal                            BG05 Transaction Sequence #           0006
Original Amount              $277.91 Actual Amount                  $277.91
Account Number: 0119006520111794124   MICR Account    0119006520111794124

<u>OTHER TRANSACTIONS</u>
<u>RETURN TO MAIN PAGE</u>

| Description | Denial Code | Receipt Verbiage | Explanation |
|---|---|---|---|
| Lock out days prohibit another check to be cashed | E6 | WAIT PERIOD NOT OVER | Each employer (Maker) is assigned a number of days which must expire between any two checks cashed by any of its employees. The day changes at midnight. So as an example, if a card holder cashes a check at 11:00am on Monday and his employer's wait period is two days, the system will not allow the card holder to cash a check until Wednesday, beginning at 12:01pm |
| Second transaction without enrollment | E7 | ENROLLMENT NOT COMPLETE | When a card is issued, information is gathered to enroll the cardholder. Then, during enrollment. the card is activated. If the enrollment is not performed or not yet complete, the cardholder may still cash one, and only one check. If a second check is attempted, the transaction will be denied until the account is manually activated. |
| Card not on File | 21 | INELIGIBLE CARD | All user cards have been defined to the system, and bank will authorize batches of cards to be loaded into the DTS database. If bank issues a card that has not been loaded into the database, or if an issued card is deleted from the database, this denial would occur. |
| Maker account closed | E8 | CANNOT CASH THIS CHECK | On occasion, bank system administrators may suspend check cashing for a particular employer (check Maker). If a cardholder linked to this employer attempts to cash a check, they will receive their check back with this message on the receipt. |
| Check amount exceeds authorized amount | EA | CHECK AMOUNT TOO LARGE | For each employer, a maximum dollar amount is assigned that limits the value of individual checks that can be cashed. In some cases, individual cardholders may have a maximum amount assigned, with a higher or lower amount. Checks with amounts in excess of these amounts will be denied with this description. |

| | | | |
|---|---|---|---|
| Maker account not in file | EB | EMPLOYER ACCOUNT NOT FOUND | This condition would occur if a user tries to cash a check from an employer that is not in the database. This would only happen if, during first use and before enrollment, the user tries to cash a check written by an non-authorized employer, or if bank deletes the employer account. |
| Wrong maker on check | EC | INVALID EMPLOYER CHECK | Each cardholder is assigned to only one, employer (Maker). If the card holder attempts to cash a check from any other source, she will receive her check with this denial message. |
| Fault during transaction, or cash available does not permit cashing | 5D, 09, 1A, 91, 92, 93 | TEMPORARILY UNABLE | Occasionally, equipment faults occur during a transaction. If this happens, the transaction will not be completed. |
| Non-valid MICR information | 52 | COULD NOT READ CHECK INFO | MICR information sent to the network was not valid. This would normally result from a mis-read of the check. |
| Hot Card | 0B | UNAUTHORIZED USE | Bank may determine that certain cards should no longer be allowed to be used, and that if attempted to be used should be retained. To do this, such as in the case of a lost or stolen card, the card record will be marked as "HOT", and if someone uses the card, enters the proper PIN and attempts to cash a check, the check will be returned and the card retained. |
| Cannot mix the requested amount or cannot round | 24, 95 | CANNOT DISPENSE REQUESTED AMT. | When some currency canisters or coin are out of money, the CCM cannot dispense the check amount with the remaining canisters. The check is returned, with this message. |
| Three bad PINs | 0C | INVALID PIN ENTERED | Cardholders are allowed three incorrect PIN entries. On the third wrong entry, the CCM displays this message and retains the card. |
| No maker assigned to the card | E5 | NO ACCOUNT SPECIFIED | No maker is assigned to the card holder. This would only occur if the enrollment is incomplete. |
| MICR amount encoded on check | 54 | CK AMT NOT EQ ENTER AMT | Normally, checks cashed in the system will not have the amount of the check encoded on the MICR line of the check. If the amount is encoded, and the OCR amount is not correct, or if the cardholder changes the amount within the qualifying "window" and it is different from the MICR amount, this denial will appear |

FIG. 59

| Card de-activated by administrator (or never activated) | E9 | CARD NOT ACTIVE | For various reasons, bank may suspend, or deactivate, individual cardholders. Attempts to cash checks by suspended cardholders will result in the check being returned with this denial message. |
|---|---|---|---|

FIG. 60

| Field Name | Field Type (Max Length) | Description |
|---|---|---|
| Pseudo Number | VARCHAR (6) | DTS Pseudo Number |
| Customer Number | VARCHAR (10) | DTS Customer Number |
| Host Business Date | VARCHAR (6) | Host Business Date associated with the ATM |
| Host Transaction Sequence# | VARCHAR (4) | Sequence number assigned by the DTS host to uniquely identify the transaction |
| Host Terminal ID | VARCHAR (4) | DTS Host Terminal ID |

| Field Name | Field Type (Max Length) | Description |
|---|---|---|
| Header Length | NUMERIC (3) | Length of the supplied Header Information. The header Information are fields:<br>● Header Length<br>● Pseudo Number<br>● Customer Number<br>● Business Date<br>● Transaction Seq. #<br>● Terminal ID<br>● Front Image Length<br>● Back Image Length |
| Pseudo Number | VARCHAR (6) | DTS Pseudo Number |
| Customer Number | VARCHAR (10) | DTS Customer Number |
| Host Terminal ID | VARCHAR (4) | DTS Host Terminal ID |
| Host Transaction Sequence# | VARCHAR (4) | Sequence number assigned by the DTS host to uniquely identify the transaction |
| Host Business Date | VARCHAR (6) | Host Business Date associated with the ATM |
| Check MICR Data | VARCHAR (30) | MICR data scanned from the inserted check |
| Check Front Length | NUMERIC (7) | Length of the scanned check image (Front Side) |
| Check Back Length | NUMERIC (7) | Length of the scanned check image (Back Side) |
| Image Data | BLOB (5 meg) | Actual check images |

Customer Transaction Search Results

| CHECK IMAGE | TRAN SEQ# | TRAN DATE | TRAN TIME | BUSINESS DATE | COMPLETION CODE | TRAN DESCRIPTION | DENIAL CODE | DENIAL DESCRIPTION |
|---|---|---|---|---|---|---|---|---|
| | 0003 | December 11, 2003 | 1:56 PM | December 9, 2003 | 1 | W/D DDA | 92 | DISFACT |
| | 0005 | December 11, 2003 | 4:01 PM | December 9, 2003 | 3 | W/D DDA | 6C | BAD PIN |
| | 0006 | December 11, 2003 | 4:01 PM | December 9, 2003 | 3 | W/D DDA | 6C | BAD PIN |
| | 0007 | December 11, 2003 | 4:01 PM | December 9, 2003 | 3 | W/D DDA | 13 | RETRYPIN |
| | 0008 | December 11, 2003 | 4:02 PM | December 9, 2003 | 3 | W/D Dda | 00 | BAD PIN |
| | 0001 | December 11, 2003 | 3:31 PM | December 9, 2003 | 0 | DEP DDA | 00 | |
| | 0002 | December 11, 2003 | 9:17 AM | December 9, 2003 | 0 | DEP DDA | 00 | |
| | 0003 | December 11, 2003 | 9:20 AM | December 9, 2003 | 0 | DEP SAV | 00 | |
| | 0004 | December 11, 2003 | 9:22 AM | December 9, 2003 | 0 | DEP SAV | 00 | |
| | 0005 | December 11, 2003 | 9:23 AM | December 9, 2003 | 0 | DEP DDA | 00 | |
| | 0006 | December 11, 2003 | 9:24 AM | December 9, 2003 | 0 | DEP SAV | 00 | |
| | 0007 | December 11, 2003 | 9:31 AM | December 9, 2003 | 0 | DEP DDA | 00 | |

| TERM ID | PAN | PRIMARY ACCOUNT | SECONDARY ACCOUNT | ATM REQUEST | ATM COMPLETE | FEE REQUEST | FEE COMPLETE |
|---|---|---|---|---|---|---|---|
| D031 | 9933333381000805 | | | $20.00 | $0.00 | $0.00 | $0.00 |
| D031 | 9933333381000805 | | | $20.00 | $0.00 | $0.00 | $0.00 |
| D031 | 9933333381000805 | | | $20.00 | $0.00 | $0.00 | $0.00 |
| D031 | 9933333381000805 | | | $20.00 | $0.00 | $0.00 | $0.00 |
| D031 | 9933333381000805 | | | $20.00 | $0.00 | $0.00 | $0.00 |
| SHW1 | 06331 | | | $25.00 | $25.00 | $0.00 | $0.00 |
| SHW1 | 06331 | | | $20.00 | $20.00 | $0.00 | $0.00 |
| SHW1 | 06331 | | | $40.00 | $40.00 | $0.00 | $0.00 |
| SHW1 | 06331 | | | $25.00 | $25.00 | $0.00 | $0.00 |
| SHW1 | 06331 | | | $15.00 | $15.00 | $0.00 | $0.00 |
| SHW1 | 06331 | | | $60.00 | $60.00 | $0.00 | $0.00 |
| SHW1 | 06331 | | | $40.00 | $40.00 | $0.00 | $0.00 |

Example Express Deposit transaction file

DIEBOLD — We won't rest

| ATM # | Card Number | Transaction # | Date | Document sequence number | MICR line | Amount | MagMap | Image file |
|---|---|---|---|---|---|---|---|---|
| 3899 | 1122334 | 3487 | 21-Jan-04 | 1 | T87654321T 087654321 1002 | 47.19 | Good | 3487-001.tif |
| | | 3487 | 21-Jan-04 | 2 | T87654321T 087654321 1003 | 103.14 | Good | 3487-002.tif |
| | | 3487 | 21-Jan-04 | 3 | T87654321T 087654321 1004 | 10.23 | Good | 3487-003.tif |
| | | 3487 | 21-Jan-04 | 4 | T87654321T 087654321 1005 | 57.00 | Good | 3487-004.tif |
| | | 3487 | 21-Jan-04 | 5 | T87654321T 087654321 1006 | 65.69 | Good | 3487-005.tif |
| | | 3487 | 21-Jan-04 | 6 | T87654321T 087654321 1007 | 18.87 | Good | 3487-006.tif |
| | | | 21-Jan-04 | | Total | 362.12 | | |
| | 5549007 | 3575 | 21-Jan-04 | 1 | T87654321T 087654321 1002 | 10.14 | Good | 3575-001.tif |
| | | 3575 | 21-Jan-04 | 2 | No MICR found | 0.00 | Bad | 3575-002.tif |
| | | | 21-Jan-04 | | Total | 10.14 | | |

FIG. 71

Deposit with Acme Bank
ATM NO. 1234
April 27, 2004; 22:18 hours ET
Acct. No. ****78901

*Tim Crews*

FIG. 76

DEPOSITED WITH ACME BANK
ATM NO. 1234
APRIL 27, 2004; 22:18 HOURS ET
ACCT NO. ****78901

```
         62374    DIEBOLD                                              11101
                  5995 Mayfair Rd.
                  North Canton, Ohio 44720                          18-4321/8766

DATE  April 7, 2004

PAY
  TO THE
  ORDER OF   Tim Crews                                    $   54.37

Fifty Four and              37/100   DOLLARS    NOT NEGOTIABLE
                                                              SAMPLE - VOID
              EXCHANGE CITY BANK                              DO NOT CASH!
              EXCHANGE CITY, USA 12345
                                                        Robert J. Warren
                                                        ─────────────────
                                                             TREASURER

⑈011101⑈  ⑆8765432⑆2⑆8762132 1⑈
```

446

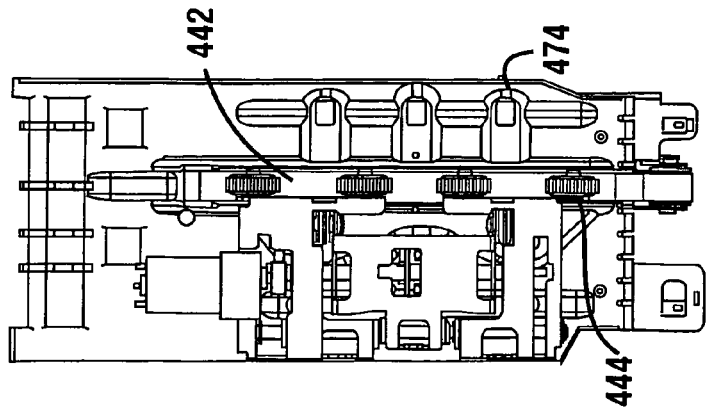
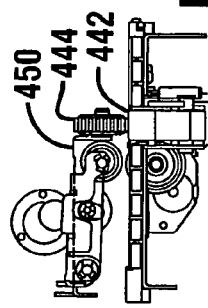
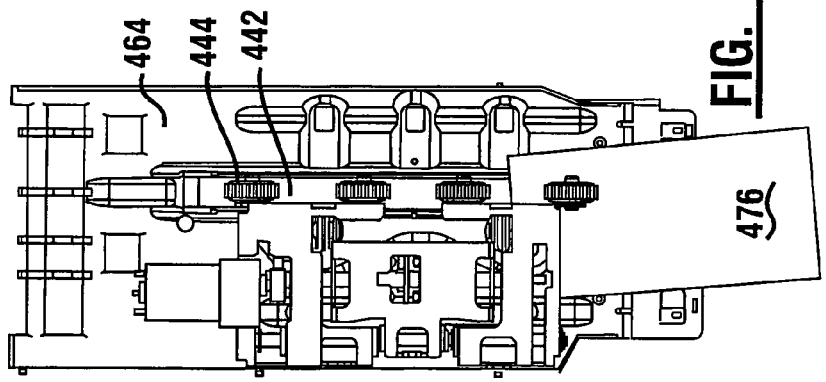
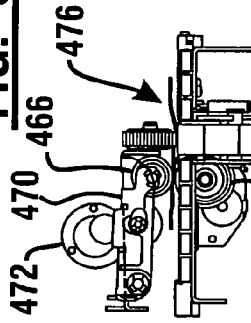
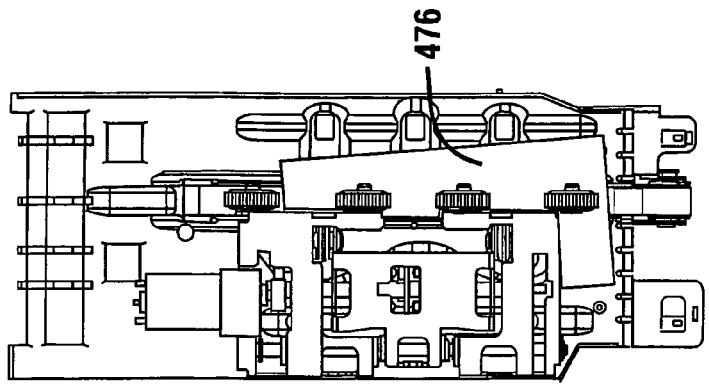
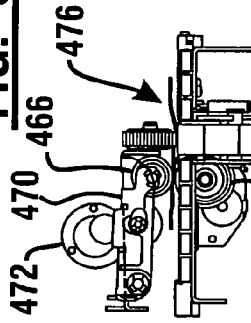

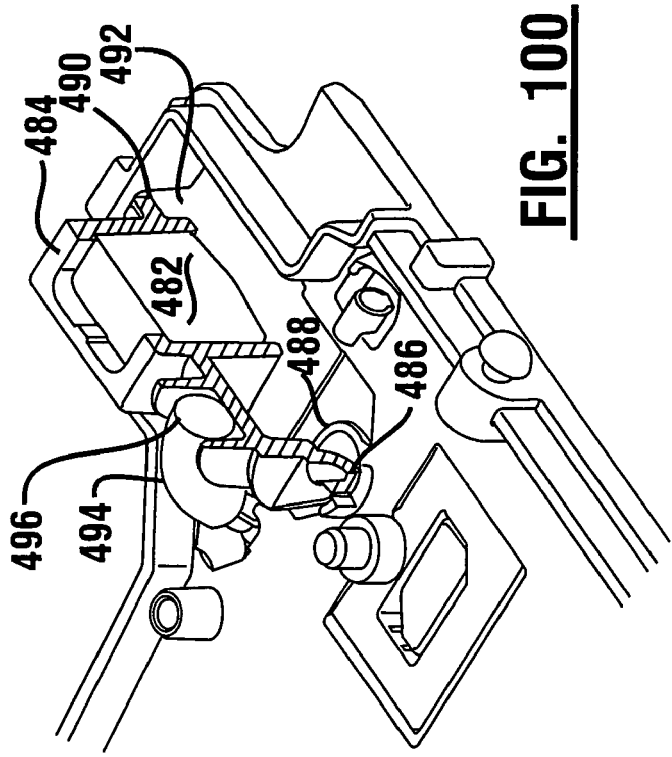
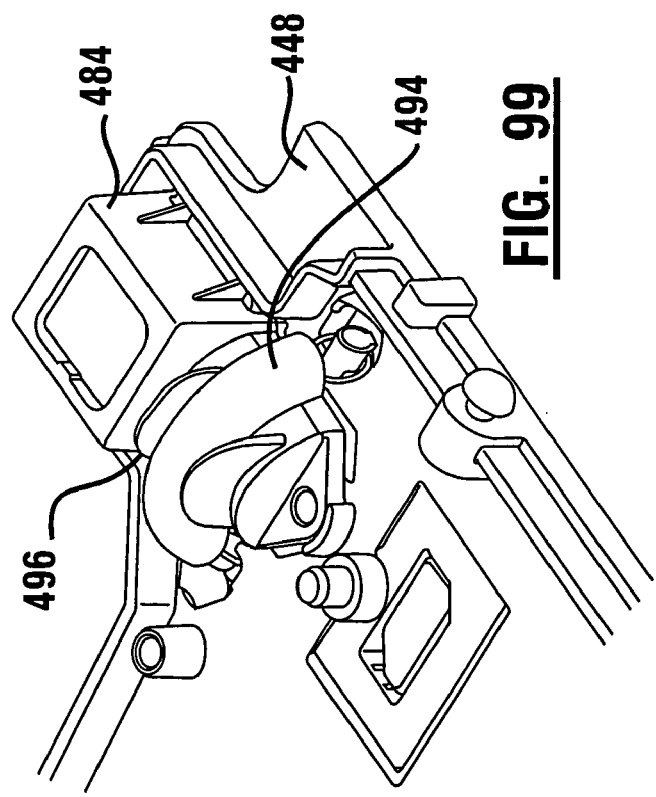
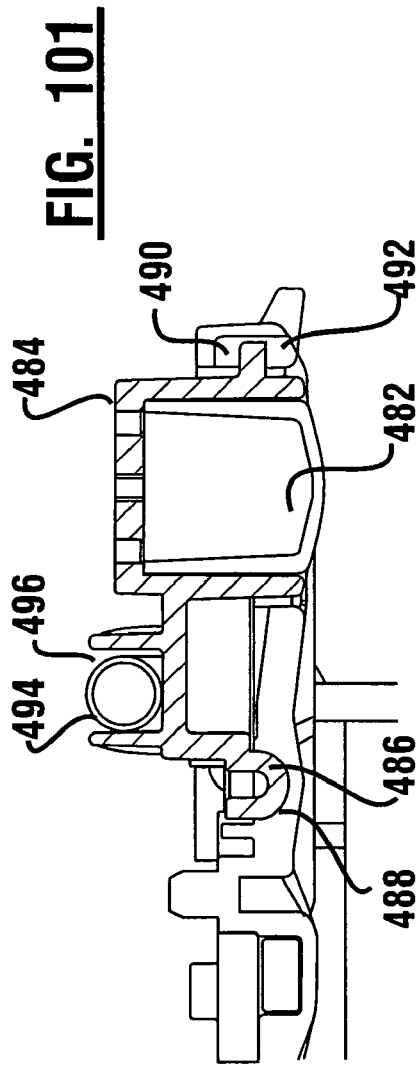
FIG. 100
FIG. 101
FIG. 99

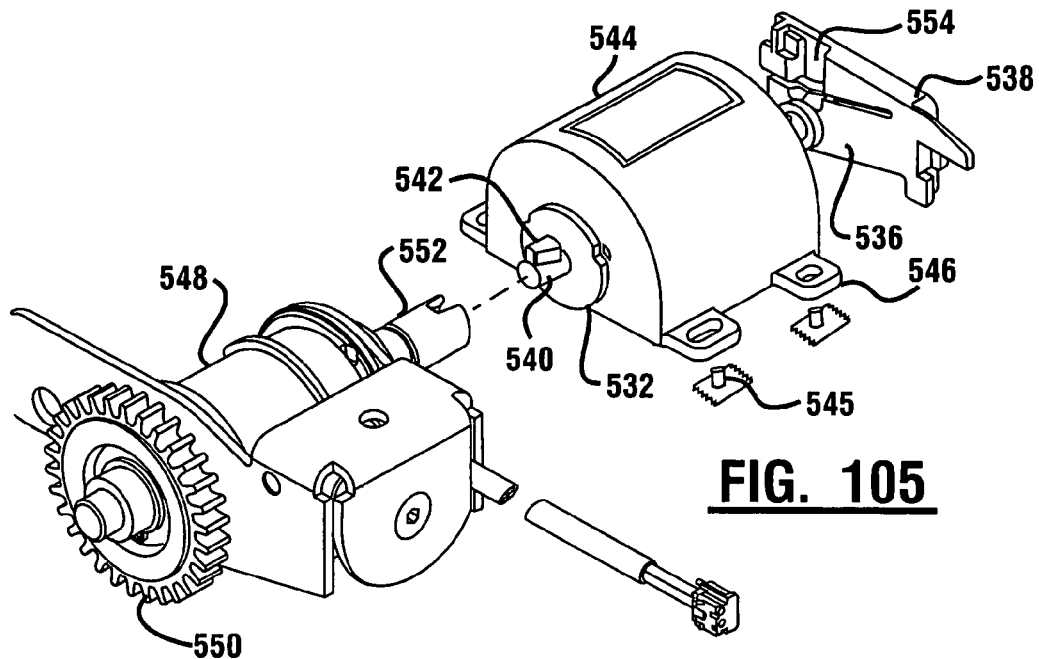
FIG. 105
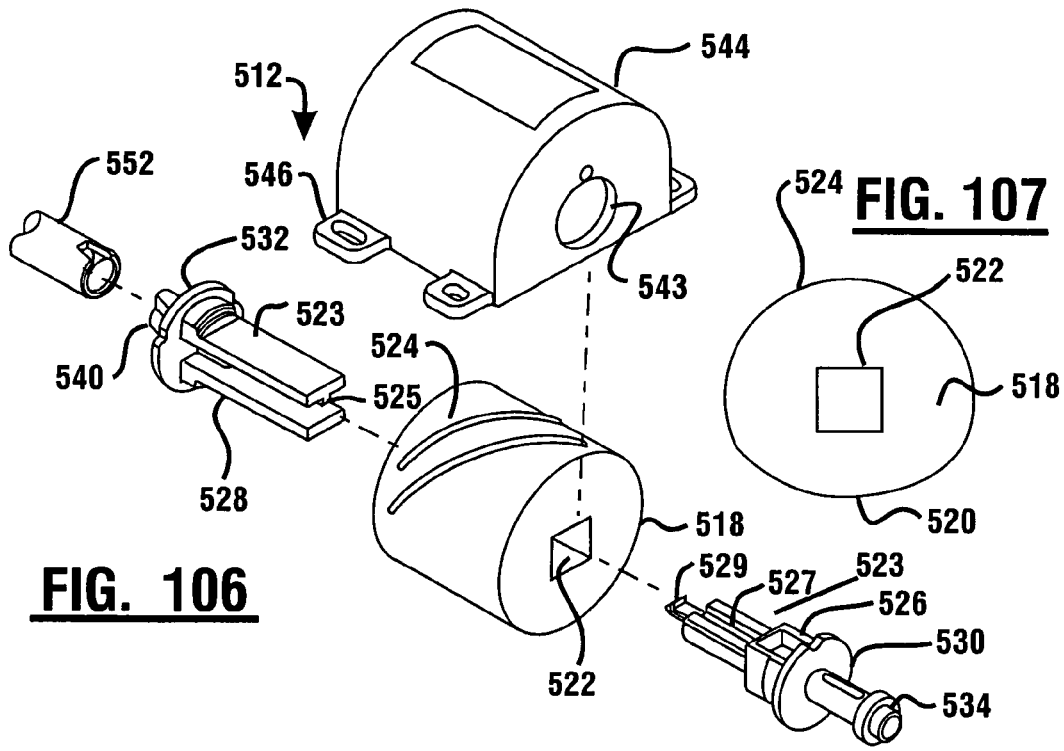
FIG. 106
FIG. 107

CHECK ACCEPTING AND CASH DISPENSING AUTOMATED BANKING MACHINE THAT OPERATES RESPONSIVE TO DATA BEARING RECORDS

CROSS REFERENCE TO RELATED APPLICATIONS

This application is a continuation of U.S. application Ser. No. 11/789,936 filed Apr. 26, 2007, which is a divisional of U.S. application Ser. No. 11/370,525 filed Mar. 8, 2006, which claims benefit pursuant to 35 U.S.C. §119(e) of each of U.S. Provisional Applications: 60/659,994 filed Mar. 9, 2005; 60/660,128 filed Mar. 9, 2005; 60/677,767 filed May 3, 2005; 60/677,804 filed May 3, 2005; 60/677,805 filed May 3, 2005; 60/677,846 filed May 3, 2005; 60/677,891 filed May 4, 2005; 60/678,091 filed May 4, 2005; 60/678,094 filed May 4, 2005; 60/678,102 filed May 4, 2005; and 60/678,916 filed May 6, 2005. The disclosures of each of the aforementioned applications are herein incorporated by reference.

TECHNICAL FIELD

This invention relates to automated banking machines. Specifically this invention relates to devices and systems which may receive deposits of individual sheets such as checks and/or other instruments, into an automated banking machine.

BACKGROUND OF INVENTION

Automated banking machines are known in the prior art. Automated banking machines are commonly used to carry out transactions such as dispensing cash, checking account balances, paying bills and/or receiving deposits from users. Other types of automated banking machines may be used to purchase tickets, to issue coupons, to present checks, to print scrip and/or to carry out other functions either for a consumer or a service provider. For purposes of this description any device which is used for carrying out transactions involving transfers of value shall be referred to as an automated banking machine.

Automated banking machines often have the capability of accepting deposits from users. Such deposits may include items such as envelopes containing checks, credit slips, currency, coin or other items of value. Mechanisms have been developed for receiving such items from the user and transporting them into a secure compartment within the banking machine. Periodically a service provider may access the interior of the machine and remove the deposited items. The content and/or value of the deposited items are verified so that a credit may be properly applied to an account of the user or other entity on whose behalf the deposit has been made. Such depositories often include printing devices which are capable of printing identifying information on the deposited item. This identifying information enables the source of the item to be tracked and credit for the item correlated with the proper account after the item is removed from the machine.

Many automated banking machines accept deposits from users in envelopes. Because the contents of the envelope are not verified at the time of deposit, the user's account generally is not credited for the deposit until the envelope is retrieved from the machine and the contents thereof verified. Often this must be done by persons who work for a financial institution. Delays in crediting a user's account may be experienced due to delays in removing deposits from machines, as well as the time it takes to review deposited items and enter appropriate credits. If the deposited items include instruments such as checks, further delays may be experienced. This is because after the instruments are removed from the machine they must be presented for payment to the appropriate institution. If the instrument is not honored or invalid the depositing customer's account cannot be credited for the deposit. Alternatively in situations where a credit has been made for a deposited instrument that is subsequently dishonored, the user's account must be charged the amount of the credit previously given. In addition the user commonly incurs a "bad check" fee due to the cost associated with the institution having to handle a dishonored deposit. All of these complications may result in delays and inconvenience to the user.

Another risk associated with conventional depositories in automated banking machines is that deposited items may be misappropriated. Because deposited checks and other instruments are not cancelled at the time of receipt by the automated banking machine, they may be stolen from the machine and cashed by unauthorized persons. Criminals may attempt to break into the machine to obtain the items that have been stored in the depository. Alternatively persons responsible for transporting items from the machine or persons responsible for verifying the items may misappropriate deposited instruments and currency. Alternatively the handling required for transporting and verifying the contents of deposits may result in deposited instruments being lost. Such circumstances can result in the user not receiving proper credit for deposited items.

To reduce many of the drawbacks associated with conventional depositories which receive deposits in the form of envelopes or other items, automated devices that can read and cancel deposited instruments have been developed. Examples of such devices are shown in U.S. Pat. Nos. 5,540,425 and 6,554,185 which are owned by the Assignee of the present invention. Such devices are capable of reading the coding on checks or other deposited items. For example bank checks include magnetic ink coding commonly referred to as "micr." The micr coding on a check can be used to identify the institution upon which the check is drawn. The coding also identifies the account number of the user and the check number. This coding commonly appears in one or several areas on the instrument. Reading this coding in the automated banking machine enables the machine operator to determine the source of checks or other instruments that have been presented.

Imaging devices may also be used in processing instruments. Such imaging devices may be used to produce data corresponding to an image of the item that has been deposited. This image may be reviewed to determine the nature of the deposited item, and along with the information that can be obtained from the coding on the instrument allows processing of the credit to the user much more readily. Automated instrument processing systems also may provide the capability of printing an indication that the check or other instrument has been deposited and cancelled after it has been received. This reduces the risk that the instrument will subsequently be misappropriated and cashed by unauthorized persons.

While automated deposit accepting and processing devices provide many advantages and benefits, existing devices may also have drawbacks. One drawback is that instruments must often be precisely aligned for purposes of reading micr coding or other indicia which is included on the instrument. This commonly requires special mechanisms to precisely position and align the instrument with the reading devices included in the device. Sometimes this requires aligning the check against a stop, which may crease or tear the check. A further drawback associated with some existing devices is that they are required to turn and reorient the deposited instrument. The mechanisms for doing this can be complex. Such complex mechanisms may encounter reliability problems due to the precise tolerances that must be maintained. Further difficulty is added by the fact that instruments that are received may be creased, torn or soiled. Handling such items may be difficult. Instruments becoming jammed in such mechanisms may result in costly repairs and downtime.

A further drawback associated with some imaging systems in automated banking machines is that it is not practical to transmit an image of a deposited instrument for review and analysis at the time it is received. This is because the time and bandwidth necessary to capture and transmit an image of the deposited instrument may be longer than desirable. Extended transaction times may discourage the use of the machine. A further drawback is that even when images may be transmitted sufficiently quickly, the operator of the system is required to invest in the resources necessary to analyze the transmitted image and make a determination as to whether the deposited item should be accepted as valid or not. Such capabilities may include employees who must review the image and determine whether the item is genuine by comparison to data or other information such as examples of the customer's signature. Alternatively automated systems may be provided for analyzing the image of the instrument or the data printed or typed thereon. Providing such capabilities may be costly for the systems operator. Advances in photocopy technology also may make it difficult for operators of such systems to distinguish between genuine items and reproductions. As a result even with carefully operated and administered systems there is a risk that deposited items which are not genuine may be accepted.

Certain standardized techniques have been developed for automated banking machine systems. The electronic message flows and formats commonly used for ATMs for example do not include the capability of transmitting a document image as part of the standard message which requests that a deposit transaction be authorized. As a result it has been difficult to achieve real time check verification and cashing in widely distributed systems. Further, in some systems it is difficult to readily correlate an image file with the particular transaction with which the image file is associated.

There may also be concerns in some systems with regard to the integrity of system data. For example there are risks that electronic image data representative of check images may be modified in order to carry out fraudulent activities. Also in some situations it may be desirable to mark on a check that has been presented with permanent markings to reduce the risk that the check can be improperly renegotiated. However, such markings may render it impossible to prove the character of the original check as it was received.

A further drawback associated with some automated banking machine systems is that they cannot be used by individuals who do not have bank accounts. Generally automated banking machines require that deposited items be credited to a user's existing account with a financial institution. The user generally has to wait several days before the deposited item is verified and credited to the account. If the user does not have sufficient funds in the account to make a withdrawal, the user must generally wait for the verification process to be completed before the money may be withdrawn. This makes the use of automated banking machines generally unsuitable for persons who do not have bank accounts and/or cannot wait several days for deposited items to be verified and credited to their account.

A further drawback associated with some existing automated banking machine systems is that some operators of such systems may wish to retain the capability to accept deposits in the form of items such as envelopes as well as checks and other instruments. Providing two separate depositories may add considerable cost and complexity to the machine. While mechanisms which can accept both single sheet-like instruments as well as envelopes have been developed, such mechanisms are often complex and unreliable. The capability of accepting both types of deposits is difficult to achieve because deposited instruments and envelopes may have varying thicknesses. The thickness of deposited envelopes may also be nonuniform. This is particularly true when such deposited envelopes may include items such as folded sheets or coin. Such combined depositories may also suffer from having lower security capabilities than mechanisms which are designed to accept only one type of deposit.

There is also often a desire to accept other types of documents in automated banking machines. Such documents may include for example utility bills or other items or instruments associated with value, or a particular account with which the customer may associate value or a particular payment. Such instruments may have thicknesses and properties which correspond to neither conventional checks or deposit envelopes. In addition the two-dimensional size of such items may also vary. This presents challenges for reliably handling such items. It may also be desirable in some circumstances to be able to image items and instruments which are associated with a customer. For example in some circumstances it may be desirable to receive a customer's driver's license, social security card, immigration card or other document to verify the identity of the user. In some cases it may be desirable to receive documents such as checks and currency bills and to process them using a common mechanism. Current depository mechanisms often do not have the capability of reliably handling or imaging such items.

Thus there exists a need for a deposit accepting apparatus and system for use in connection with automated banking machines that has the capability of handling and imaging more types of items, which may do so more reliably and which can be used in connection with more types of transactions and systems.

OBJECTS OF EXEMPLARY EMBODIMENTS

It is an object of an exemplary embodiment of the present invention to provide an automated banking machine.

It is a further object of an exemplary embodiment of the present invention to provide an automated banking machine system and method that accepts deposits and provides cash to a user.

It is a further object of an exemplary embodiment of the present invention to provide a deposit accepting apparatus.

It is a further object of an exemplary embodiment of the present invention to provide a deposit accepting apparatus for use in connection with an automated banking machine.

It is a further object of an exemplary embodiment of the present invention to provide a deposit accepting apparatus which can be used to accept, image and verify the authenticity of items.

It is a further object of an exemplary embodiment of the present invention to provide a deposit accepting apparatus that accepts both sheets and envelopes.

It is a further object of an exemplary embodiment of the present invention to provide a deposit accepting apparatus that can be used in existing automated banking machine systems.

It is a further object of an exemplary embodiment of the present invention to provide a deposit accepting apparatus that has greater reliability.

It is a further object of an exemplary embodiment of the present invention to provide a deposit accepting apparatus that is more compact.

It is a further object of an exemplary embodiment of the present invention to provide methods of accepting deposited items.

It is a further object of an exemplary embodiment of the present invention to provide a method for verifying the authenticity of deposited items.

It is a further object of an exemplary embodiment of the present invention to provide a method for handling and storing deposited items.

It is a further object of an exemplary embodiment of the present invention to provide a method for expediting the receipt of checks in an automated banking machine.

It is a further object of an exemplary embodiment of the present invention to provide methods for changing and modifying image data corresponding to checks received in an automated banking machine.

It is a further object of an exemplary embodiment of the present invention to provide an apparatus and method for correlating image and transaction data to facilitate check processing.

Further objects of exemplary embodiments of the present invention will be made apparent in the following Best Modes For Carrying Out Invention and the appended claims.

The foregoing objects are accomplished in an exemplary embodiment by a deposit accepting apparatus and method used in connection with an automated banking machine. A first exemplary deposit accepting apparatus includes a transport section. The transport section includes a transport which accepts items of variable thickness. Such items may include relatively thin single sheet-like items and relatively thick irregular shaped items such as deposit envelopes. The transport section includes a biasing mechanism for reliably engaging deposited items with moving mechanisms such as belts or rollers in the transport section. The deposited items are reliably engaged with such moving members to assure that the deposited item is moved through the transport section.

The exemplary transport section further includes a variable force driving section. The variable force driving section engages deposited items. The variable force driving section enables limited slip engagement with a deposited item as it is being accepted into the transport section. This enables a user presenting a document to avoid damaging or tearing a document if they fail to release it when it is first engaged by the variable force transport section. Once a document or other deposited item is sensed as having been moved sufficiently into the transport, the apparatus operates to cause the variable force transport section to engage the item more positively and in a nonslip fashion for purposes of moving it in the transport. In embodiments of the invention an aligning device may work in conjunction with the variable slip drive to aid in aligning documents with a transport path.

The exemplary transport section further includes an analysis module adjacent thereto. In the exemplary embodiment the analysis module serves as an imaging device and is operative to analyze documents passing through the transport section. In the exemplary embodiment the analysis module is operative to enable the generation of image data representative of an image of the document. In addition the analysis module is operative to sense for features and characteristics of the document which may be used to identify the document type. Alternatively or in addition the analysis module may operate to sense properties of a deposited document which distinguish acceptable or genuine documents from unacceptable documents.

In the exemplary embodiment the transport section of the deposit accepting apparatus is connected to a deposit holding module. The deposit holding module includes at least two compartments therein. In the exemplary embodiment the deposit holding module operates to move the compartments relative to the transport section and to selectively place an outlet from the transport section in communication with a desired one of the compartments. For example when an envelope type deposit is accepted in the transport section, the deposit holding module operates so that the envelope is moved through the transport and deposited into a compartment which is adapted for holding envelopes. Alternatively when a check or other sheet-like deposit is moved through the transport section, the deposit holding module operates so that the sheet moves from the transport section into a compartment which is designated for holding the particular type of sheet.

In an exemplary embodiment described herein, a deposit accepting apparatus and method is used in connection with an ATM. The ATM includes one or more computers therein (alternatively referred to herein as processors) which operate to control the transaction function devices within the ATM including aspects of the deposit accepting apparatus. When a customer at the ATM wishes to deposit an envelope or similar deposit containing item in the machine, the controller enables the customer to place the deposited envelope in the machine so that it may engage the transport section. The computer also operates so that the deposit holding module places the compartment for holding deposited envelopes in communication with the transport section. The user is enabled to engage the deposit envelope with the variable force driving section which the computer causes to operate in a limited slip mode. Once the computer senses that the deposit envelope has been moved into the transport section the variable force driving section may be controlled so that the envelope is more positively engaged with the moving members in the transport. The deposit envelope is then moved through the transport past the analysis module.

In the exemplary embodiment as the deposit envelope passes through the transport section the computer causes a printing mechanism to print identifying information on the envelope. The exemplary embodiment includes a printing mechanism which senses that the envelope has moved into proximity with the printing mechanism. In response to sensing this condition the computer causes the printing mechanism to move relative to the envelope so that printing may be reliably conducted thereon. The movement of the printing mechanism provides greater assurance that the envelope will not catch on or be damaged by the printer mechanism. Once printing has been conducted, the computer causes the printing mechanism to be returned to a standby condition.

Upon passing through the transport section the deposited envelope passes into the designated compartment. The entrance to the designated compartment is aligned with the outlet from the transport section through operation of the deposit holding module. Once the deposited envelope has passed into the compartment within the module it is held therein until accessed by authorized personnel. Suitable locking mechanisms and security procedures are provided so that only authorized personnel are enabled to access the deposit. The identifying information that is printed on the envelope enables the association of the deposited items with the particular customer or user of the automated banking machine.

In the exemplary embodiment when the user wishes to deposit an instrument such as a check, the automated banking machine operates to verify the authenticity of the check and to read data therefrom. In response to the user first providing appropriate identifying inputs and information, the computer in the ATM operates to enable a deposited item to engage the transport section of the apparatus. The computer operates such that the deposited item is initially engaged in a limited slip manner by the variable force driving section and once sensed as substantially within the transport, operates to move the check in a generally nonslip manner.

The deposited item is moved in the transport section in the exemplary embodiment in a first direction past sensors which enable the computer to determine its length. Once the length of the deposited item is determined by moving it in the first direction, movement of the deposited item is stopped and the item is transported in an opposed direction past the analysis module. In the exemplary embodiment movement of the check past the analysis module enables the collection of data to provide an image of the check as well as the sensing of magnetic properties in areas thereof. The first exemplary embodiment does not require that the deposited check be perfectly aligned in the transport section for reading the check.

In an exemplary embodiment the computer operates responsive to inputs provided by the customer or responsive to other actions to recall from memory data representative of a template which shows the layout of information included on the particular type of item being deposited. The computer operates to adjust the image data gathered from the deposited item and to place it in correspondence with the template. Characters are then analyzed from at least one selected area of the image in accordance with the template to determine if such characters can be accurately identified. If the computer determines that these particular characters cannot be accurately identified the image data is then moved relative to a template and further attempts are made to determine if data from the area of the template can be recognized. In the exemplary embodiment the data corresponding to the image of the check may be moved 180° relative to the first attempt. In this way if the check is deposited in for example, a face up orientation, either of two possible orientations for the check may be quickly analyzed. Of course alternative approaches may be used and if after a set number of attempts it is determined that the data from a particular area of the check cannot be analyzed with a sufficient degree of assurance, further attempts may be discontinued and the deposited item returned to the customer.

Once data from at least one area of the deposited item is determined with a sufficient level of assurance, data from at least one other area of the item as determined by the template may be analyzed. In the case of a check the ATM is operative to determine the amount of the check as written in the courtesy amount area. The computer operates to analyze the characters and determine if the amount can be determined with a sufficient level of assurance. In the exemplary embodiment the computer operates to locate and identify the courtesy amount using certain landmark rules which identify the landscape and layout of the courtesy amount area. If the computer decides that the characters in the courtesy amount area may be determined with a sufficient level of assurance, further processing of the check is enabled to be conducted. In the alternative if the amount cannot be read with a sufficient level of assurance, the deposited check may be returned to the customer.

In the exemplary embodiment the computer operates to analyze the characters in the micr line on the check as well as the courtesy amount. This data provides both the data sufficient to identify the institution on which the check is drawn as well as the account number of the entity on whose account the check is drawn. The micr line also includes data representative of the check number and other information. The courtesy amount which is analyzed in the exemplary embodiment indicates the amount of the check which has been presented. This information is often sufficient for a financial institution or other entity operating the automated banking machine to charge the appropriate entity for the amount of the check presented. In alternative embodiments the computer may operate to analyze characters located in the area of the check in which the legal amount is written. The amount determined as the legal amount of the check may then be compared to the courtesy amount for purposes of determining whether both amounts have been read properly. Alternatively or in addition, the micr line on the check may include amount data in the case of some checks. In these cases the computer may operate to conduct additional comparisons between the analyzed amounts to verify that the amounts correspond and therefore have been read accurately, or to determine discrepancies that may indicate that a check has been tampered with or other conditions that may suggest that it is not advisable for the machine to accept such a check.

In the exemplary embodiment the depository apparatus is also operative to sense for the presence of magnetic coding in appropriate locations on the check. For example the computer is operative to verify that the ink in the area which has been identified as including the micr coding has magnetic properties. This provides greater assurance that the document presented is in fact a genuine check and not a photocopy of a check. The computer may operate in addition to sense magnetic or other properties from various areas appropriate for the deposited document depending on data stored in memory. Further in some alternative embodiments the computer may operate to look for magnetic or other properties in areas of the check where such properties would not be appropriate. Such sensing may reduce the risk of the machine accepting fraudulent checks. Of course, other embodiments may include a read head or other device for reading micr line data magnetically.

In some embodiments the machine may operate to capture a complete image of one or both sides of each check or other instrument. In some embodiments image data may be stored in correlated relation with data related to the transaction at the machine. In some embodiments the image data, with or without associated transaction data, may be delivered by the machine to appropriate computers so that check processing may be conducted using the electronic image of the check rather than paper documents. In some embodiments check images may be stored at the machine and later delivered to appropriate systems for check processing. In other alternative embodiments check images may be transmitted to other computers during the transaction so that such computers may further analyze the check image data.

In an exemplary embodiment the computer operating in the ATM is operative to include data representative of the check data corresponding to information corresponding to indicia on the check such as amount and micr line data into an electronic message requesting authorization of the ATM transaction. This authorization message is transmitted to an appropriate host computer. The computer analyzes the data to verify that the user operating the ATM is authorized to conduct a deposit, check cashing or other transaction. In addition the host computer may operate to verify that the check data corresponds to data input by the customer. The host computer may further operate to determine or communicate with other computers to verify that the account data corresponding to the check corresponds to a valid account, that the check is not subject to a stop payment order and/or that there are sufficient funds in the account upon which the presented check is drawn to provide payment therefor.

In response to the host computer determining that the requested check cashing transaction is suitable to be carried forward, an authorization message is returned from the host computer to the ATM. The ATM operates responsive to instruction data included in the authorization message to cause the check to be moved through the transport section past the printing mechanism. The printing mechanism operates to print indicia on the check. This data represented by the indicia may indicate that the check has been cancelled as well as indicate the particular account of the user to which the check has been credited. In an exemplary embodiment the printing mechanism operates in the manner previously discussed to move into position in response to sensing the check adjacent thereto. This again minimizes the risk of damage to the printing mechanism or the check.

The computer also operates to control the deposit holding module such that the appropriate compartment therein accepts the deposited check. In the exemplary system the deposit holding module moves the compartment for holding the check into alignment with the outlet of the transport section. The deposited check is then held within the compartment until it is accessed by authorized personnel. Further, in the exemplary embodiment the deposit holding module is operative after receipt of the check into the appropriate compartment to move a tamping member in the compartment. The tamping member operates to assure that the deposited check as well as other checks in the compartment are properly tamped into position so as to reduce the likelihood of interference with acceptance of subsequent checks. The deposited check is then held in the appropriate compartment until removed by authorized personnel.

In some exemplary embodiments the authorization message received from the host computer by the ATM includes transaction identifying data. Such transaction identifying data may include information which facilitates associating the image or images of the check captured by the ATM with the particular transaction. Such transaction identifying data may include data that is sent by the ATM to the host computer in the original request message as well as data that may be assigned by the ATM host to the transaction. For example in an exemplary embodiment transaction identification data includes data which identifies the particular terminal at which the transaction is being conducted. Such information corresponds to the terminal identification data that is included in the message received by the ATM host from the terminal requesting the transaction. In addition in some alternative embodiments the transaction identification data may include information correlated with a particular user such as the user's name and/or account information. Such information may also be included in the message received by the ATM host from the terminal. Further in exemplary embodiments the transaction identification data may include information such as the business date assigned by the ATM host to the transaction, the entity responsible for operating the ATM such as a particular institution or business establishment, transaction numbers such as a sequence number as well as a pseudo number which can be used for correlating and/or verifying transaction data. Of course these items of transaction identification data are exemplary and in other exemplary embodiments other or different data may be used.

In an exemplary embodiment the ATM is programmed to correlate the transaction identification data with the image data related to the particular check received in the transaction.

At a time after the ATM has generated data corresponding to an image of the check, an image message is generated by the ATM and sent to a remote computer. In the exemplary embodiment the image message includes the transaction identification data as well as the data representative of the front and back of the check in a single message. In the exemplary embodiment the image message is sent to an image server which is operative to receive and process the image and transaction data. The image server is operative to tabularize the transaction data related to machines operated by a particular entity and to make the information and images related to transactions conducted by ATMs associated with that entity available to authorized individuals. This may be done through password protection, digital certificates or other security methodologies. Further in other alternative embodiments the image server or other connected computers may be operative to send information included in the image message and/or image data to a clearing house or other institution for purposes of achieving settlement between an entity upon which the check is drawn and another entity holding an account for an entity to which the check is payable. Further the image data may be transmitted and processed in lieu of a paper check so as to return evidence related to the proper cashing and cancellation of the check through the institution on which the check is drawn, and eventually to the maker of the check. Of course these approaches are exemplary and in other embodiments other approaches may be used.

While the exemplary embodiment is used for accepting envelopes and checks, other embodiments of the invention may accept only checks or may process other types of instruments. These include for example utility bills, drivers' licenses, gaming materials, tax documents and other items. Such items may be analyzed by the analysis module described in the exemplary embodiment for image and magnetic properties. Alternatively such items may be analyzed for other properties which may be indicative of their genuineness and value. Further as can be appreciated, while the exemplary embodiment accepts deposited items into the machine, other embodiments of the invention may accept items from a user, analyze them and return them to the user. This includes not only items which are considered unacceptable as is discussed in the exemplary embodiment, but may also include items such as drivers' licenses which are returned to the user after an image or analysis is made thereof.

In an alternative embodiment a deposit accepting apparatus is used that accepts documents. These documents may include checks, currency bills and other types of documents. A single deposit accepting device may accept multiple types of documents. In this alternative embodiment a document such as a check is received through an opening in the ATM and moved therein in a first direction by a first transport. Sensors are operative to sense the document has moved into a suitable location within the device. The document is then disengaged from the first transport and engaged with a pair of second transports which are disposed from one another in the first direction. The second transports engage the document and are operative to move the document in a direction transverse of the first direction. The first transport disengages from the document such that the second transports can move the document and align an edge thereof extending along the first direction with a plurality of non-contact sensors. At least one processor operates in accordance with its programming to control the second transports and controls movement of the document in the second direction such that an edge of the document is aligned with the non-contact sensors which serve as a "virtual wall" for purposes of positioning the document.

Once the document is aligned such that an edge extends along the first direction in the desired orientation, the first transport reengages the document while the second transports disengage. The document is then moved again in the first direction past one or more appropriate sensing devices. In the exemplary embodiment because the document is aligned along the first direction, documents which are checks may have the micr line or other portion thereof read through operation of a magnetic read head. Alternatively or in addition when the document is moved in a first direction, the magnetic properties of the document may be read in a plurality of locations by one or more magnetic sensors which are operative to read magnetic properties of the document, including indicia thereon such as the micr line and/or other features.

In the alternative embodiment the check is moved in a first direction past a pair of scanning sensors. The scanning sensors are operative to read optical indicia on each side of the check and to produce data corresponding thereto. The data corresponding to the optical indicia may be processed in the manner described such that data corresponding to images of the front and rear of the check or portions thereof are generated and stored through operation of the processor in one or more data stores of the ATM. The indicia on the check may also be analyzed for purposes of determining information regarding on the check so that it can be used in conducting a transaction.

In the alternative embodiment once a check has been moved past the sensors which capture data corresponding to optical indicia, the check is moved in generally the first direction into an area which may serve as an escrow area for checks. In some embodiments the escrow area may be of sufficient length so that multiple checks may be temporarily stored therein. In the exemplary embodiment, the machine operates to determine whether the check is to be accepted or returned to the customer while the check is held in the escrow area. For example in some embodiments one or more processors in the ATM may operate to determine if the check can be sufficiently accurately read, redeemed for cash or otherwise processed while the check is stored in the escrow area. If it is determined that the check cannot be accepted, one or more transports are operative to move the check out of the ATM so that the check is returned to the customer.

Alternatively if the check is found to be suitable for acceptance, the check is moved from the escrow area past one or more stamper printers. The stamper printer is operative to apply ink marks to one or more surfaces of the check so as to indicate that the check has been cancelled. In an exemplary embodiment the check is thereafter moved into a vertically extending transport. As the check enters the vertical transport, printing is conducted on the check through operation of a suitable inkjet or other printer. Appropriate printing is applied to the check to indicate it has been cancelled as the check moves past the inkjet printer. In the exemplary embodiment the inkjet printer has aligned on an opposed side of the transport therefrom, an ink catcher mechanism. The ink catcher mechanism of the exemplary embodiment includes a movable head. The movable head includes an opening therein such that the opening may be aligned with the ink spraying nozzles on the head of the inkjet printer so as to receive ink therein that is not deposited on the check or other document. The exemplary embodiment of the movable head also includes a wiper. The head is moved through operation of a motor or other moving device at appropriate times so that the wiper engages the head of the inkjet printer so as to minimize the buildup of ink and contaminants thereon. This facilitates accurate printing and helps to minimize the risk of potential damage to checks by the accumulation of excess ink within the machine.

Checks or other documents that move past the printer in the vertical transport are moved downward in the exemplary embodiment into a storage area. Once the documents have reached a lower surface of the storage area a plunger mechanism is operative to engage the check and move it out of the vertical transport. In an exemplary embodiment the plunger mechanism is operative to be movable such that the check can be either moved into a storage location on either opposed side of the vertical transport. Once the check is moved out of the transport by the plunger mechanism the check may be held in intermediate relation between a reference surface and a spring biased backing plate. As a result checks or other documents may be selectively moved by the plunger mechanism for storage in a selected one of the locations in the storage area.

Various approaches may be taken in the operation of automated banking machines for storing documents that are received by the alternative document accepting mechanism. For example in some embodiments the mechanism may only accept checks. In such embodiments the machine may operate in accordance with its programming to segregate checks that are drawn on the particular institution owning the ATM that receives the check, from checks that are drawn on other institutions. Alternatively the ATM may be programmed to store valid checks in one compartment and suspect checks in another compartment. Alternatively in some other embodiments the document accepting mechanism may store multiple types of documents. For example in an ATM that accepts currency bills and checks through the mechanism, bills may be stored in one compartment while checks are stored in another. Various approaches may be taken based on the programming of the particular automated banking machine.

Numerous types of novel systems and methods are taught by the disclosure hereof.

BRIEF DESCRIPTION OF DRAWINGS

FIG. 7 is a side schematic view showing the transport portion of the deposit accepting apparatus in a position in which it accepts checks and other sheets.

FIG. 8 is a view similar to FIG. 7 with the deposit accepting module in position for accepting envelopes or other items.

FIG. 9 is a side schematic view of the variable force driving section included in the transport section of the deposit accepting apparatus with the drive shown in condition for providing limited slip engagement with deposited items.

FIG. 10 is a view similar to FIG. 9 but with the variable force driving section providing generally nonslip engagement with deposited items.

FIG. 29 is an exemplary logic flow executed by an automated banking machine in accepting an envelope deposit through the deposit accepting apparatus.

FIGS. 30-33 describe an exemplary embodiment of the logic flow executed by an automated banking machine in accepting a check through the deposit accepting apparatus.

FIG. 39 is an exemplary screen output provided from an administrator station of the system shown in FIG. 38.

FIG. 40 is an exemplary screen output from an administrator station, showing the status of automated banking machines.

FIG. 41 is an exemplary screen output from an administration, showing status information related to a particular automated banking machine.

FIG. 42 is an exemplary output from an administrator station which enables an administrator to recover transaction information from the exemplary system.

FIG. 43 is an exemplary output from an administrator station showing check cashing transactions conducted by a particular customer.

FIG. 44 is an exemplary screen output from an administrator station showing selections in an exemplary system.

FIG. 45 is an exemplary screen output from an administrator station showing available reports.

FIG. 46 is an exemplary screen output from an administrator station enabling an administrator to upload file information to the exemplary system.

FIG. 47 is an exemplary output from an administrator station indicating the upload of files to the exemplary system.

FIG. 48 is a schematic view of an exemplary record relating to makers of checks whose checks are to be cashed in the exemplary system.

FIG. 49 is an exemplary output from an administrator work station showing file conversion from the exemplary system.

FIG. 50 is an exemplary output from an administrator station which is used by an administrator to edit customer records.

FIG. 51 is an exemplary screen output produced by an administrator station showing customer authorization information.

FIG. 52 is an exemplary screen output from an administrator station showing information regarding a particular attempted check cashing transaction.

FIGS. 58 through 60 are a table showing various criteria programmed in the exemplary system for the denial of transactions attempted at automated banking machines within the system.

FIG. 63 is a table showing exemplary transaction identifying data associated with check images in an exemplary embodiment.

FIG. 64 is a table showing exemplary fields and the content thereof in an image message sent from an ATM to an image server in an exemplary embodiment.

Figure 68:
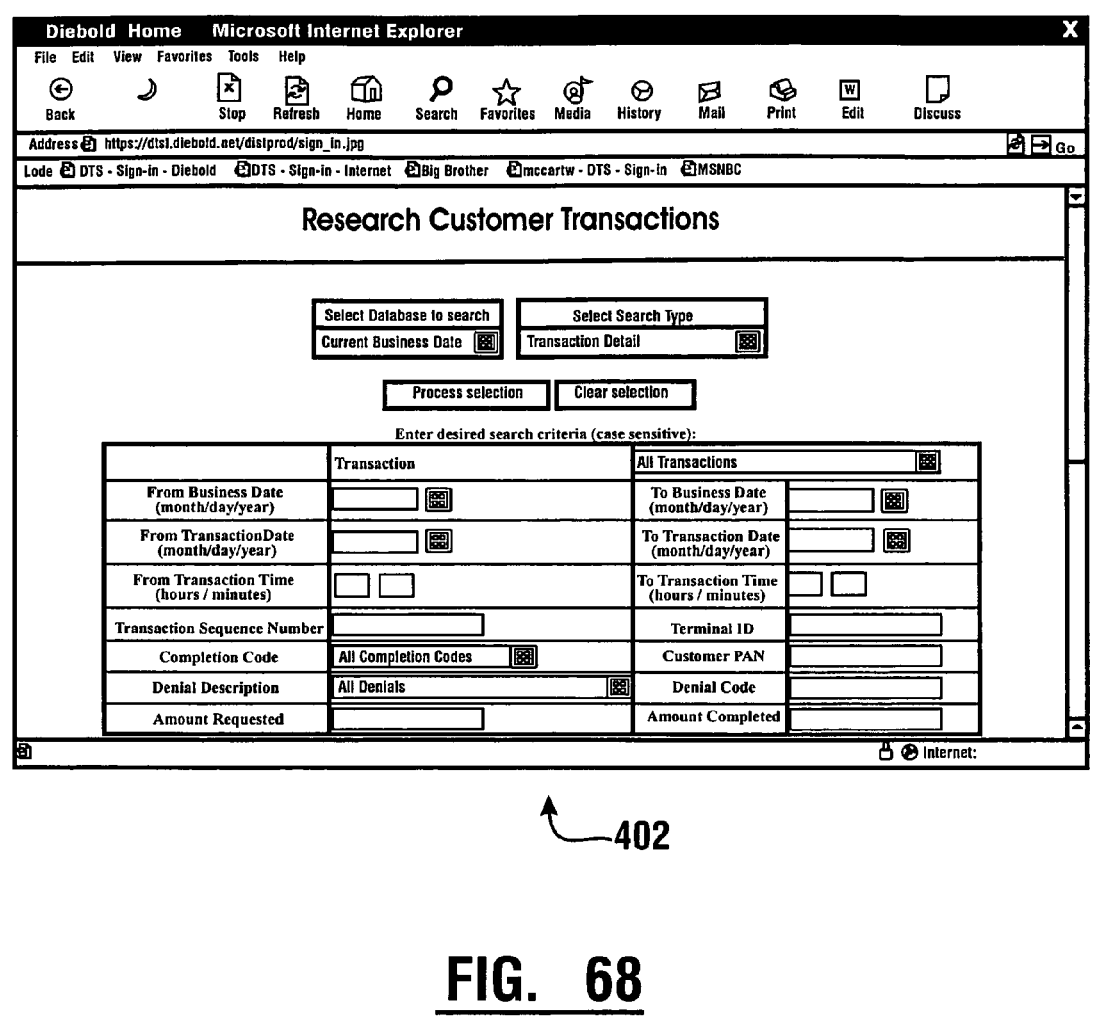

FIG. 68 is an exemplary interface output from the image server which enables authorized users to recover transaction and image data related to transactions.

FIG. 69 is an exemplary table of transaction data corresponding to check cashing transactions conducted at ATMs associated with a particular entity operating ATMs.

Figure 70:
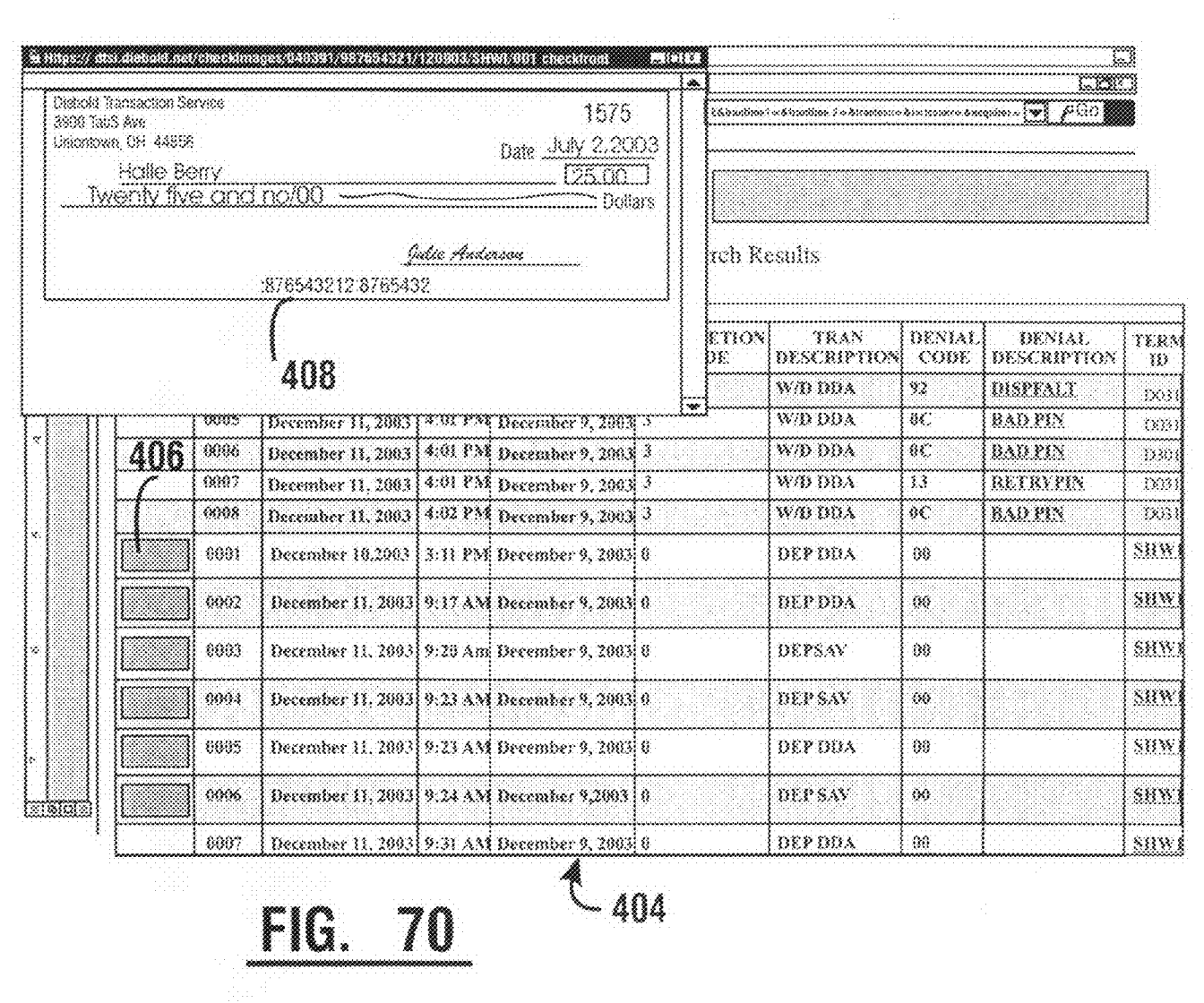

FIG. 70 is an exemplary output from the check image server representing an image of a check which is produced responsive to selecting an icon associated with a corresponding transaction in the table shown in FIG. 69.

FIG. 71 is an exemplary file record related to transactions conducted at an ATM in which multiple checks are accepted.

FIG. 76 is the back of the check shown in FIG. 74 with indicia printed thereon.

FIG. 77 is an exemplary view of the image overlay associated with the information shown printed on the check in FIG. 76.

FIG. 78 is image data corresponding to the check shown in FIG. 72 but including graphic indicia in the image data representing an authenticity feature included with the image data.

FIG. 87 is a top plan view of an upper platen and a lower platen of a transport mechanism of the alternative deposit accepting device.

FIG. 88 is a front view showing the positions of the first and second transports corresponding to FIG. 87.

FIG. 89 is a view similar to FIG. 87 with the transports operating to move a document in a first direction.

FIG. 90 is a front view of the first and second transports corresponding to FIG. 89.

FIG. 91 is a view similar to FIG. 89 with the document moved further into the deposit accepting device.

FIG. 92 is a front plan view showing the positions of the first and second transports.

FIG. 99 is an isometric view showing the movable mounting of the exemplary magnetic read head of the alternative embodiment.

FIG. 100 is a partially sectioned view corresponding to FIG. 99 further showing the movable mounting for the magnetic read head.

FIG. 101 is a cross-sectional side view of the mounting for the magnetic read head as shown in FIG. 99.

FIG. 105 is a partially exploded view of an exemplary form of the stamper printer used in the alternative embodiment.

FIG. 106 is another exploded view of the exemplary stamper printer.

FIG. 107 is a side view showing the eccentric profile of the exemplary embodiment of the printing roll of the stamper printer.

DETAILED DESCRIPTION OF EXEMPLARY EMBODIMENTS

Figure 1:
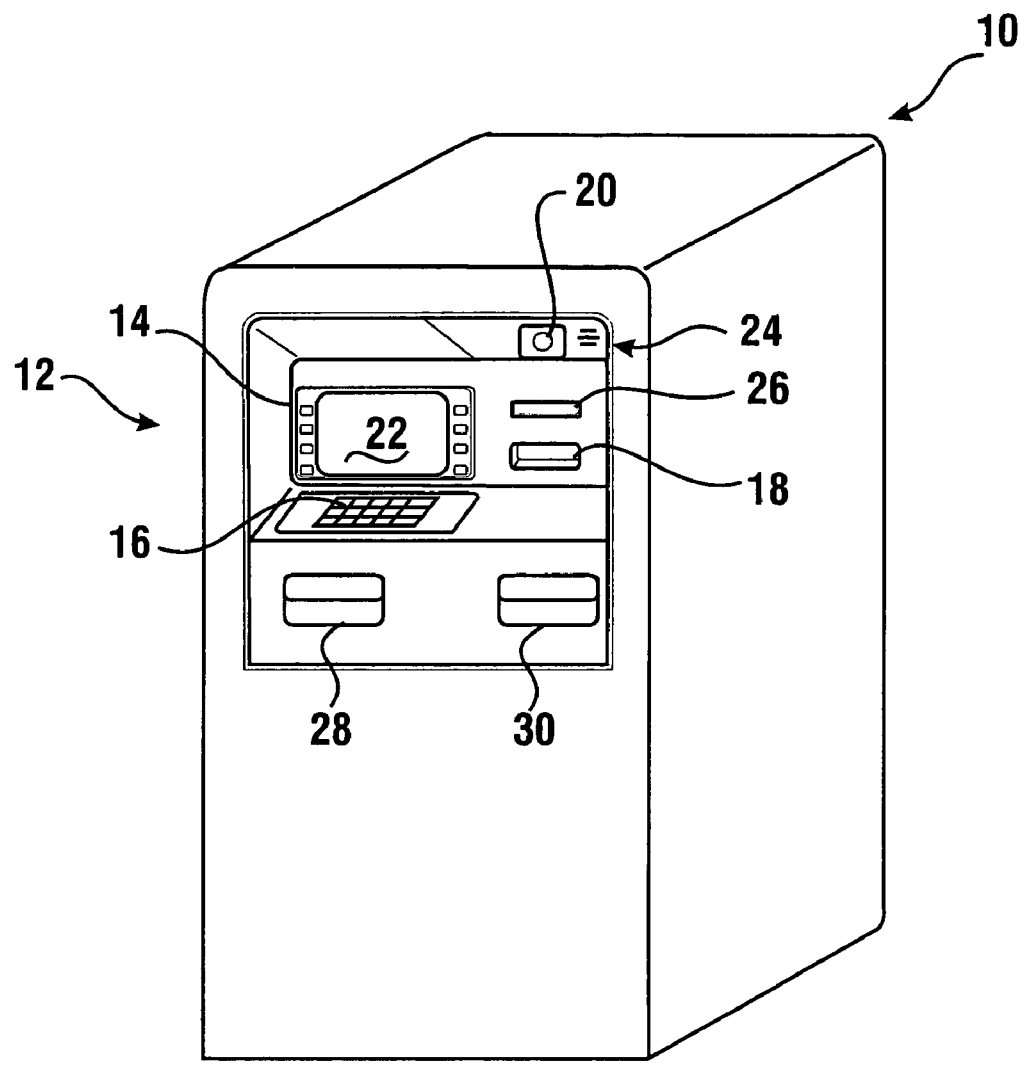
FIG. 1 is an isometric view of an exemplary automated banking machine which may be used in connection with a deposit accepting apparatus and method.

Referring now to the drawings and particularly to FIG. 1, there is shown therein an exemplary embodiment of an automated banking machine 10 which includes an exemplary deposit accepting apparatus and which performs an exemplary methods of operation. Automated banking machine 10 is an ATM. However it should be understood that the inventive concepts disclosed herein may be used in connection with various types of automated banking machines and devices of other types. Automated banking machine 10 includes a user interface generally indicated 12. User interface 12 includes input and output devices. In the exemplary embodiment the input devices include a plurality of function buttons 14 through which a user may provide inputs to the machine. The exemplary input devices further include a keypad 16 through which a user may provide numeric or other inputs. A further input device in this exemplary embodiment includes a card reader schematically indicated 18. Card reader 18 may be of the type used for reading magnetic stripe cards, smart cards, RFID tokens or other articles presented by a user. Another input device on the exemplary machine includes an image capture device 20. The image capture device may be a camera or other device for capturing the image of a user or the surroundings of the machine. The exemplary embodiment may include biometric reading devices. Such devices may include an imaging or reading device such as a fingerprint reader, iris scan device, retina scan device or other biometric input. It should be understood that the camera mentioned may serve as a biometric reading device in some embodiments.

The user interface 12 also includes output devices. In the exemplary embodiment the output devices include a display 22. Display 22 includes a visual output device such as a CRT or LCD for providing messages and prompts to a user. These messages and prompts may be responded to by inputs from the user through the function buttons 14 adjacent to the display or by inputs through the keypad 16 or through other inputs. A further output device in the exemplary embodiment includes an audio output device schematically indicated 24. The audio output device may be used to provide audible outputs to the user. A further output device in the exemplary embodiment includes a printer. The printer may be used to provide outputs in the form of receipts or other items or information to the user. The printer is in connection with a printer outlet in the user interface indicated 26 in FIG. 1.

It should be understood that the input and output devices shown are exemplary and in other embodiments of the invention other types of input and output devices may be used. Such input and output devices commonly receive information which is usable to identify the customer and/or their accounts. Such devices are also operative to provide information to a user and to receive instructions from a user concerning transactions which are to be carried out through use of the machine. Various forms of user interfaces and input and output devices may be used in connection with embodiments of the invention.

In the exemplary embodiment ATM 10 includes a cash dispensing mechanism alternatively referred to herein as a cash dispenser. The cash dispensing mechanism is selectively operated to enable the dispensing of cash to authorized users of the machine. Cash is provided to the users through a cash outlet indicated 28. A further feature of the exemplary embodiment is the ability to accept deposits through the ATM. The machine includes a deposit accepting opening 30. In the exemplary embodiment the ATM is enabled to accept deposits in the form of sheets, envelopes and/or other items as later discussed.

Figure 2:
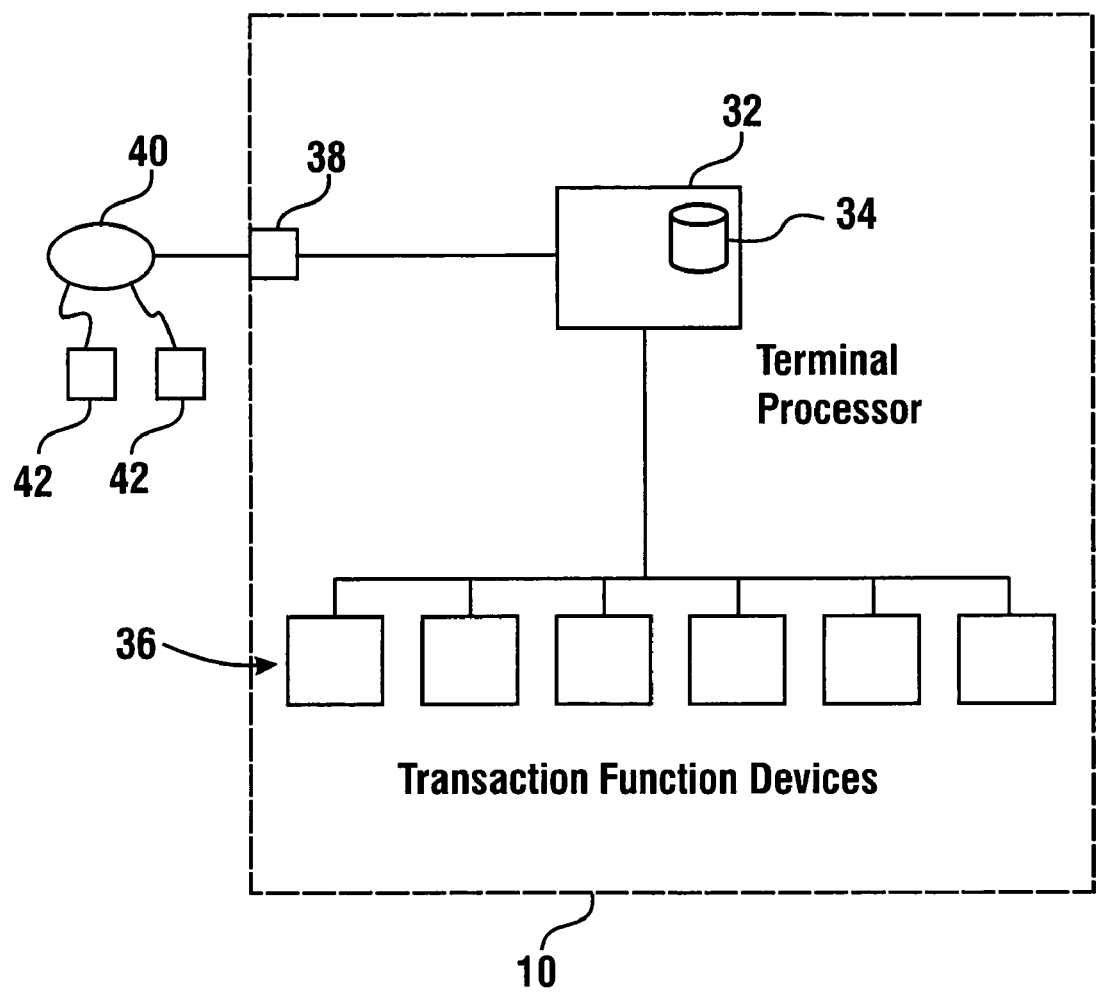
FIG. 2 is a schematic view of components included within an automated banking machine of the type shown in FIG. 1 and a system in which the automated banking machine is used.

FIG. 2 shows a schematic view of the computer architecture associated with ATM 10 and a first exemplary system in which it is used. The ATM includes one or more computers therein, which computers are alternatively referred to as a processor or processors. The one or more computers in the exemplary embodiment are schematically represented by a terminal processor 32. The terminal processor is in operative connection with one or more data stores schematically represented 34. The terminal processor may comprise one or more computers that operate to control transaction function devices 36 which are included in the ATM. These transaction function devices include devices which operate in the ATM to carry out transactions. Transaction function devices may include, for example, currency dispensing mechanisms, currency presenters, currency acceptors, currency validators, item dispensing devices, card readers, printers, depositories, other input and output devices and other devices. Transaction function devices may further include cameras, sensors, image capture devices and other items. The particular character of the transaction function devices depends on the particular capabilities for carrying out transactions to be provided by the ATM.

In the exemplary embodiment ATM 10 exchanges messages through a communications interface 38 with a communications network 40. Network 40 may be one or more types of data communications networks, including a phone line, data line, lease line, frame relay, wireless network, telecommunications network or other medium for communicating messages to and from the ATM 10. The communications interface provided is suitable to work in connection with the particular type of network(s) to which the machine is connected. In the exemplary embodiment the ATM may be connected to a network which communicates with a plurality of ATMs such as Cirrus® or Plus®, or other debit card network. Of course in other embodiments other suitable networks for processing credit, debit or other types of online transactions may be used including the Internet.

As schematically represented in FIG. 2, network 40 is in operative connection with one or more host computers 42. Host computers 42 in the exemplary embodiment are operative to authorize transaction requests which are made by users at the ATM 10. The ATM is operative to deliver to the host computer data identifying the user and/or their account and the particular transactions that they wish to conduct. The request is routed through the network to a host computer that can evaluate and/or authorize the request. The appropriate host computer receives and analyzes this data and returns to the ATM a message which indicates whether the transaction requested is authorized to be conducted at the machine. The message returned may also include one or more instructions that cause the ATM to carry out one or more transaction functions. In response to receiving a message indicating that the transaction should proceed, the processor in the ATM operates the transaction function devices to carry out the requested transaction. If the transaction is not authorized, the user is so informed through the display and the transaction is prevented. The ATM is also operative in the exemplary embodiment to send to the host computer authorizing the transaction, a completion message which includes data indicative of whether the transaction was able to be carried out successfully. Upon receiving the information that the transaction was carried out, the host computer is operative to take appropriate action such as to credit or debit a user's account. It should be understood that this system shown in FIG. 2 is exemplary and in other embodiments other approaches to operating automated banking machines and authorizing transactions may be used.

In the exemplary embodiment the transaction function devices include a deposit accepting apparatus. The exemplary deposit accepting apparatus is capable of accepting deposited items such as envelopes as well as sheets and documents such as checks. This deposit accepting apparatus in alternative embodiments may be capable of accepting and analyzing other items such as papers, instruments, billing statements, invoices, vouchers, wagering slips, receipts, scrip, payment documents, driver's licenses, currency bills, cards and items which may be moved in the deposit accepting device. Alternative embodiments may accept only selected ones of such items. The exemplary deposit accepting apparatus may alternatively be referred to herein as an "intelligent depository module," "depository module" or "IDM." The exemplary embodiment of the IDM is referred to herein as 44 and the exemplary mechanical components thereof shown in FIGS. 4-18.

Figure 4:
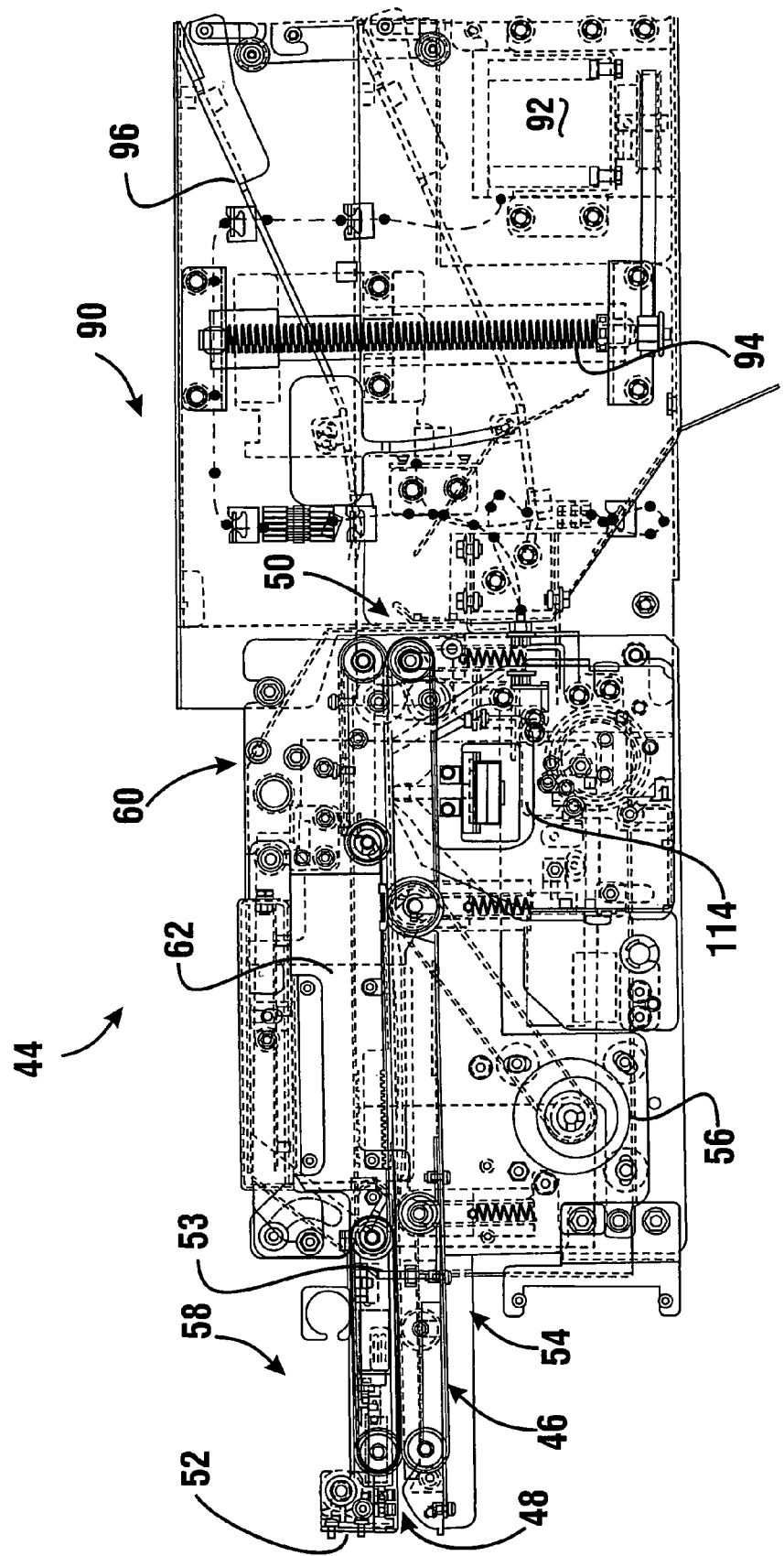
FIG. 4 is a side view of a first deposit accepting apparatus used in connection with an exemplary embodiment.

As shown in FIG. 4 IDM 44 includes a transport section 46. Transport section 46 extends in generally a straight path from an inlet 48 to an outlet 50. Inlet 48 is positioned adjacent to a deposit accepting opening 30 through the body of the ATM 10. Access to the transport section 46 from the outside of the ATM may be controlled by a gate 52 or other suitable blocking mechanism which operates under the control of the terminal processor 32. The terminal processor operates to open the gate only when an authorized user of the ATM is to provide items to or to receive items from the transport section of the IDM.

The transport section 46 of the IDM includes a plurality of belts or other moving members 54. Moving members 54 operate to engage items deposited into the transport section and to move deposited items in engagement therewith. The moving members are moved in response to one or more drives schematically indicated 56. In the exemplary embodiment an inlet transport section 58 moves deposited items between upper and lower belt flights (see FIG. 5). Similarly, deposited items are also moved through an outlet transport section 60 in sandwiched relation between upper and lower belt flights. Between the inlet and outlet transport sections deposited items are moved past an analysis module 62. In the exemplary embodiment deposited items are moved adjacent to the analysis module in engagement with moving members that act on the lower side of the deposited item. In this way the deposited item moves in close proximity to the analysis module and in sandwiched relation between a lower face 64 of the analysis module and the upper face of the moving members. Of course it should be understood that this configuration is exemplary. For example, in other embodiments additional analysis modules may be provided so that both sides of an item are analyzed. Analysis modules or discrete devices for activating indicia to facilitate sensing, as well as for sensing indicia on items, may be provided as necessary to read indicia from items handled by the banking machine.

As represented in FIGS. 7 and 8, in the exemplary embodiment the deposit accepting apparatus is enabled to accept both relatively thin articles such as sheets as well as relatively thick items such as deposit envelopes. As shown in FIG. 7 thin articles such as checks or other sheets are moved through the transport section with the upper and lower moving members in close proximity. In the exemplary embodiment, the upper portion of the transport section is movable relative to the lower section and is biased adjacent thereto by gravity or other suitable biasing mechanism. In this way a relatively thin deposited item is biased to engage the moving members in the transport section. Relatively thin articles such as checks and other sheets are moved between the inlet 48 and the outlet 50 in the transport section with the transport in the configuration generally shown in FIG. 7. In this configuration the moving members and analysis module in the upper portion of the transport section are biased to maintain engagement with the sheet so as to enable selectively moving the sheet through the transport section.

It should be noted that in the exemplary embodiment of the depository module a single drive is used for moving the moving members in both the upper and lower transport sections. This is accomplished in the exemplary embodiment through use of a connecting gear train 66 which serves as a transmission device which transmits movement between the lower belt flights and the upper belt flights. A connecting drive belt 68 is used to transmit movement between the upper portions of the inlet and outlet transport sections 58, 60 respectively. The connecting drive belt extends adjacent to the analysis module 62. Of course this approach is exemplary and in other embodiments other arrangements of drives and transmission devices may be used.

As represented in FIG. 8 when a relatively larger item is deposited into the transport section, the upper and lower transport sections are enabled to separate to a degree sufficient to accommodate the thickness of the particular item. The configuration of the gear train 66 enables providing moving force to the moving members in both upper and lower sections of the transport within a relatively wide range of thicknesses. The exemplary structure further enables each end of the transport section to move both vertically and rotationally relative to one another while still continuing to reliably transport items therein. An inserted deposited item overcomes the biasing force applied to the deposited item by the transport sections to enable the item to move between the upper and lower moving members that bound the path 53 between the inlet 48 and outlet 50. The biasing force further enables providing positive engagement with the deposited item to reliably move the item along the path. It should be understood however that this particular configuration for the transport is exemplary and in other embodiments of the invention other approaches may be used.

In the exemplary embodiment the inlet transport section 58 may be operated responsive to the terminal processor as a variable force driving section. This is achieved through use of the mechanism schematically represented in FIG. 9. As shown in FIG. 9 the inlet transport section includes moving members comprising one or more upper belt flights 70 and one or more lower belt flights 72 in generally opposed facing relation. The number of upper and lower belt flights will depend on the particular configuration of the transport used. In certain embodiments the upper and lower belt flights may be in generally aligned facing relation or may be transversely disposed from one another.

The upper belt flight 70 which serves as a moving member is supported on an upper roller 74. The lower belt flight 72 is supported on a lower roller 76 which is generally disposed in opposed relation below roller 74 and which serves as an opposed moving member. Upper roller 74 is journaled on a supporting member 78. Supporting member 78 is supported through and is rotatable about a pivot axis 79 which extends axially through support shaft segments 80. An actuator 82 such as a solenoid selectively moves the supporting member between the position shown in FIG. 9 and the position shown in FIG. 10. This is done in response to operation of the terminal processor 32 and enables the inlet transport section to be selectively changed between a low drive position in which limited slip is provided between the belt flights 70 and 72 and a deposited item, and a high drive position in which generally no slip occurs between the belt flights and the deposited item.

FIG. 9 shows the inlet transport section in the low drive position. In the exemplary embodiment roller 74 is supported through roller shaft segments 84. Shaft segments 84 are journaled in and movable in elongated U-shaped slots 86 in connection with supporting member 78. Each slot 86 is bounded by a U-shaped bounding surface 87. The slots are generally radially aligned relative to pivot 79. A biasing spring schematically indicated 85 or other appropriate biasing mechanism is provided for urging roller shaft segments 84 toward a downward position in the slot.

In the position shown in FIG. 9 an item such as a check which is engaged between the belt flights 70 and 72 is enabled to slip therein responsive to the limited biasing force which acts to push roller 74 downwards. This results because roller shaft segments 84 move relatively readily on the vertically extending portions of the bounding surface as the upward directed reaction force caused by the inserted item is resisted only by downward biasing force. This enables for example, a user who is placing a check into the transport section to hold the check for a period of time while it engages between the belt flights. The limited slip minimizes the risk that the check will be torn if the user does not release it promptly. Such limited slip engagement further enables a check or other inserted item to move angularly relative to movement along the direction of transport. This may occur for example by the engagement of an outward end of the item with a user's hand as the item is pulled into the machine and/or by one or more surfaces bounding the opening in the machine through which the item passes.

Upon sensing with one or more appropriate sensors schematically indicated 89 that the check is moved sufficiently into the transport path, the terminal processor is operative to move the actuator 82 to place the inlet transport in the high drive position shown in FIG. 10. A connecting member 88 moves the supporting member 78 about support shaft segments 80. This change in orientation of the slots increases the downward biasing force applied by the roller 74 onto the deposited item. This results in the exemplary embodiment because the upwardly directed separating force is now resisted by engagement of roller shaft segments 84 with bounding surface 87. In addition the rotating shaft segments 84 engage bounding surface 87 so that the roller shaft segments are further urged downward in the slot 86 towards an end portion 81 as shown in FIG. 10. This causes the item to be more positively engaged between the belt flights and generally prevents slippage. This feature is useful as later discussed in helping to measure the length of a deposited item for imaging purposes.

Figure 36:
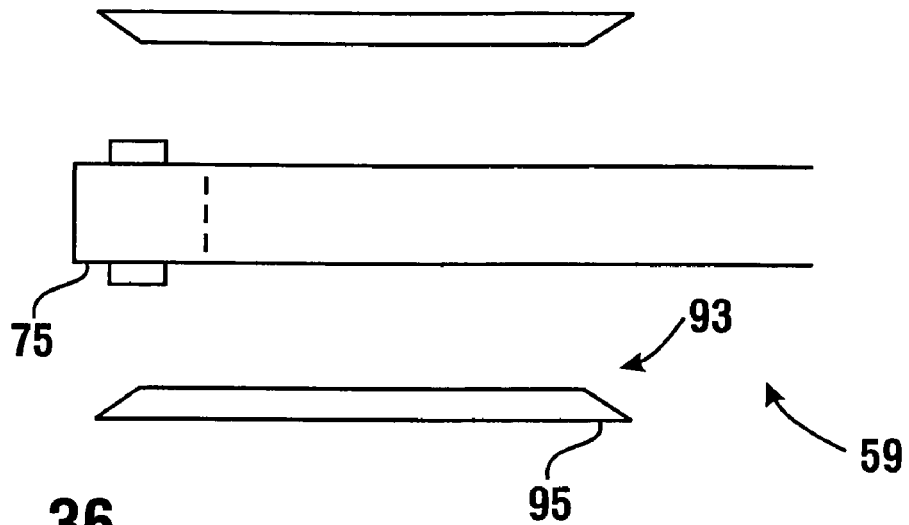
FIG. 36 is a top plan view of an alternative form of the variable force driving section included in the transport section of the deposit accepting apparatus which includes a document alignment device.
Figure 37:
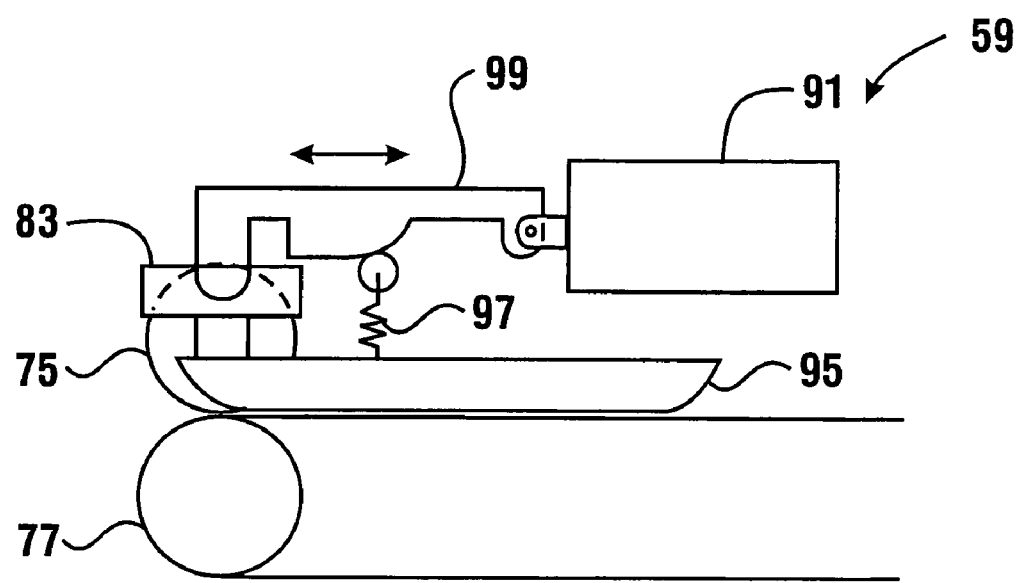
FIG. 37 is a side schematic view corresponding to FIG. 36 showing the mechanism actuating the variable force driving section and document alignment device.
Figure 38:
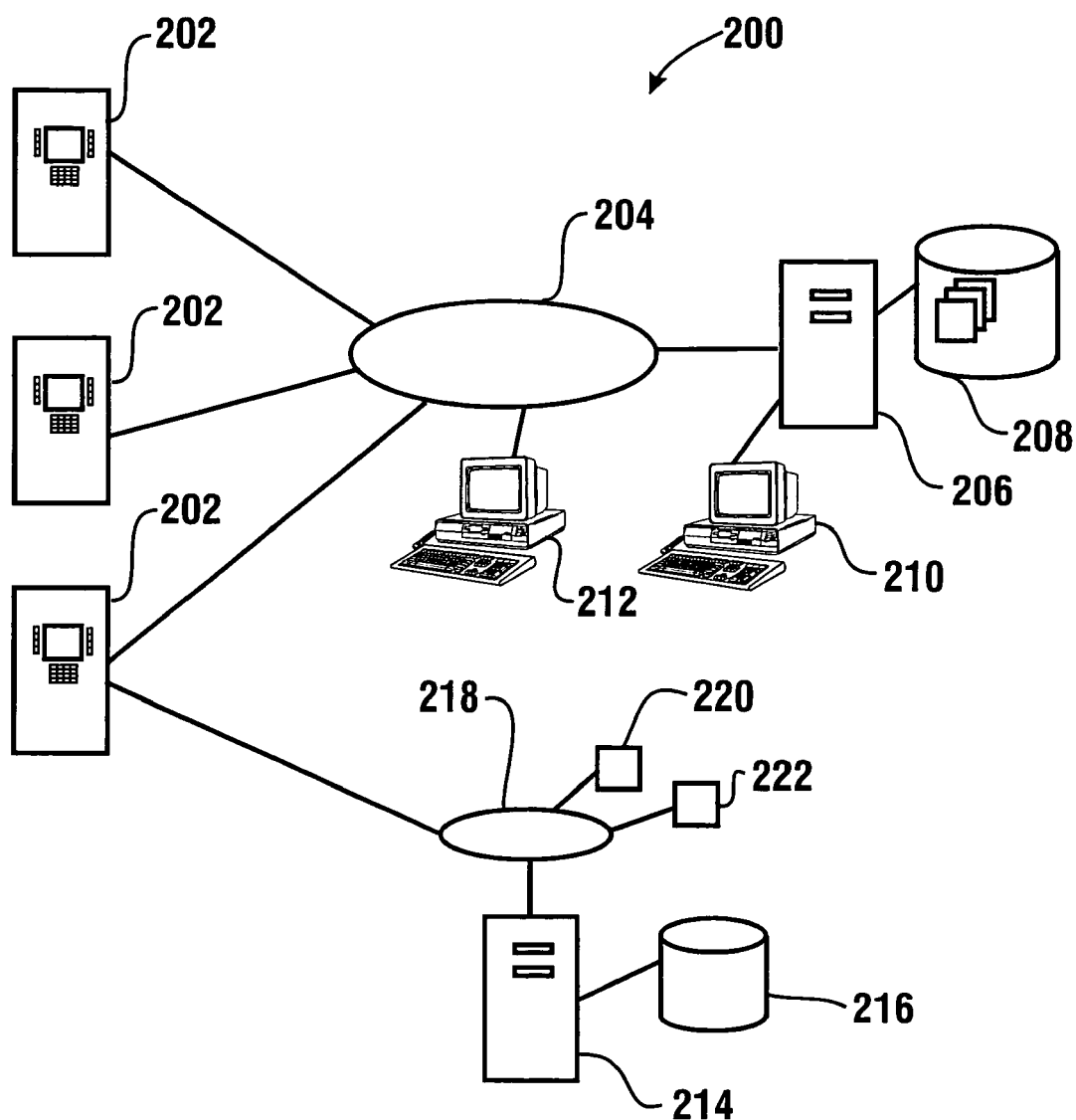
FIG. 38 is a schematic view of an alternative system of an exemplary embodiment including check accepting automated banking machines.
Figure 53:
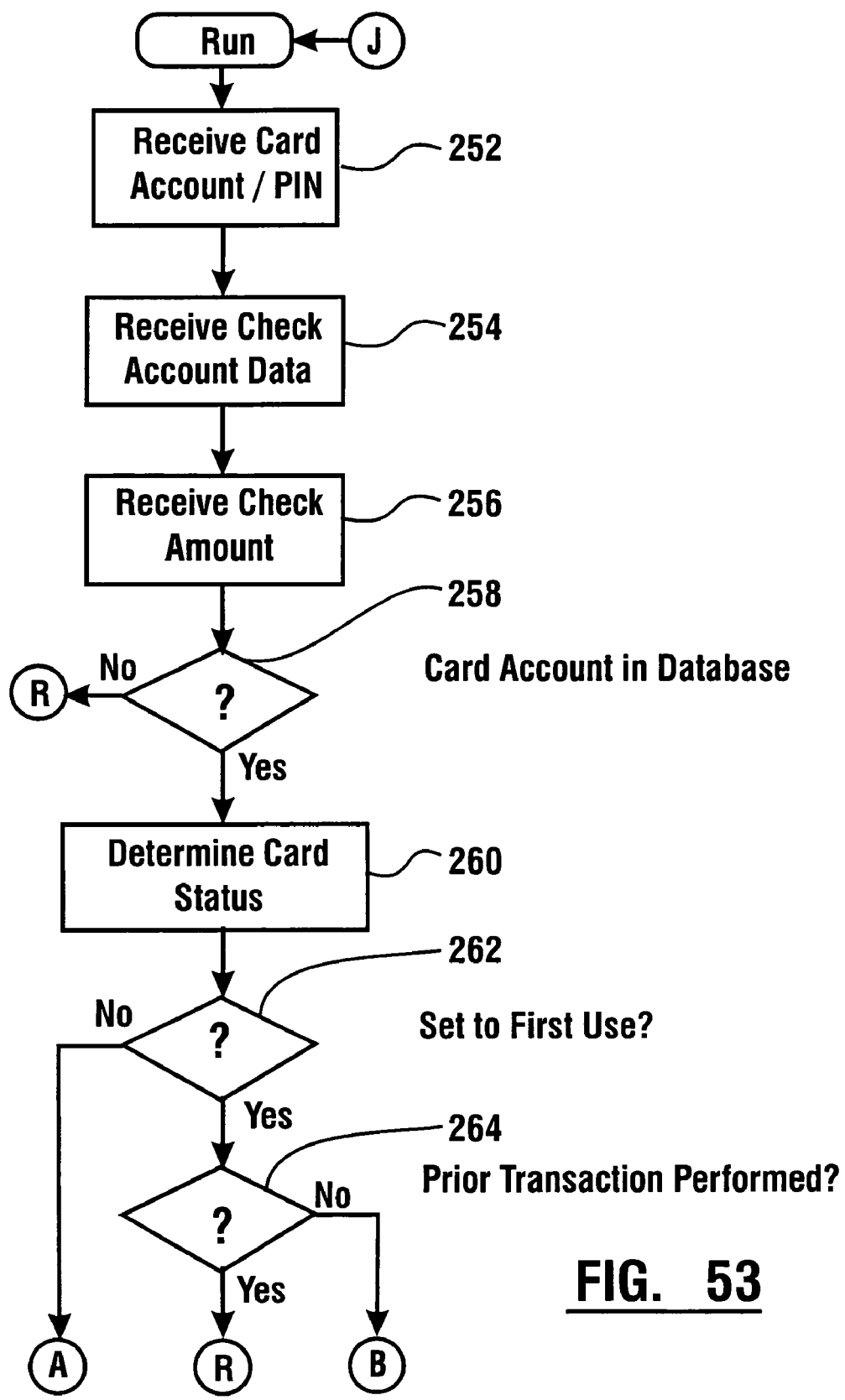
FIGS. 53 through 57 include a schematic representation of the logic flow executed by computers in the exemplary system shown in FIG. 38.
Figure 54:
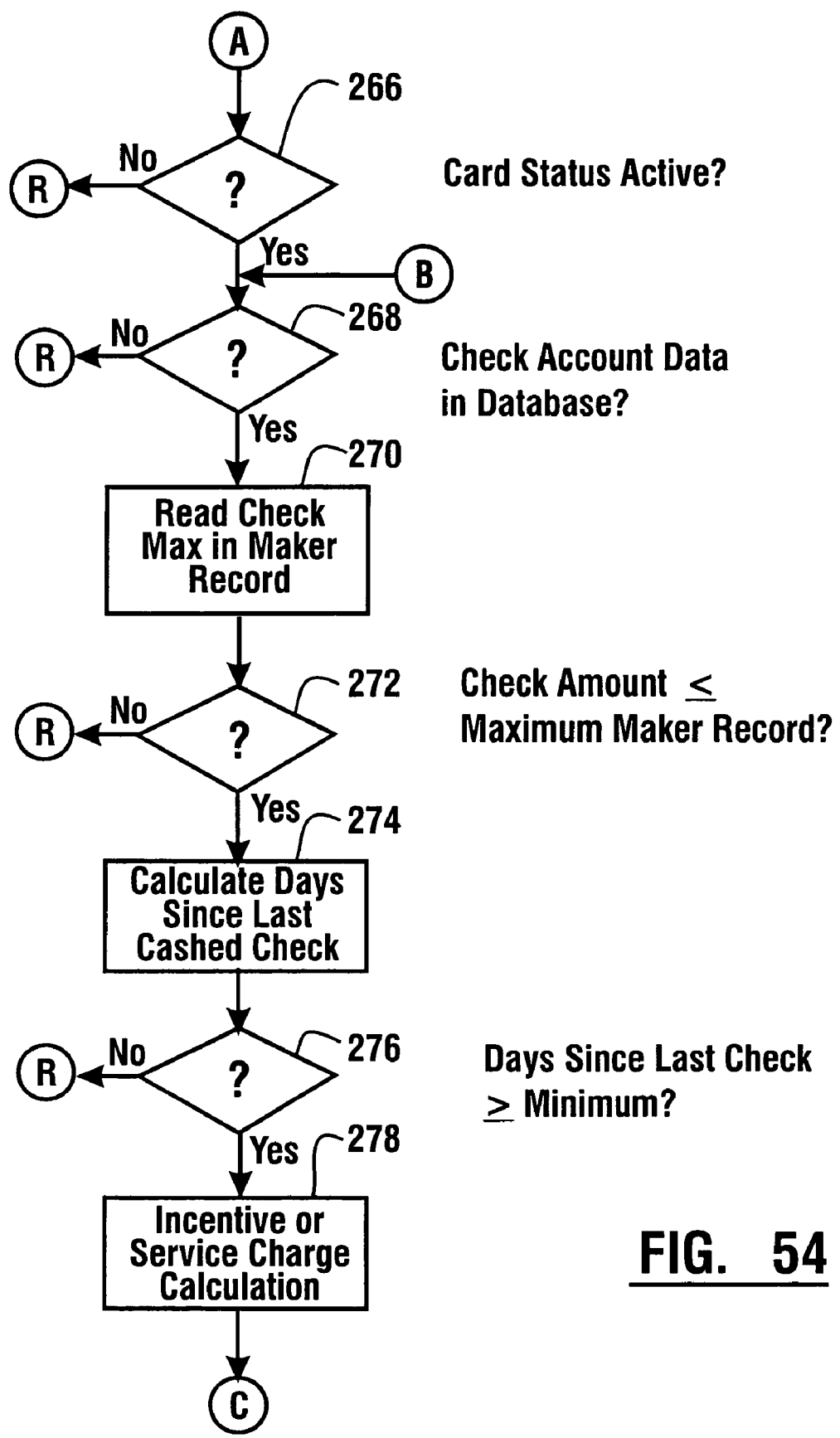
Figure 55:
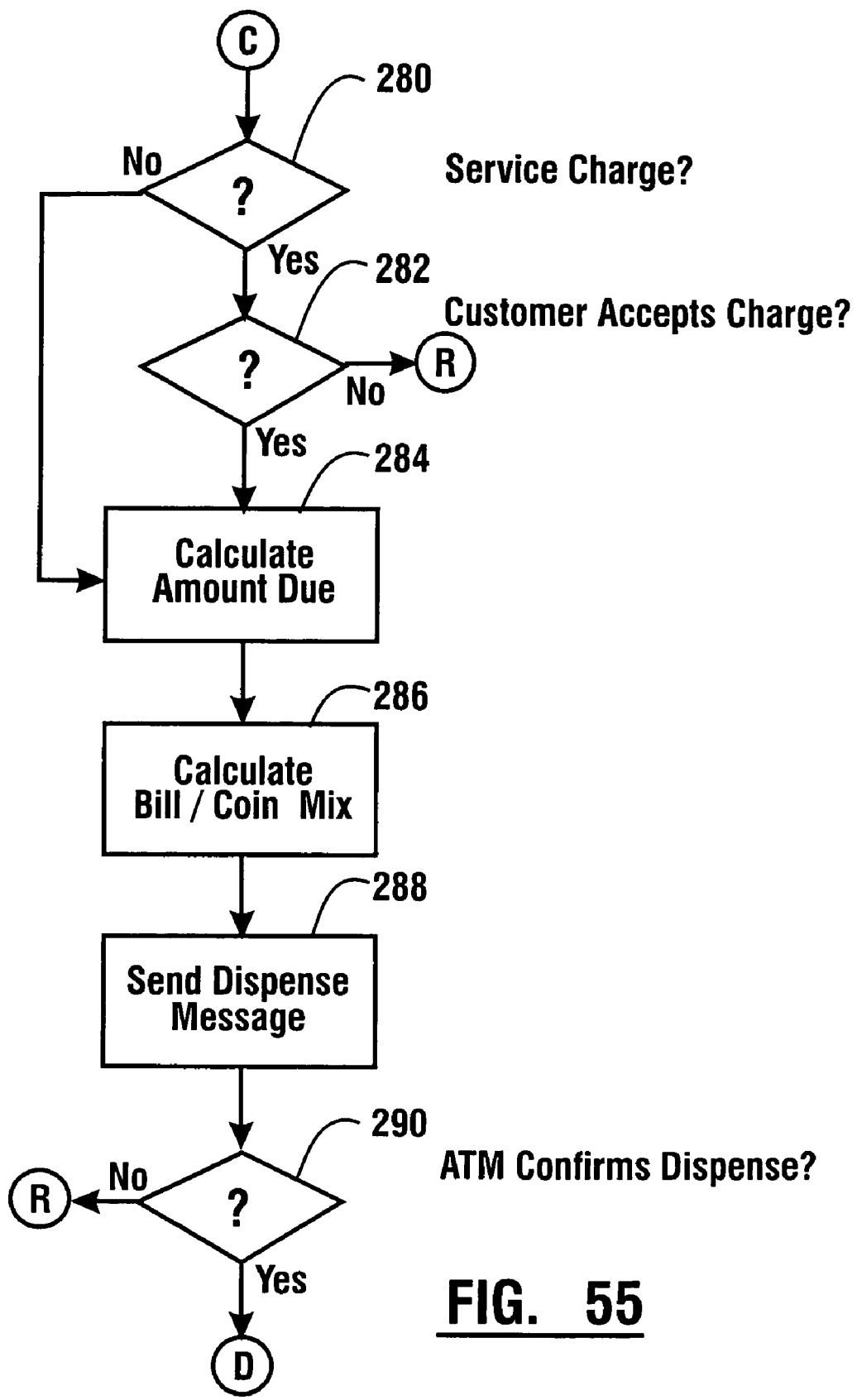
Figure 56:
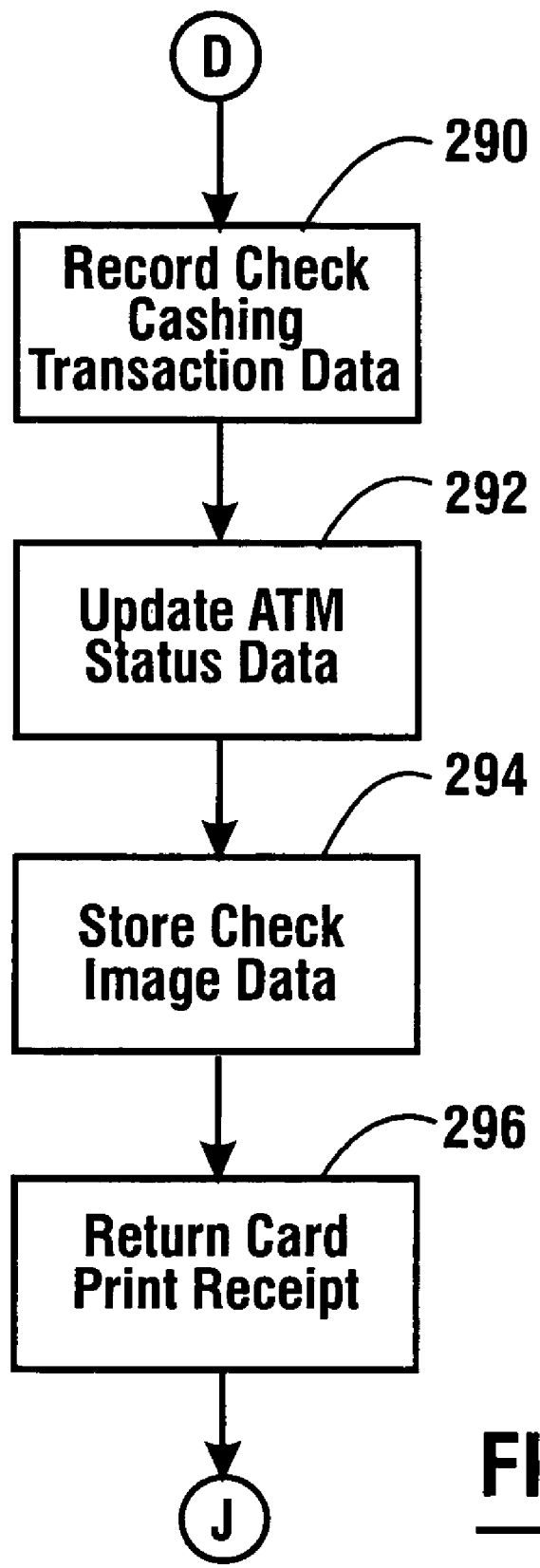
Figure 57:
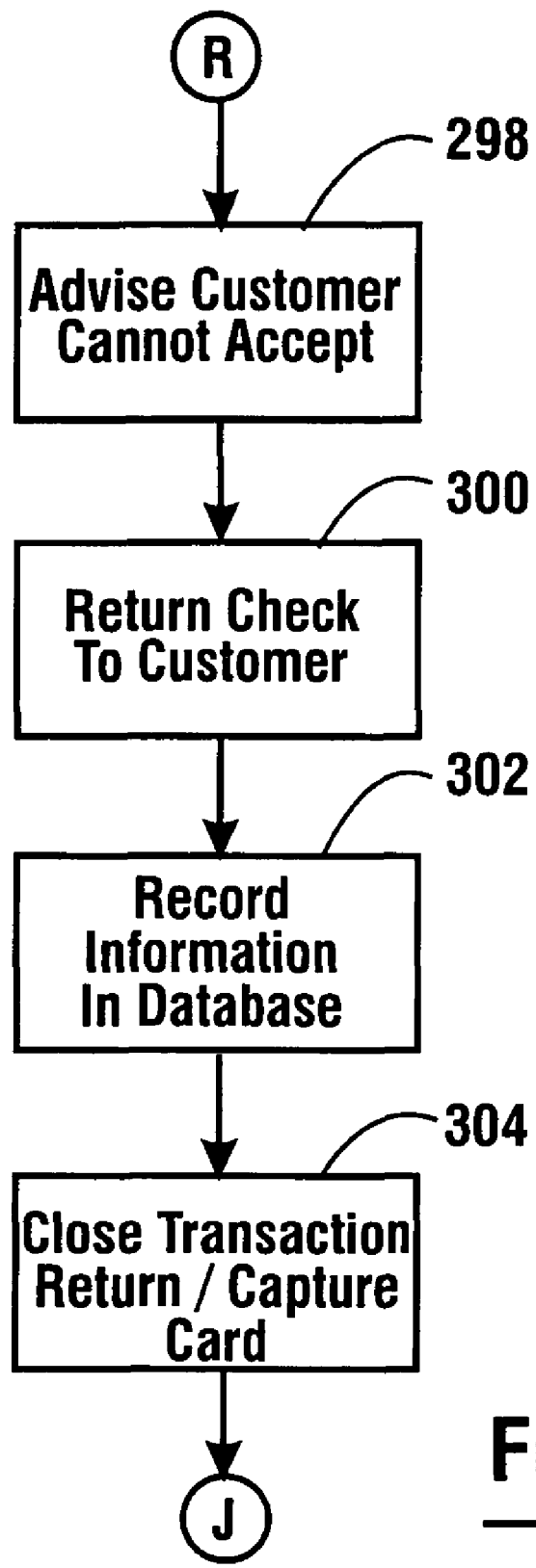
Figure 61:
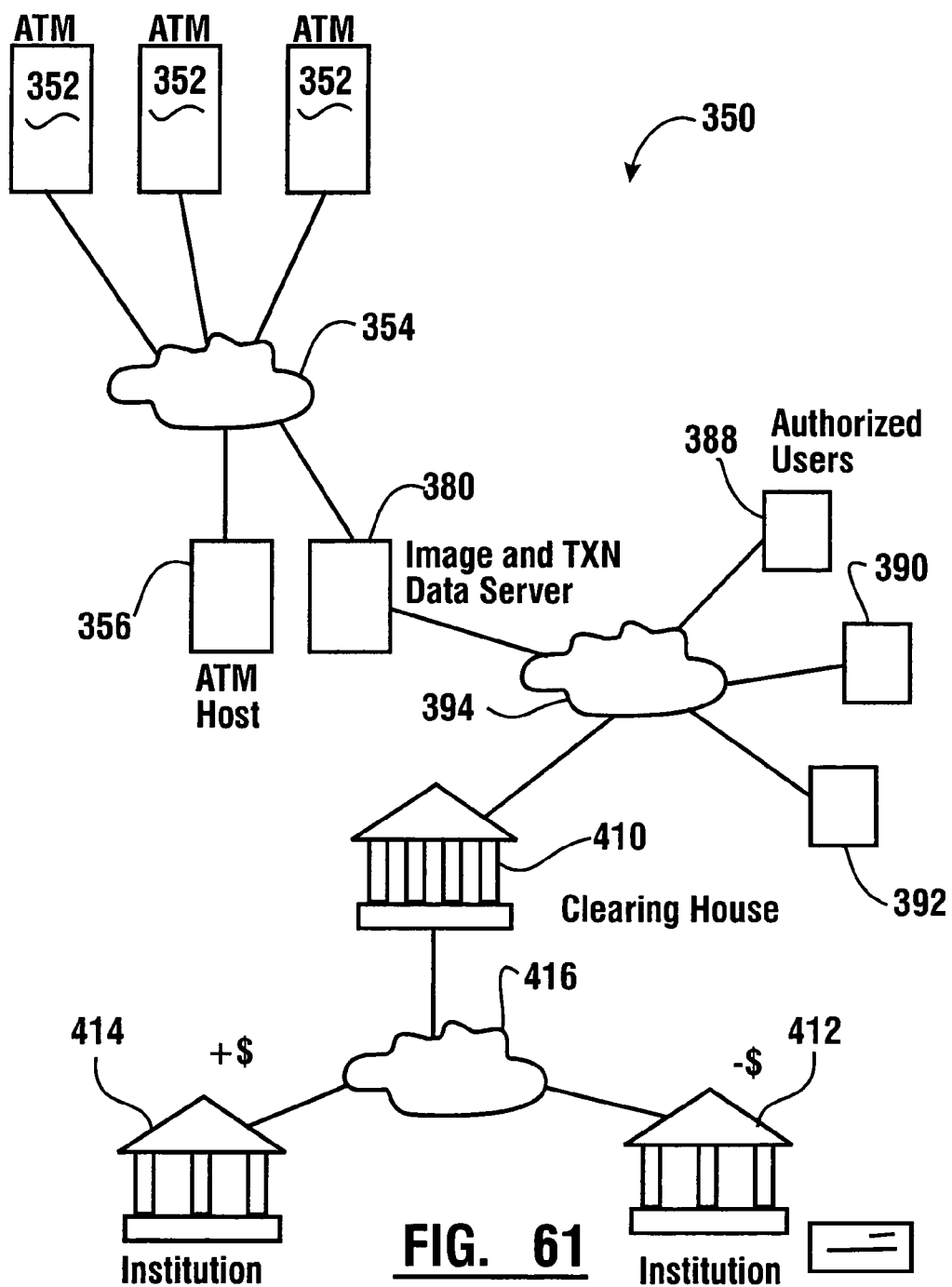
FIG. 61 is a schematic view of an alternative system for processing check transaction data and image data related to checks received through automated banking machines.
Figure 62:
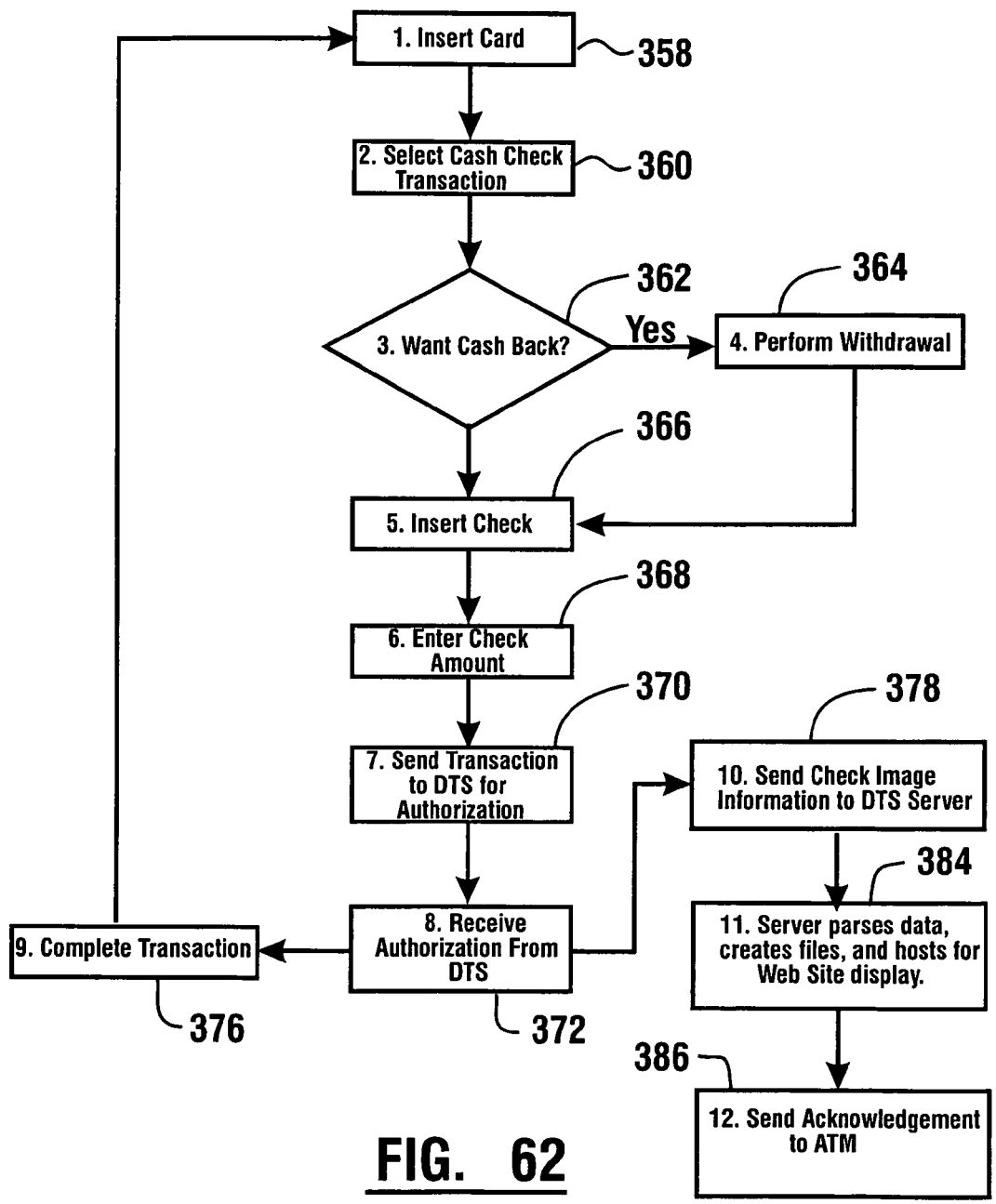
FIG. 62 is a schematic view of the logic flow associated with a check accepting transaction conducted at an exemplary automated banking machine used in connection with the system represented in FIG. 61.
Figure 65:
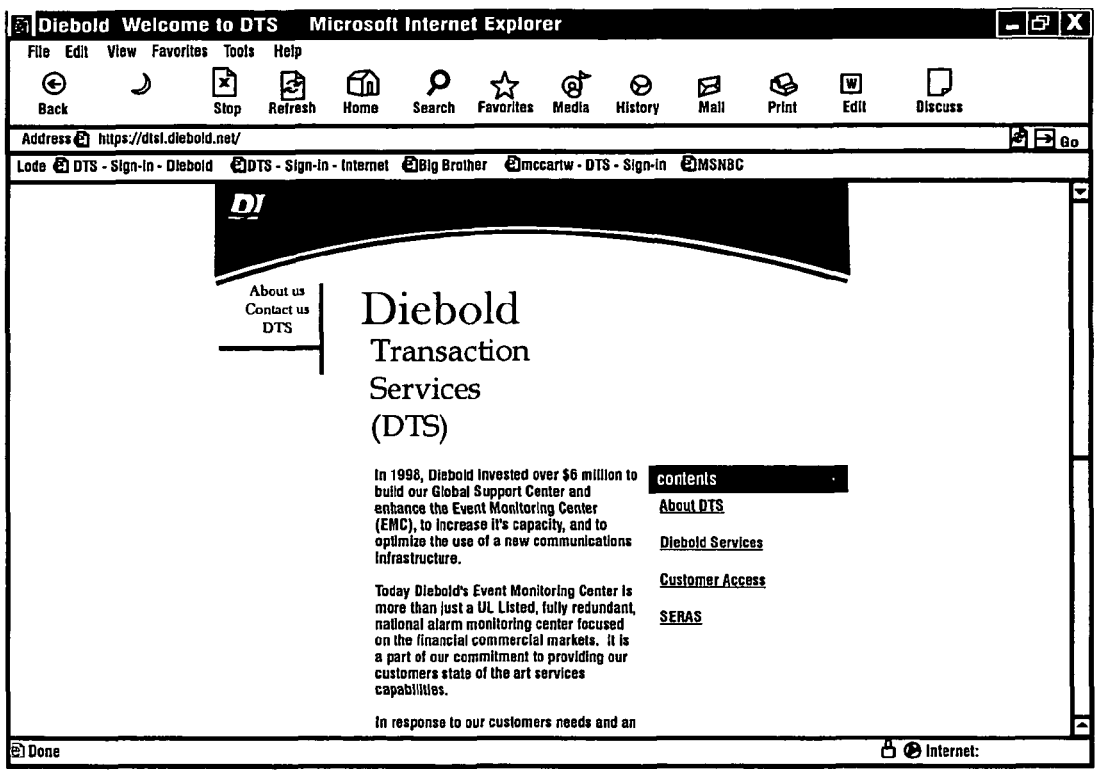
FIG. 65 is an exemplary interface screen presented by an image server to persons who may be seeking to access transaction and image data in an exemplary embodiment.
Figure 66:
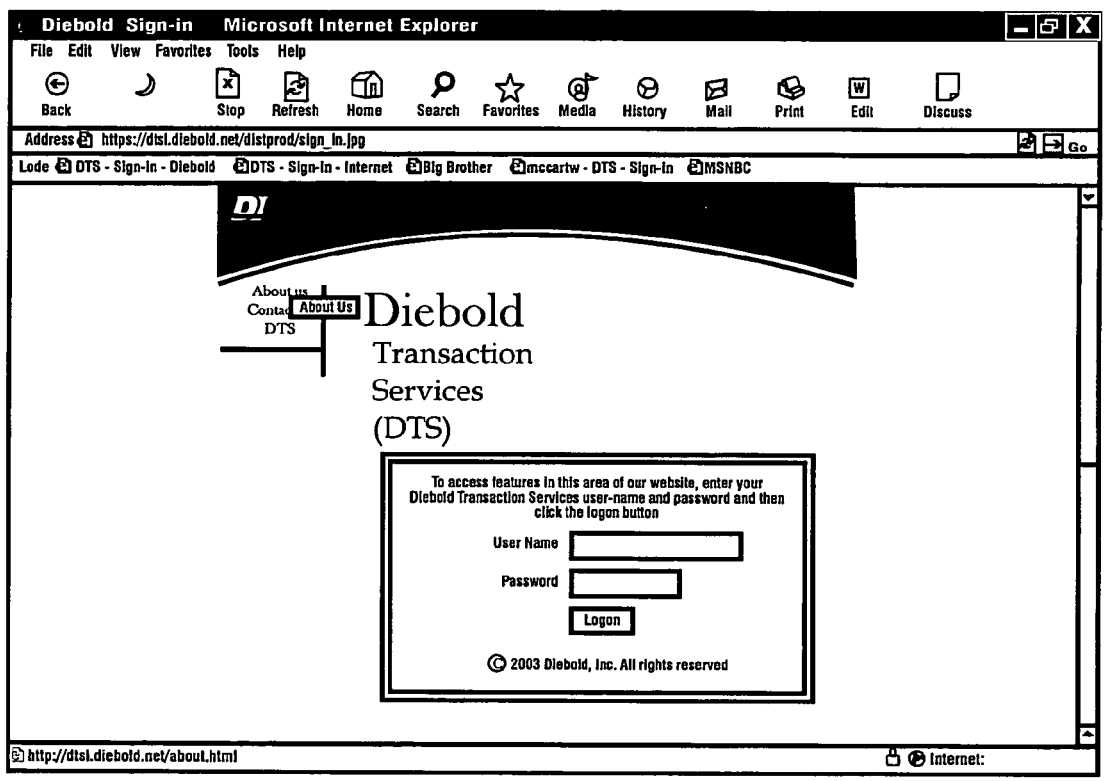
FIG. 66 is an exemplary interface screen presented by the image server to require users to identify themselves as properly authorized to access transaction and image data.
Figure 67:
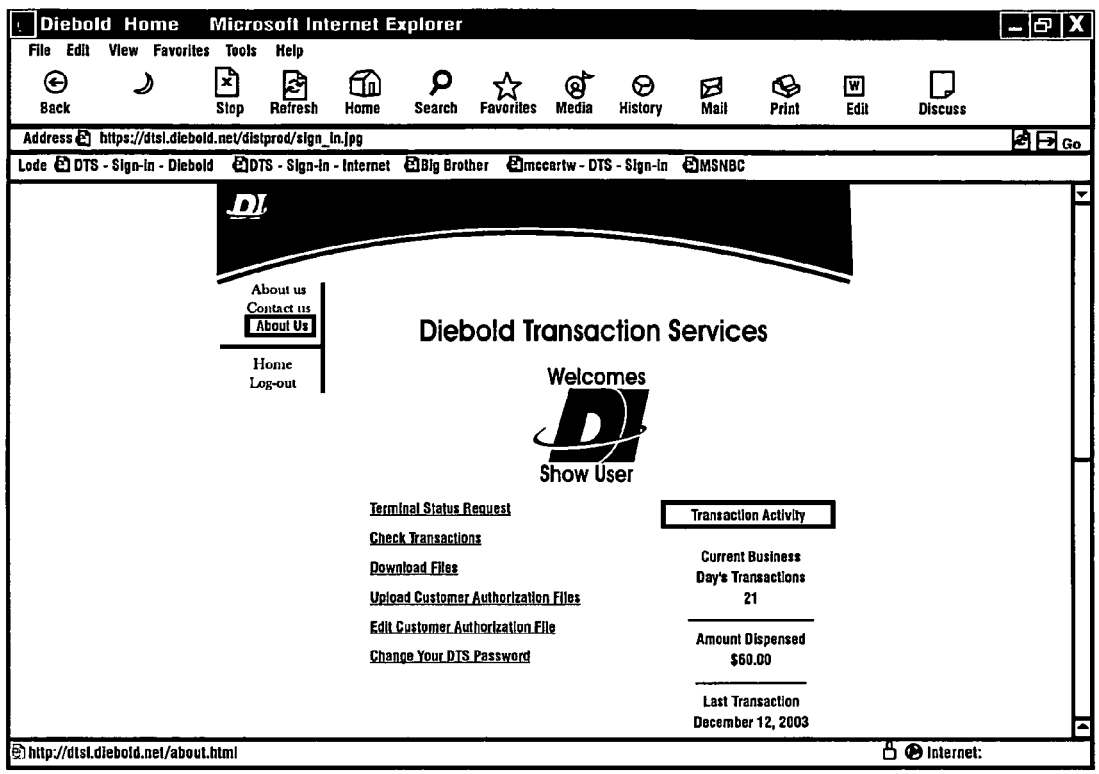
FIG. 67 is an exemplary output from the image server through which a user is enabled to access check transaction and image data.
Figure 72:
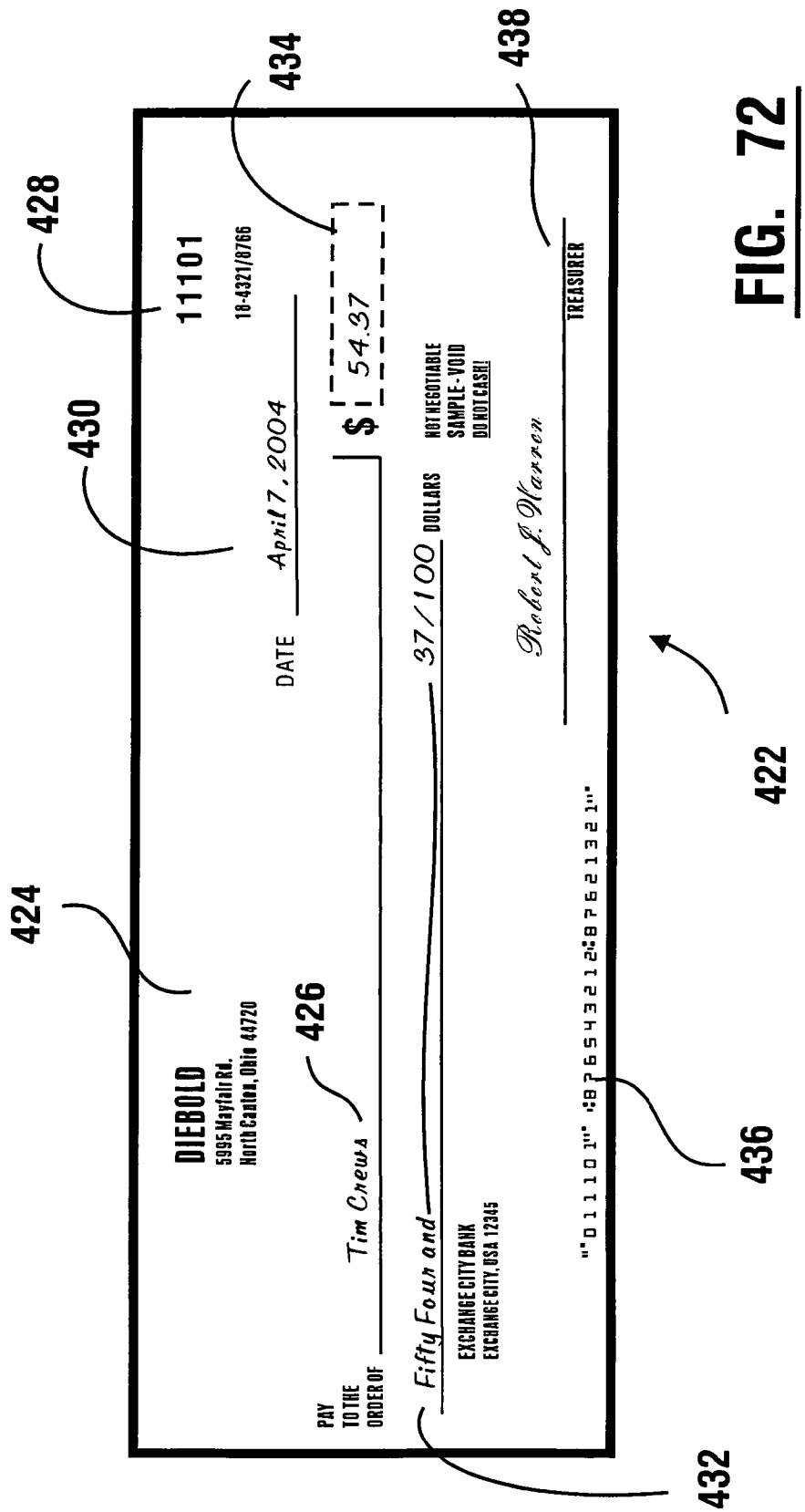
FIG. 72 is a representation of a front side of an exemplary check.
Figure 73:
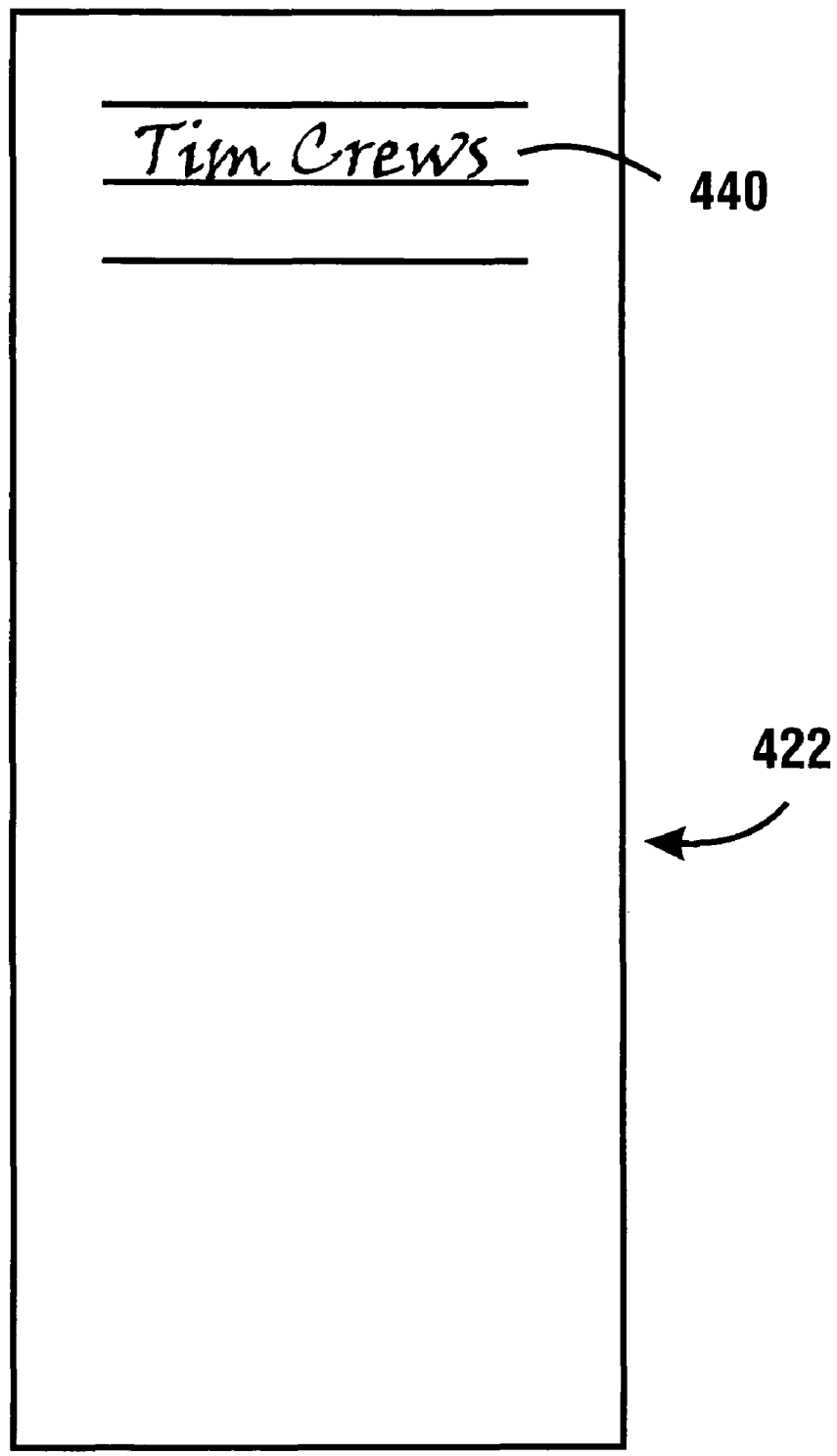
FIG. 73 is the back side of the check shown in FIG. 72.
Figure 74:
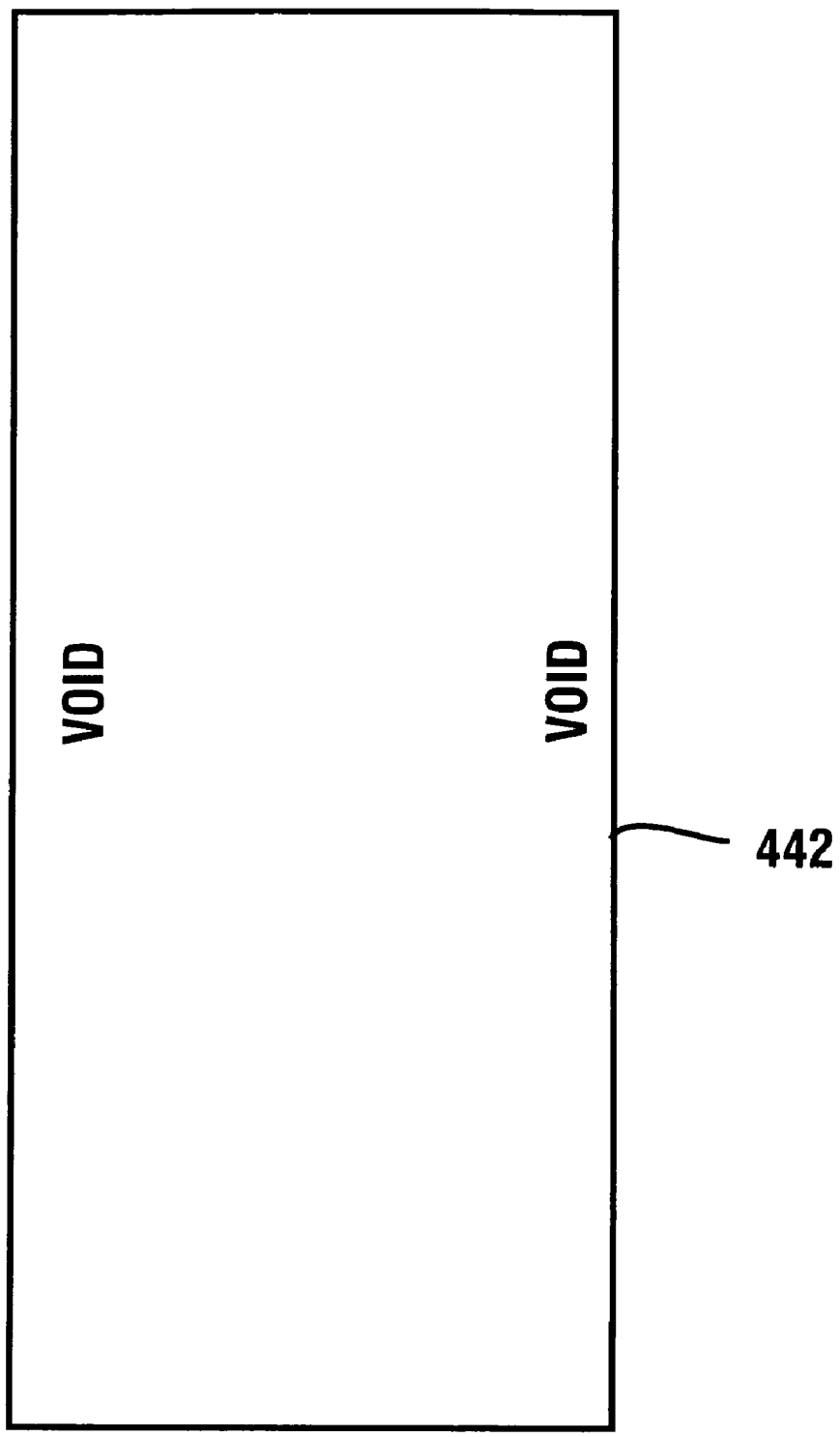
FIG. 74 is an exemplary image overlay of markings to be included on a check through operation of an automated banking machine.
Figure 75:
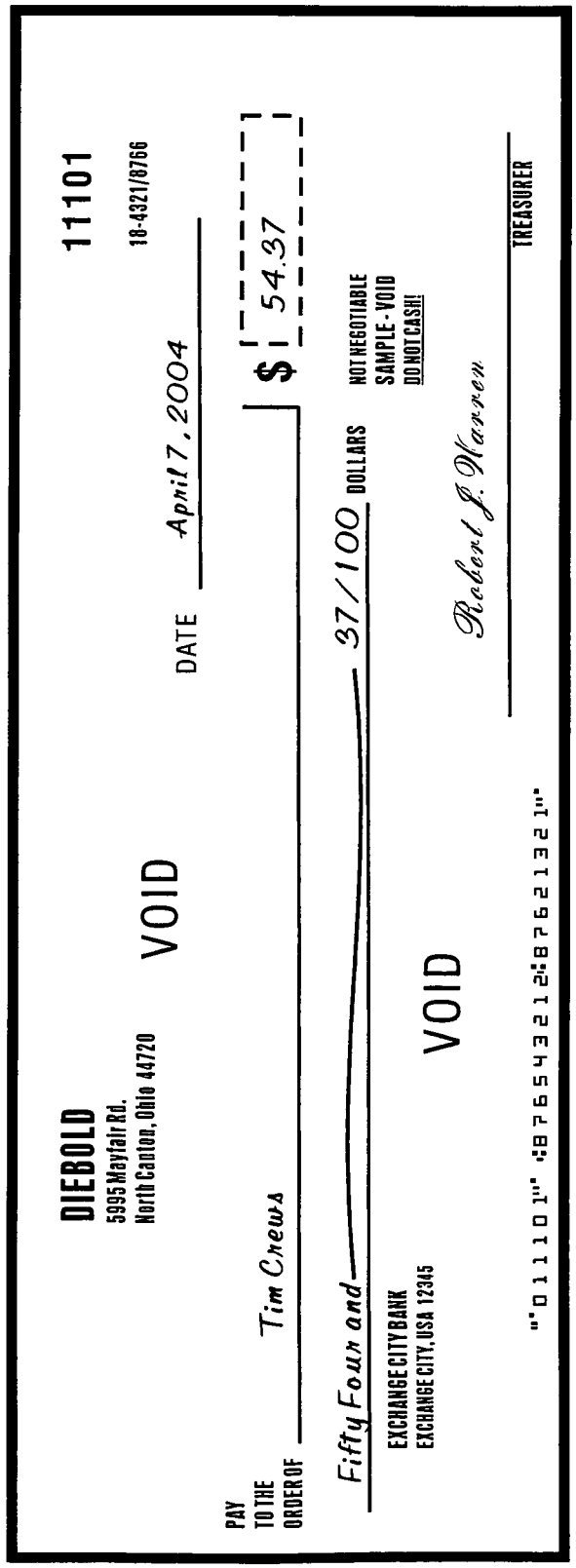
FIG. 75 is the front side of the exemplary check shown in FIG. 72 with the markings of the image overlay combined therewith.
Figure 79:
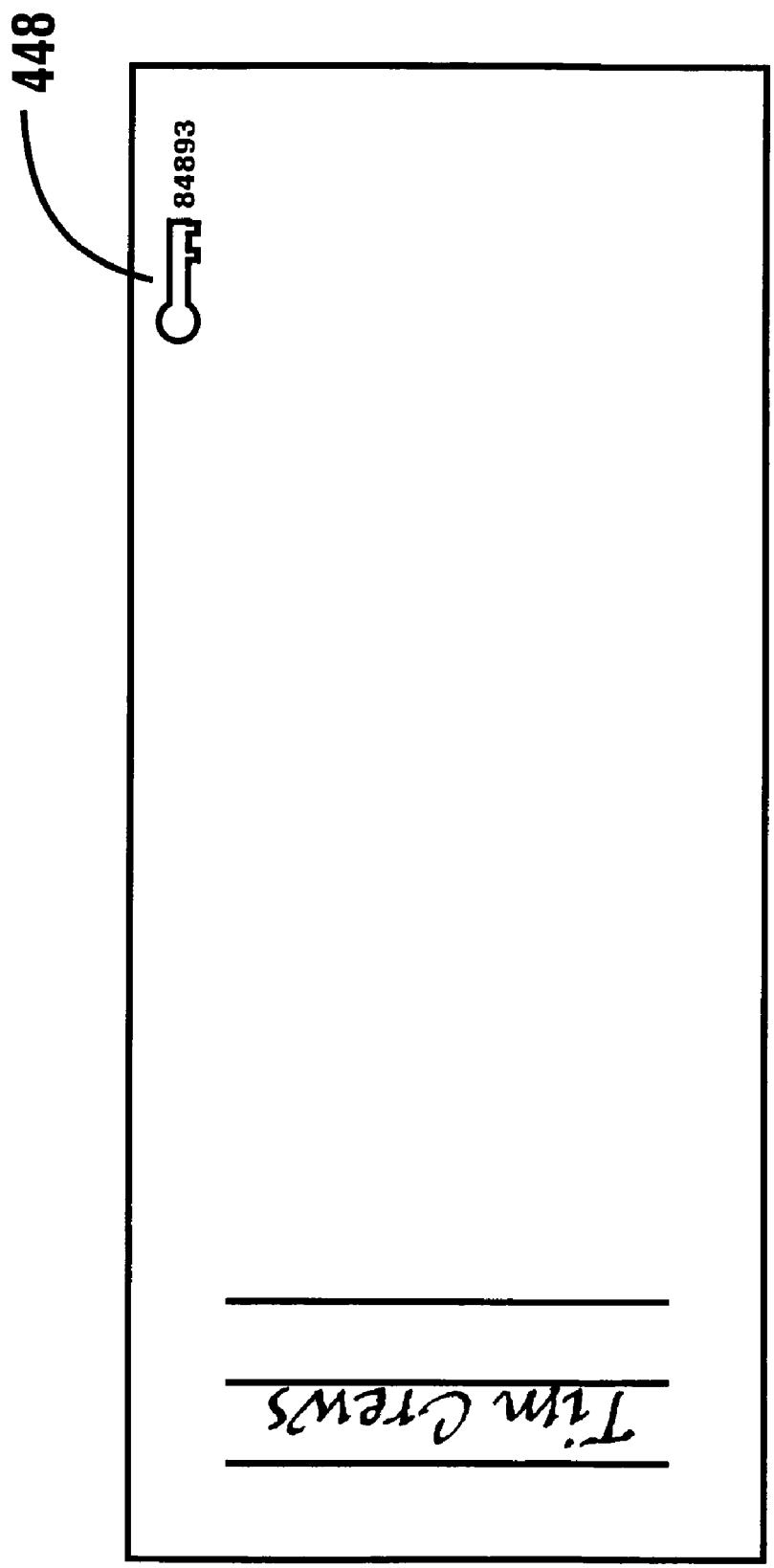
FIG. 79 is image data corresponding to the back side of the check shown in FIG. 73 including an indication that the image data includes an authenticity feature.
Figure 80:
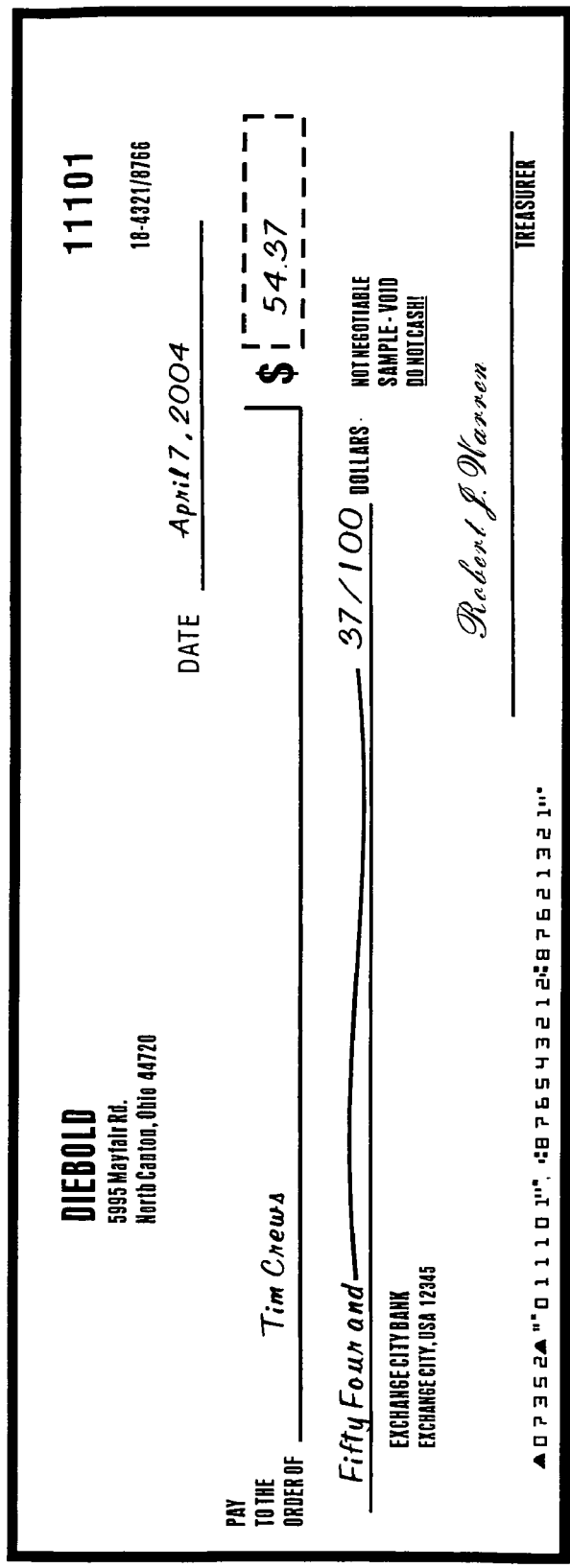
FIG. 80 represents an image of the check shown in FIG. 71 with the image data changed to include the modification in the micr line data.

FIGS. 36 and 37 show an alternative form of an inlet transport section generally indicated 59. Inlet transport section 59 is generally similar to inlet transport section 58 except as described. Inlet transport section 59 includes an upper roller 75 and a lower roller 77. In the exemplary embodiment the rollers have moveable members in the form of belt flights supported thereon. Of course it should be understood that in other embodiments, other types of wheels, rollers or other moving members may be used.

Upper roller 75 is enabled to provide a variable slip driving force through movement of a supporting member 83. Supporting member 83 is similar in the exemplary embodiment to supporting member 78 and is movable responsive to an actuator 91. The actuator 91 is operative to selectively change the orientation of the supporting member 83 to selectively change the degree of engagement between the belts moving on roller 75 and an item moving through the transport. A guide device 93 is positioned in the inlet transport section 59. In the exemplary embodiment guide device 93 includes a pair of moveable side rails 95. Side rails 95 are biased in a downward direction as shown in FIG. 37 by a spring mechanism 97. As indicated in FIGS. 36 and 37, the guide rails are tapered both vertically and transversely adjacent the end portions thereof. This facilitates movement of documents adjacent to and underneath the side rails and reduces the risk of items being caught on the side rails.

As schematically represented in FIG. 37 in the exemplary embodiment the side rails 95 are operatively connected with the actuator 91 through a connecting mechanism 99. The connecting mechanism operates such that when the drive is operated such that there is more slip between the moving member and an inserted item, the side rails 95 are biased in a downward direction. In this condition the rails are biased toward the transport path in which the document moves with a relatively greater force than when the drive is in greater positive engagement with the document. In this way the guide device 93 acts to position skewed or otherwise misaligned documents more readily relative to the transport path when the drive is in limited slip engagement. This may help to position the document rotationally or in alignment with the transport path through engagement of the deposited item with at least one of the side rails. It should further be understood that the spring biased character of the alignment device, enables the device to engage an upper surface of a document without causing damage thereto or preventing movement of the document along the transport path in response to the urging of the moving members. It should be further noted that the configuration of the exemplary embodiment of the guide device facilitates aligning of documents in the transport path when documents are moving either in the inward or the outward direction.

As can be seen from FIG. 37, when the connecting mechanism moves to place the drive in a more positive engagement with the document, the downward biasing force of the side rails is reduced. This is done because once the drive is more positively engaged with the deposited item, the item is not as readily reoriented relative to the transport path. It should be noted that although in FIG. 37 this is represented as being done using a cam and follower arrangement, in other embodiments the biasing force on the guide device may be changed through other mechanisms. In addition it should be understood that the mechanism shown is exemplary and in other embodiments the guide device may be moved away from the deposited item rather than merely having the biasing force acting on the item reduced.

In the operation of this exemplary embodiment of the invention, the depository module in which the variable force inlet transport is used accepts both single sheet-like items as well as larger items such as depository envelopes. In some other embodiments larger items consisting of multiple sheets such as passbooks may also be transported. In this exemplary embodiment larger items are generally transported through the inlet transport section 59 without a need to engage the items more firmly than is accomplished in the limited slip engagement condition of the transport. In such cases, the controller operating within the banking machine, operates in accordance with its programming and responsive to the at least one input by the user concerning the type of item being transported, to operate the inlet transport in the limited slip configuration. The computer does not cause the transport to change to the more positive engagement condition as such item passes through. In these circumstances the drive members as well as the guide device may be biased away by the force of the item passing through the transport so as to enable the particular item to pass. Of course in some embodiments if the item is sensed as hung up in the inlet transport, the controller operating the ATM may attempt to more positively engage the item so as to move it through the transport. For single sheet items, such as checks or other documents, the inlet transport section 59 may operate in response to one or more user inputs concerning the type of item being deposited, to initially provide more limited slip between the deposited sheet and the moving members. During this more limited slip condition the biasing force on the guide device acts to position the guide device more firmly in the transport path. This helps to align the document with the transport path during the period of limited slip engagement. Thereafter after the deposited item has moved further into the transport path, the supporting member 83 may be moved to provide a more positive engagement. As this is done the force applied by the guide device 93 is reduced as the more positive engagement between the moving members and the deposited item will tend to move the item in its then current orientation. Of course it should be understood that the guide device and the mechanism shown are exemplary and in other embodiments other types of devices and mechanisms may be used equivalently to accomplish the described functions. In other embodiments deposit accepting devices that only accept certain types of items that are of uniform thickness, such as checks, may be used.

The exemplary embodiment further includes a deposit holding module schematically indicated 90 (see FIG. 4). In the exemplary embodiment the deposit holding module includes a plurality of compartments which are moved relative to the outlet 50 of the transport section to enable items to be passed from the transport section into a selected compartment. The deposit holding module includes a drive 92 which is part of a translation mechanism 94 of the screw type. The translation mechanism operates to move the compartments in a generally vertical direction relative to the outlet 50 in the transport section. The deposit holding module further includes a tamping member 96 which is movable in the compartment and operates to tamp sheets held in a sheet holding compartment so as to reduce the volume of sheets held therein until the items may be removed.

Figure 11:
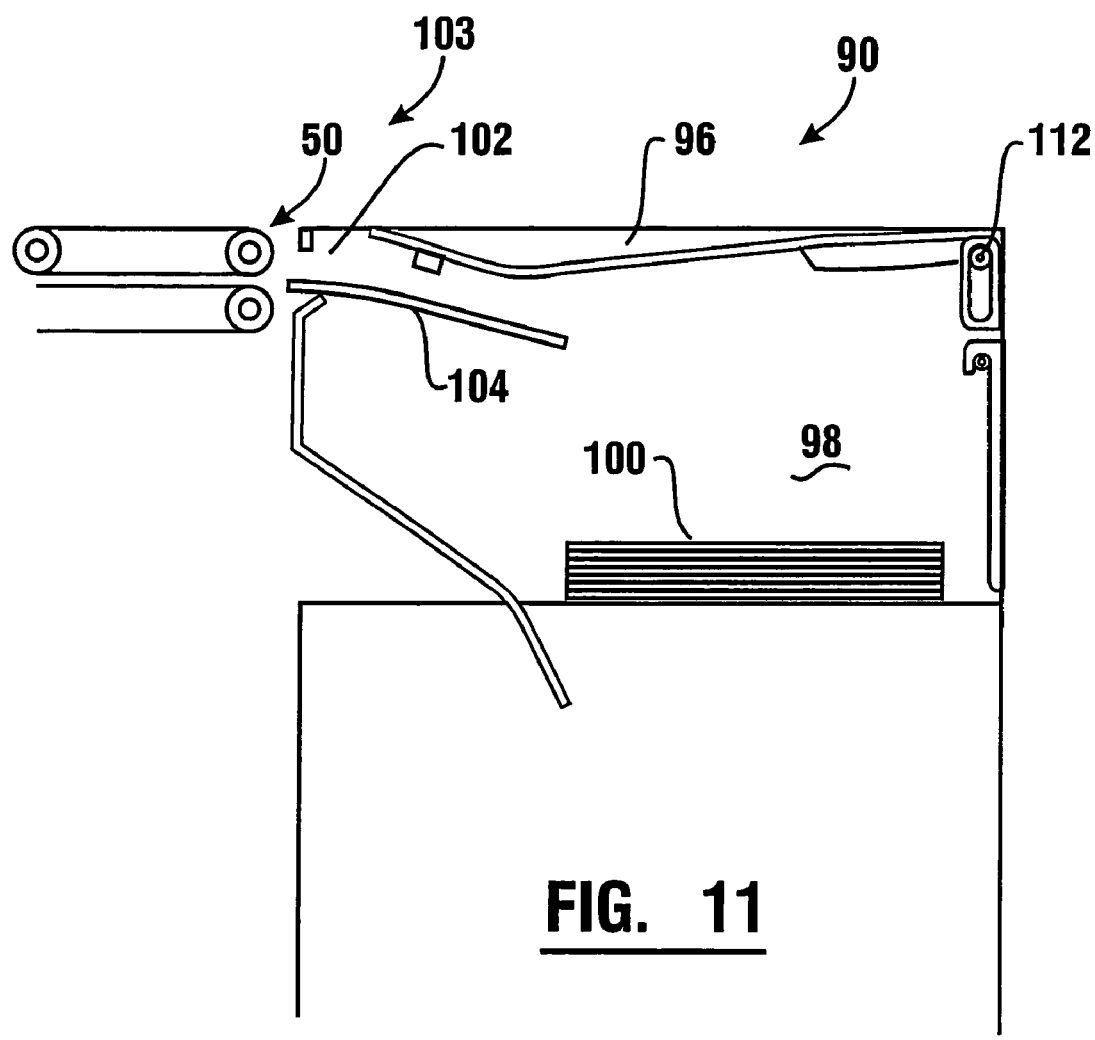
FIG. 11 is a side view of the deposit holding module of the transport apparatus shown in a position accepting a sheet into a sheet holding compartment.

The operation of the deposit holding module 90 in connection with the exemplary embodiment is represented in FIGS. 11 through 16. As shown in FIG. 11 a sheet holding compartment 98 in the deposit accepting module 90 is adapted for holding sheets 100 of one type such as cancelled checks or other items accepted in the machine. The sheet holding compartment 98 includes an opening 102 in an upper area thereof generally indicated 103. Opening 102 may be selectively moved responsive to signals from the terminal processor and operation of drive 92, to be in communication with outlet 50. The tamping member 96 may also be selectively moved upward such that a sheet leaving the transport section through the outlet such as sheet 104, may be passed into the sheet holding compartment 98.

Figure 12:
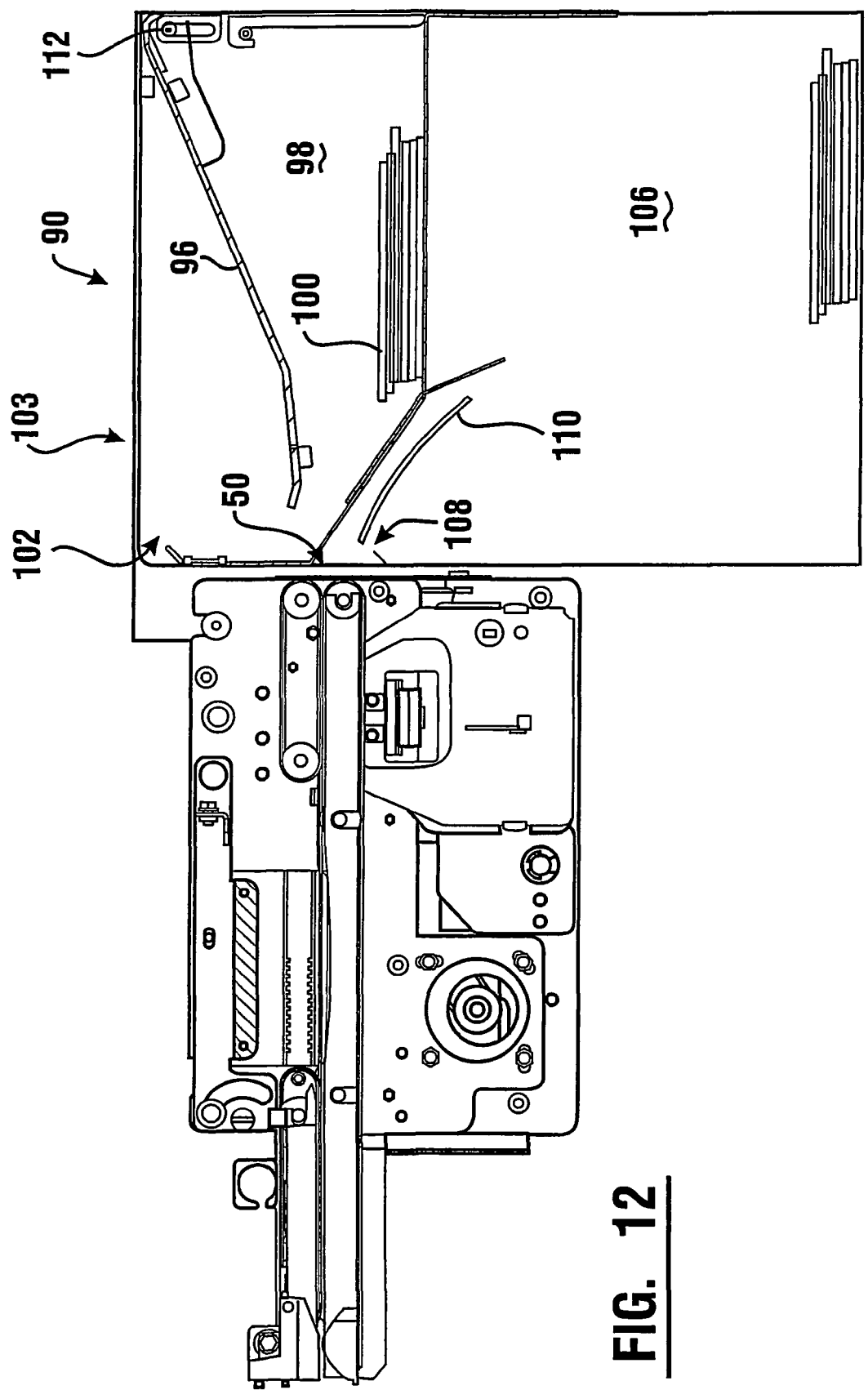
FIG. 12 is a view similar to FIG. 11 but with the deposit holding module in a condition for accepting an envelope deposit into an envelope holding compartment.

When deposit envelopes are to be accepted, the controller responsive to at least one input through the user interface indicating an envelope deposit, may operate the drive 92 to move the position of the compartments within the deposit holding module so that an envelope holding compartment 106 is placed in communication with the outlet 50 of the transport section. This is accomplished as represented in FIG. 12 by bringing an opening 108 to compartment 106 into alignment with the outlet 50. This enables an envelope deposit such as an envelope schematically represented 110 in FIG. 12 to be moved into the envelope holding compartment 106.

It should be noted that the movement of the compartments relative to the outlet enable selectively aligning the openings to the various compartments with the outlet from the transport. This minimizes the amount of handling and manipulation of the deposits that is necessary to move them through the deposit accepting mechanism. This increases reliability and speed of the exemplary embodiment. Further in the exemplary embodiment the controller is enabled to selectively move the position of the tamping member 96 relative to the sheets in the sheet holding compartment 98. The tamping member is enabled to move about a non-fixed pivot 112 between positions such as those shown in FIGS. 11 and 12. The ability to downward dispose the tamping member relative to the sheet stack enables compressing the stack of sheets 100 that may be present in the sheet holding compartment so as to reduce their volume. This enables accepting sheets more reliably and holding more sheets in the sheet holding compartment before the accumulated sheets need to be removed. It should be noted that the movement of the tamping member 96 is achieved through an operative interconnection with the translation mechanism which moves the compartments as shown in FIG. 4. Further the tamping member is connected to the body of the deposit holding device through the nonfixed pivot connection so that the action of the tamping member is enabled to accommodate various sized stacks of sheets within the sheet holding compartment.

Figure 13:
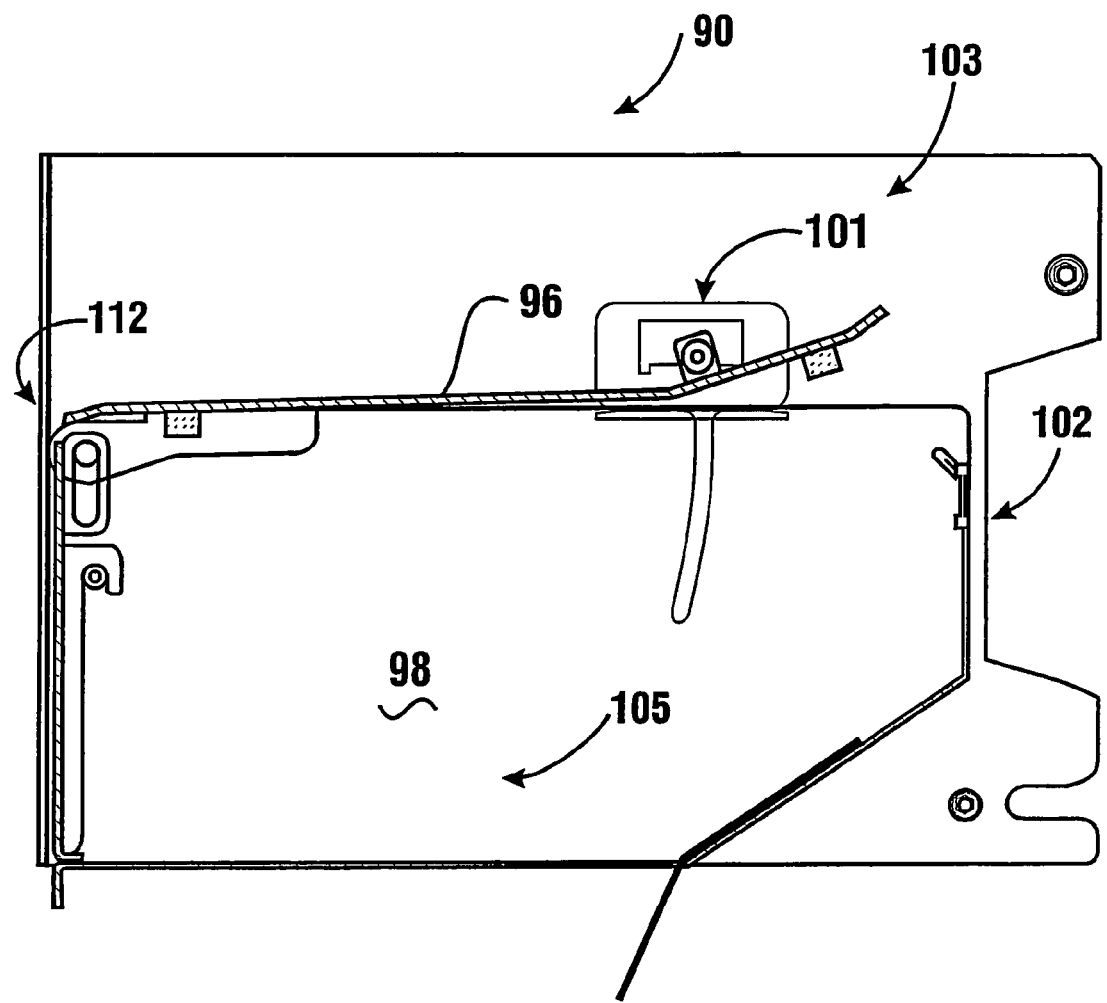
FIG. 13 is an opposite side view of the deposit holding module from that shown in FIG. 11 with a tamping member in a position for accepting entry of a sheet into the sheet holding compartment.

FIG. 13 shows an opposite hand view of the sheet holding compartment 98 and the tamping member 96. As shown in FIG. 13 the tamping member may be moved upward to a position that enables sheets to enter the sheet holding compartment when the outlet of the transport section is moved adjacent to the opening to the sheet holding compartment. In the exemplary embodiment the tamping member is moved responsive to a moving mechanism indicated 101. The exemplary moving mechanism includes a member which engages an aperture in a wall member. The wall member in the embodiment shown remains relatively stationary. Vertical movement of the module 90 is operative to selectively move the tamping member. In the position shown in FIG. 13 in which an item may be accepted into compartment 98, the tamping member is positioned so that the opening 102 is disposed between the tamping member and a closed end of the compartment generally indicated 105.

Figure 14:
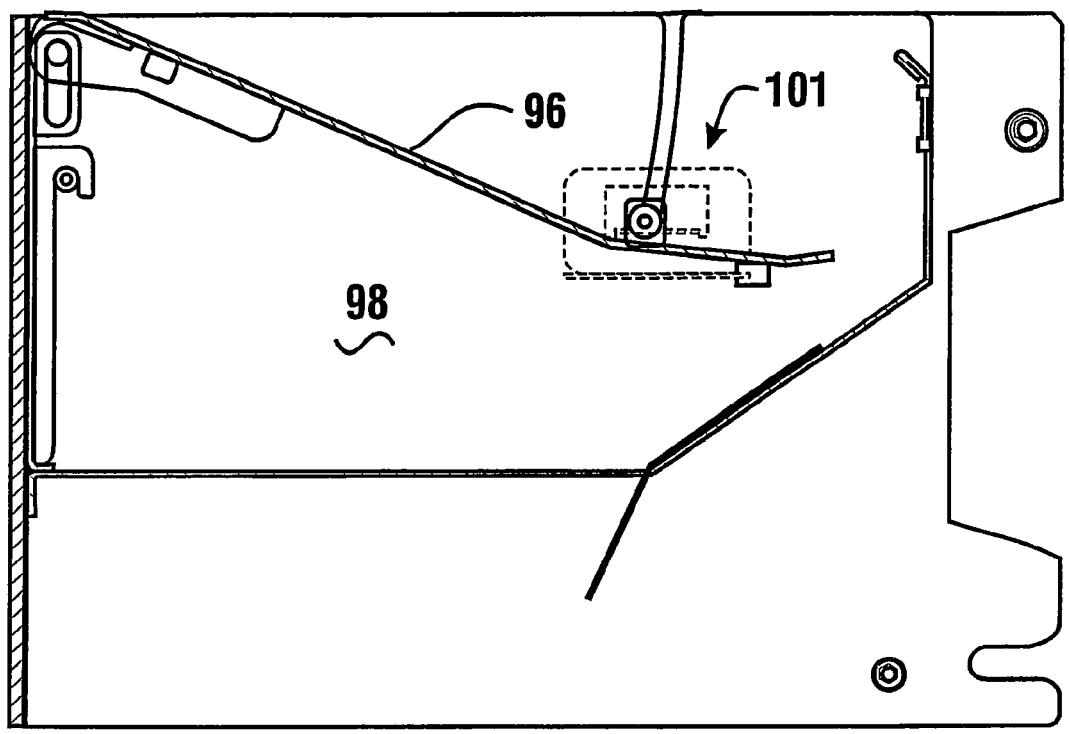
FIG. 14 is a view similar to FIG. 13 but with the tamping member disposed downward to tamp sheets held in the compartment.

FIG. 14 shows a similar view of the sheet holding compartment with the tamping member moved downward toward closed end 105 so as to facilitate the tamping of sheets which may be stored therein. An exemplary embodiment further includes the capability for authorized personnel to remove accumulated sheets from the sheet holding compartment. As will be appreciated the deposit holding module is positioned within the interior of the ATM 10.

Preferably the interior of the ATM 10 includes a secure storage area or chest to which access is limited by a suitable locking mechanism. U.S. Pat. No. 5,970,890 which is incorporated herein by reference, shows such a chest and locking mechanism. Only authorized personnel are enabled to access this area through use of an appropriate combination, key or other secure technique.

Figure 15:
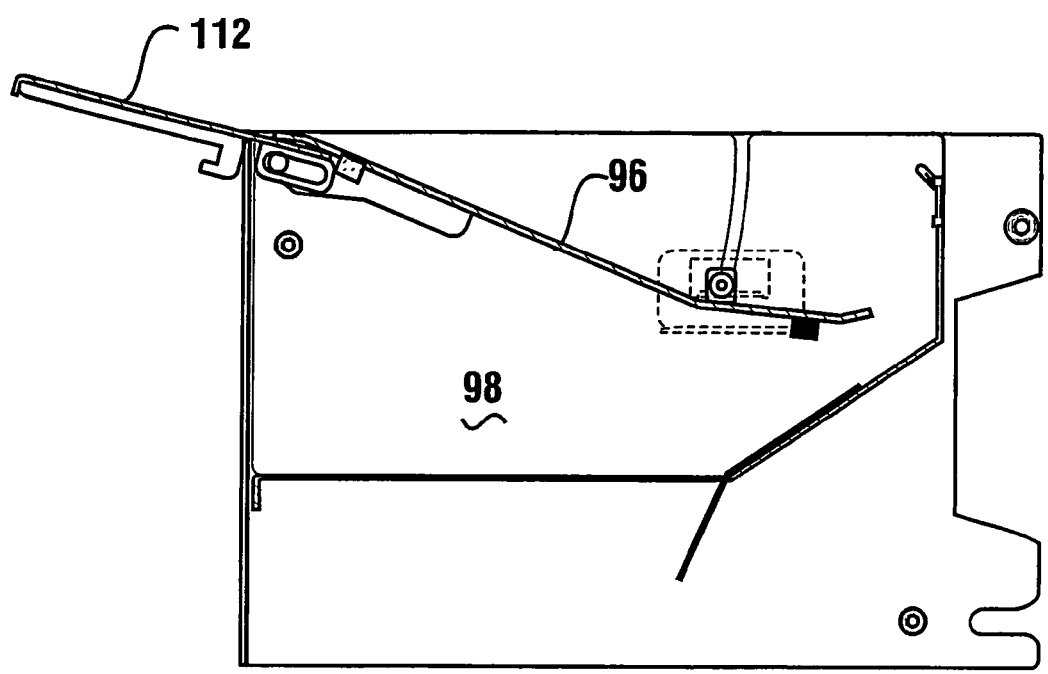
FIG. 15 is a view similar to FIG. 14 but with an access door to the sheet holding compartment in an open position.
Figure 16:
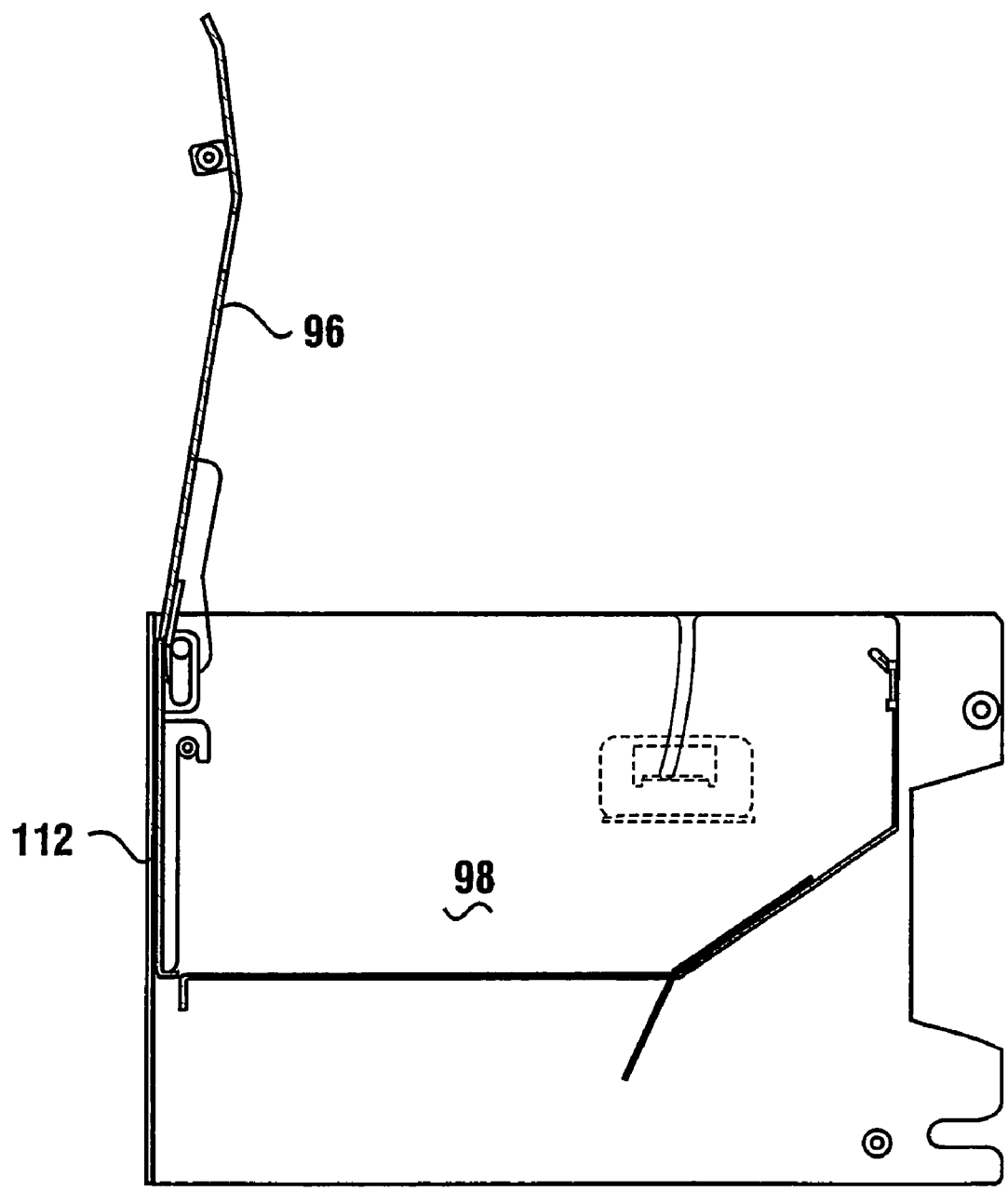
FIG. 16 is a view similar to FIG. 14 but with the tamping member disposed upward from the sheet holding compartment to enable a user to access sheets therein.

Authorized personnel who have gained access to the interior of the ATM chest are enabled to remove accumulated sheets from the sheet storage area through an access opening. This is done in the exemplary embodiment by opening an access door 112 as represented in FIG. 15. In the exemplary embodiment the access door is on an opposed side of the compartment from the inlet opening through which items enter the compartment, but in other embodiments other arrangements may be used. Door 112 in some embodiments may have in connection therewith an additional locking mechanism. Such locking mechanisms may include key, combination, electronic, biometric or other opening types. Alternatively it may be sufficient to enable door 112 to be opened by a user who has gained access to the interior of the machine. Alternatively embodiments may enable a user to operatively disengage the tamping member 96 from the mechanism which normally controls its movement and to allow the tamping member to be moved upwardly away from the sheet storage compartment 98. This is represented in FIG.

16. Such upward movement may enable an authorized user to gain access to the sheet holding compartment for purposes of removing sheets. In the embodiment shown both the capability of opening a door 112 and moving the tamping member to access accumulated sheets may be provided.

Likewise suitable mechanisms for accessing accumulated envelope deposits may be provided. This may include for example access openings and/or access doors for accessing accumulated envelopes in the envelope holding compartment 106. Alternatively the envelope holding compartment may be provided as a removable enclosure which may be removed entirely in a locked condition from the machine and replaced with a suitable empty deposit holding container. Various approaches to removing deposited items from various storage compartments may be used in alternative embodiments.

In alternative embodiments provisions may be made for permanently defacing and/or destroying accepted items such as cancelled checks. This may be appropriate, for example, in situations where an electronic image of the check has been captured and the electronic image serves as an image replacement document for the paper check. In such embodiments, after the check has been imaged either immediately or after a determined holding period, the cancelled check may be suitably destroyed. Various methods for destruction may include, for example, shredding, chemical treatment, incineration or other approaches. Of course combinations of such approaches may also be used. Further in some exemplary embodiments provision may be made to transfer the remnants of destroyed checks out of the housing of the banking machine and into a suitable waste receptacle. Such a waste receptacle may be provided, for example, at the rear of the machine or other location that can be connected to an opening from the machine. Thus for example in one exemplary embodiment checks that have been imaged and cancelled may be treated with a suitable ink or other material to obliterate information on the check, and the check shredded by a suitable paper shredding mechanism. Thereafter the remnants of the check may be transported by rollers, belts, air pressure or other suitable means out through an opening of the machine into a waste receptacle. This exemplary approach enables the machine to run for an extended period of time without having to remove cancelled checks from the interior of the housing. Of course it should be understood that this approach is merely exemplary and in other embodiments other approaches may be used.

Figure 17:
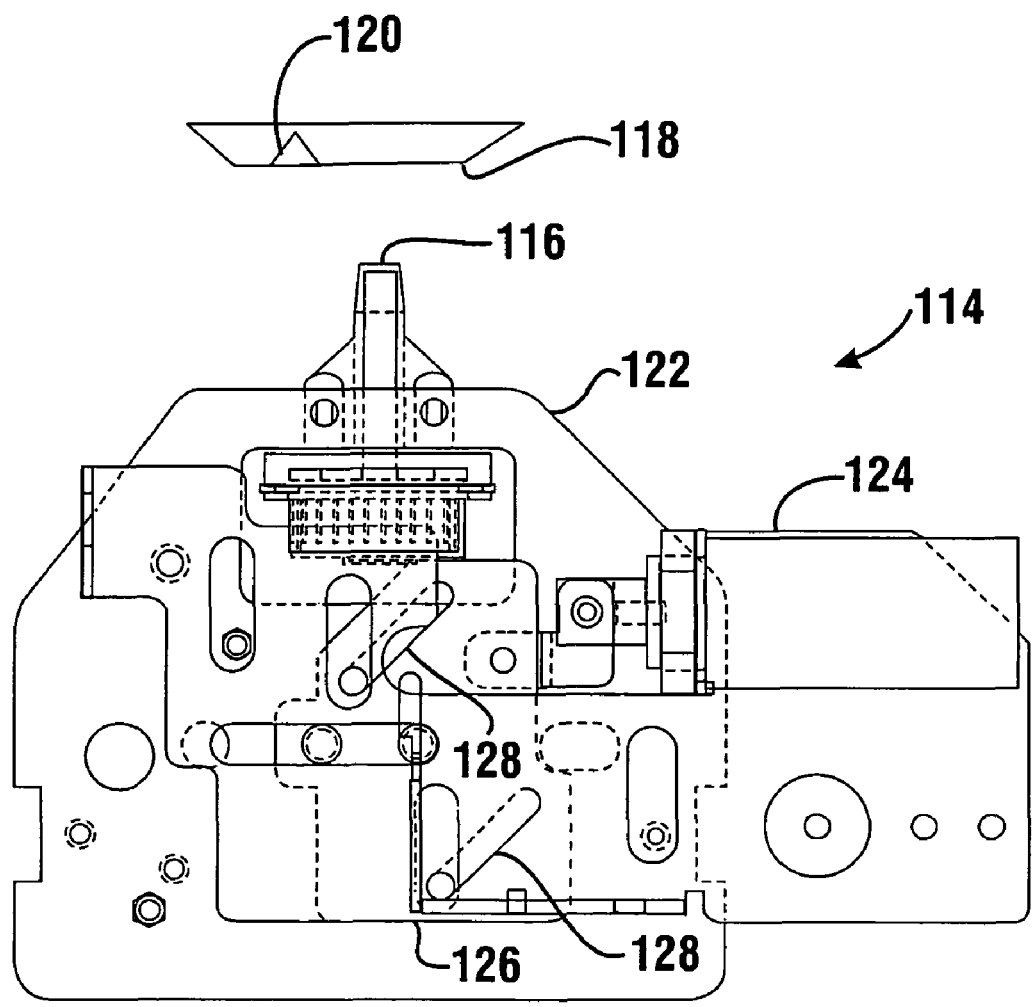
FIG. 17 is a side view of a printing mechanism used in connection with the deposit accepting apparatus shown in FIG. 4 with the printer shown in a non-printing position.
Figure 18:
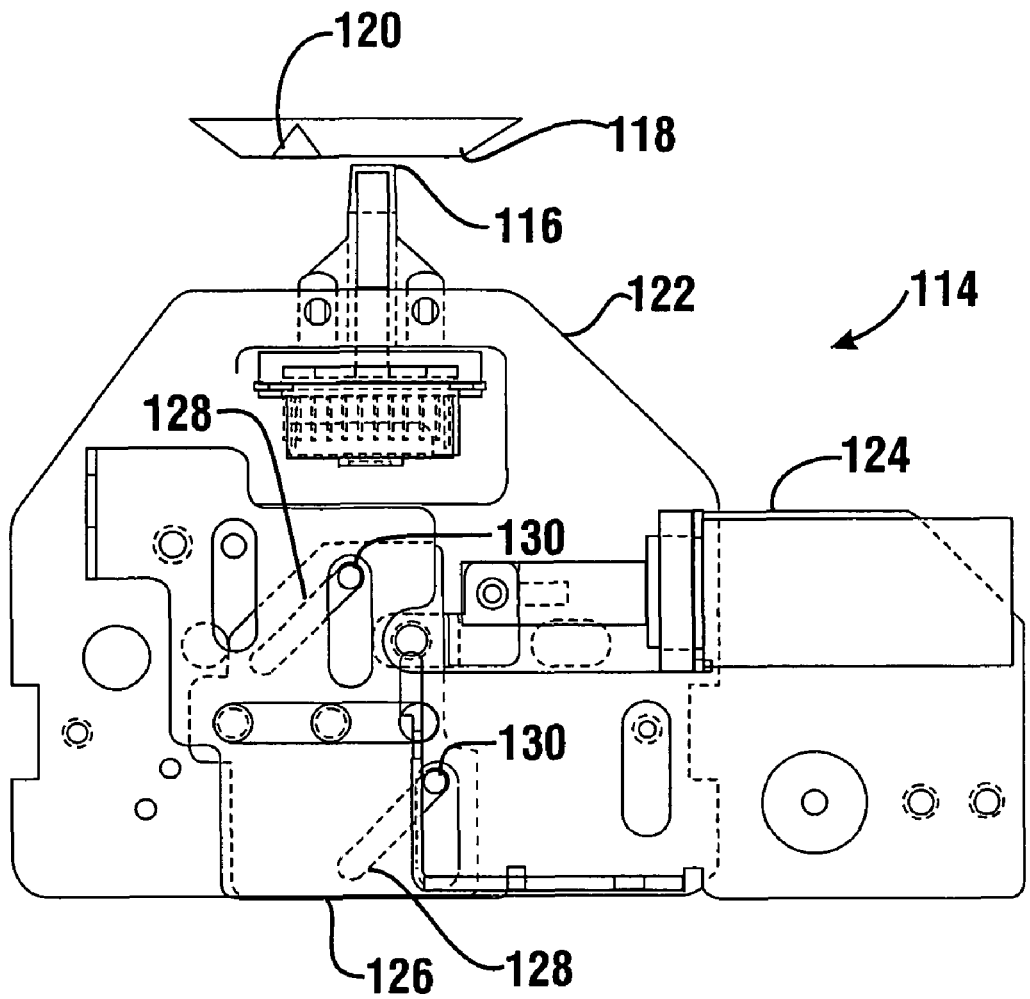
FIG. 18 is a view similar to FIG. 17 but with the printing mechanism shown in a printing condition.

Referring again to FIG. 4 the exemplary embodiment of the IDM 44 includes a printing mechanism 114. Printing mechanism 114 which is shown in greater detail in FIGS. 17 and 18 is operative to enable printing indicia on deposited items responsive to control of the terminal processor. Such printing may be used in the exemplary embodiments to print identifying indicia on deposited envelopes or documents. Alternatively such printing may be used to indicate the cancellation or acceptance of items placed into the machine by a user and which are stored in the machine or returned to the user from the machine. It should be understood that although in the exemplary embodiment the printer is shown on a first side of the transport path, in other embodiments the printer may be positioned on an opposed side of the transport path. Alternatively printing devices of similar or different types may be positioned on both sides of the transport path in some embodiments.

In the exemplary embodiment the printer 114 is operative to minimize the risk that the printer will snag or damage deposited items that are moved adjacent to the printer in the transport section 46. Printer 114 includes a suitable print head 116. Print head 116 is directed towards items which may pass the printer mechanism in the transport section. A registration platen 118 is positioned in opposed relation of the print head on the upper section of the transport. As schematically represented, a sensor 120 is positioned adjacent to the print head so that the presence of deposited items adjacent thereto may be sensed.

In the exemplary form of the printer mechanism the print head 116 is mounted in supporting connection with a support plate 122. The support plate is movably mounted relative to a frame of the IDM 44. An actuator 124 is selectively operative responsive to signals from the terminal processor to move the support plate 122 and the print head 116 selectively adjacent to or away from deposited items which move through the transport section. The actuator 124 accomplishes such movement of the print head by moving a bracket 126 in a generally horizontal direction. Bracket 126 includes angled guide slots 128 therein. Pins 130 extend in the angled slots and are operatively connected to support plate 122. The movement of bracket 126 between the positions shown in FIGS. 17 and 18 are operative to cause the print head to move between non-printing and printing positions.

In the exemplary embodiment one or more sensors represented schematically as a sensor 120 are used to indicate to the terminal processor that the deposited item is moved adjacent to the printer. The terminal processor operates to then move the printer into the printing position at a time when the leading edge of the deposited item has already moved to a position beyond the print head 116. This reduces the risk that the deposited item will snag on the print head and will be torn or otherwise damaged by engagement therewith. It should be understood that printing may be conducted with the items moving through the transport section 46 in either direction adjacent to the print head. In this way indicia may be printed on deposited items as they move either toward or away from the deposit holding module. This enables printing on items which are either stored in the machine or which are accepted, marked or otherwise printed upon and then returned to the customer. It should further be understood that the particular configuration of the printing mechanism is exemplary and in other embodiments of the invention, other types of printing mechanisms may be used. For example in other embodiments ink jet printers, printer rollers, stamper type printers, transfers of printed labels or other types of devices which are operative to apply indicia to items (all types of which are referred to herein as printers) may be used.

Figure 5:
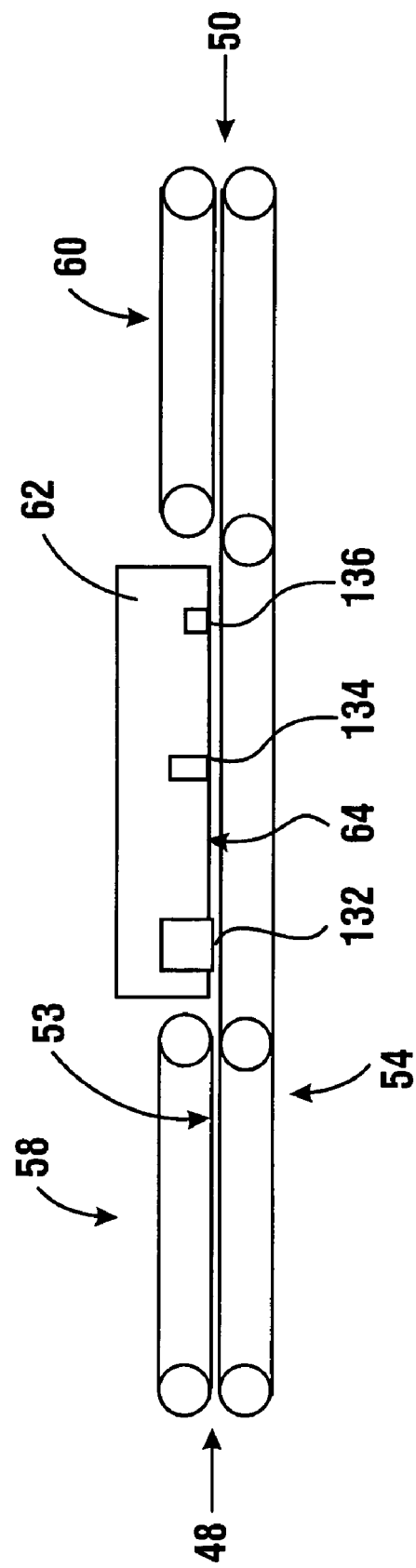
FIG. 5 is a schematic view of the deposit accepting apparatus shown in FIG. 4.
Figure 6:
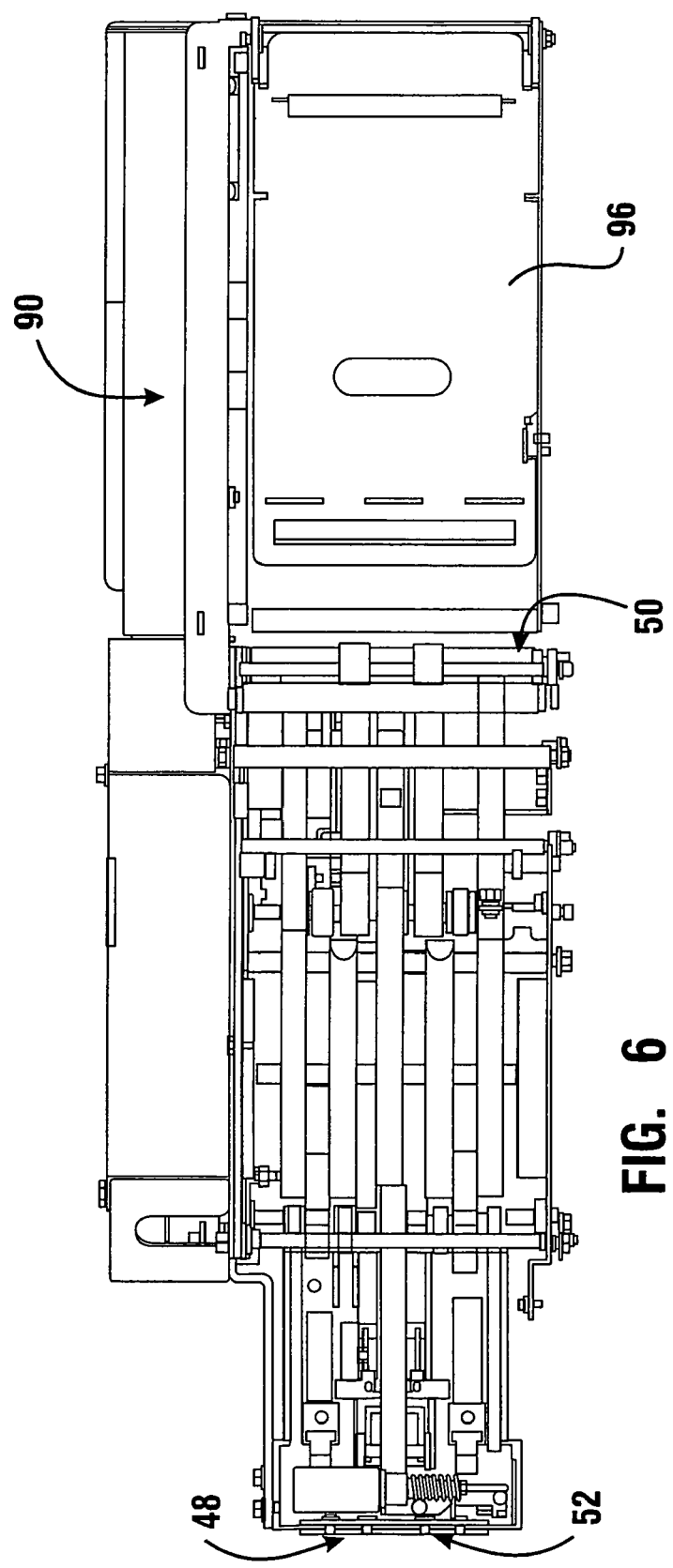
FIG. 6 is a top view of the deposit accepting apparatus shown in FIG. 4 with the analysis module removed therefrom.

In the exemplary embodiment the analysis module 62 includes optical scanning sensors schematically indicated 132 in FIG. 5. The analysis module may serve as a check imaging device. Scanning sensors 132 are operative to generate an image of documents that move adjacent to the analysis module. In the exemplary embodiment the scanning sensors scan generally the entire transverse path through which documents may travel in the transport section. The scanner in the described exemplary embodiment generates radiation in the visible range and resolves images at approximately 240 dots per lineal inch. The scanning sensor is also operative to have a focal length which corresponds to the distance that the scanned documents are disposed from the surface of the sensor as they pass the analysis module. In the exemplary embodiment the scanning sensor 132 has a focal length of about 4 millimeters. Of course in other embodiments other types of scanning sensors may be used. Such other types of sensors may include emitters and sensors for sensing radiation at discrete frequencies in the visible or non-visible range. In addition multiple sensor types may be used on one or both sides of documents. Various types of sensors may be used.

The sensors of the exemplary embodiment are operative to produce image data which is electronic data which corresponds to a full and/or partial image of one and/or both sides of a check or other item.

The exemplary analysis module further includes magnetic sensing elements 134. The magnetic sensing elements 134 are operative to sense the magnetic properties of documents which pass adjacent to the analysis module. In the exemplary embodiment the magnetic sensing elements 132 include a plurality of discrete transversely spaced magnetic sensors. The magnetic sensors generally each cover a relatively small portion of the overall transport width. The sensors are arranged in sufficient proximity so that substantially the entire transverse width of the document path is sensed. The analysis module further includes a magnet 136. Magnet 136 may comprise a unitary or a plurality of permanent or temporary magnets. In the exemplary embodiment permanent magnets are used. The permanent magnets operate to activate magnetic properties of magnetic inks on documents passing adjacent to the analysis module. These magnetic properties may then be more readily sensed by the magnetic sensing elements 134.

It should be understood that the particular sensors and devices in analysis module 62 are exemplary. Other embodiments may include only an optical scanner or magnetic sensing elements, or different or additional types of scanning and sensing elements. For example embodiments may include scanners for reading bar code or other types of optical indicia. Other embodiments may include devices for reading magnetic flux reversals that may be encoded in a magnetic media. Some embodiments may include read heads for reading micr data and/or other types of magnetic characters. Other embodiments may include devices which are operative to detect the presence of holograms or to read non-visible radiation, fluorescent inks, or other types of coding. The particular activating and sensing devices included in a particular analysis module will depend on the particular types of documents to be verified and analyzed through operation of the particular embodiment.

Figure 3:
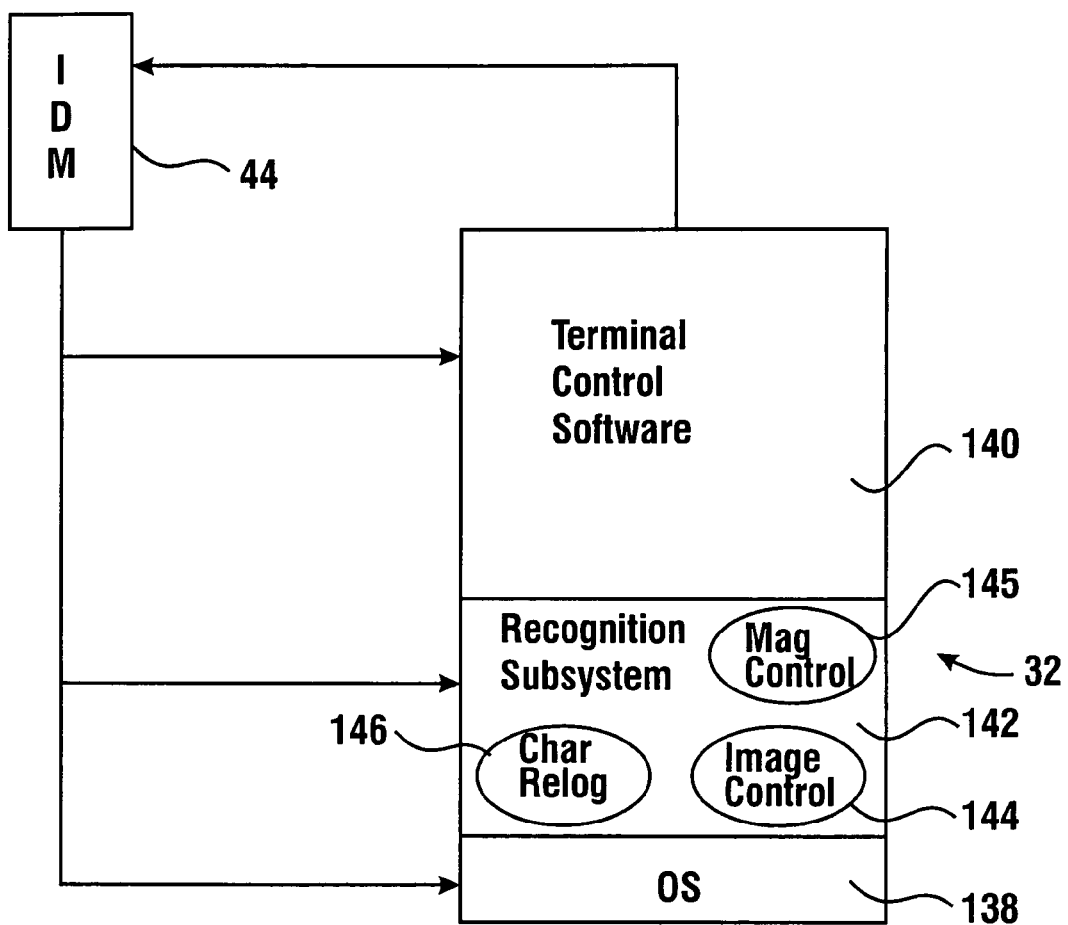
FIG. 3 is a schematic view of software components used in connection with the automated banking machine shown in FIG. 2.

FIG. 3 shows schematically the relationship of the IDM 44 with exemplary software components which operate in the terminal processor 32. The terminal processor 32 has operating therein an operating system layer schematically indicated 138. The operating system layer 138 may include operating systems such as OS/2® from IBM, Windows NT® or Windows XP® from Microsoft, Linux or other suitable operating system. The operating system communicates with a terminal control software layer 140. The terminal control layer in the exemplary embodiment operates to control numerous aspects of the ATM functions including aspects of the transaction function devices. As schematically represented in FIG. 3 the terminal control software sends messages to and receives messages from devices associated with the IDM 44. The messages are generally operative to control mechanical components of the IDM as well as to receive inputs from sensors and other devices which operate in connection with the deposit accepting function.

The exemplary software architecture also includes a recognition subsystem software layer 142. The recognition subsystem layer also communicates with the operating system layer and the terminal control software layer to control and receive inputs from the IDM. The recognition subsystem layer includes software which functions to control, manipulate and analyze image data received from the IDM as schematically represented by image control component 144. Another software component of the exemplary recognition subsystem layer accomplishes character recognition. This character recognition component schematically represented 146 in the exemplary embodiment is operative to identify micr coding and numerical characters. In the exemplary embodiment the character recognition software includes software that is commercially available from Carreker Corp. Other providers of character recognition software include Parascript, Mitek and A2iA. Of course other suitable recognition software may be used. The recognition subsystem 142 of the exemplary embodiment also includes a magnetic data control component schematically represented 145 that is operative to analyze and to manipulate data received from the magnetic sensing elements and to check for correlation between the magnetic data that is sensed and the optical data which is obtained from the scanning activity. Of course these software functions are exemplary and these functions may be programmed differently and other or additional software components may be included in other embodiments.

Figure 19:
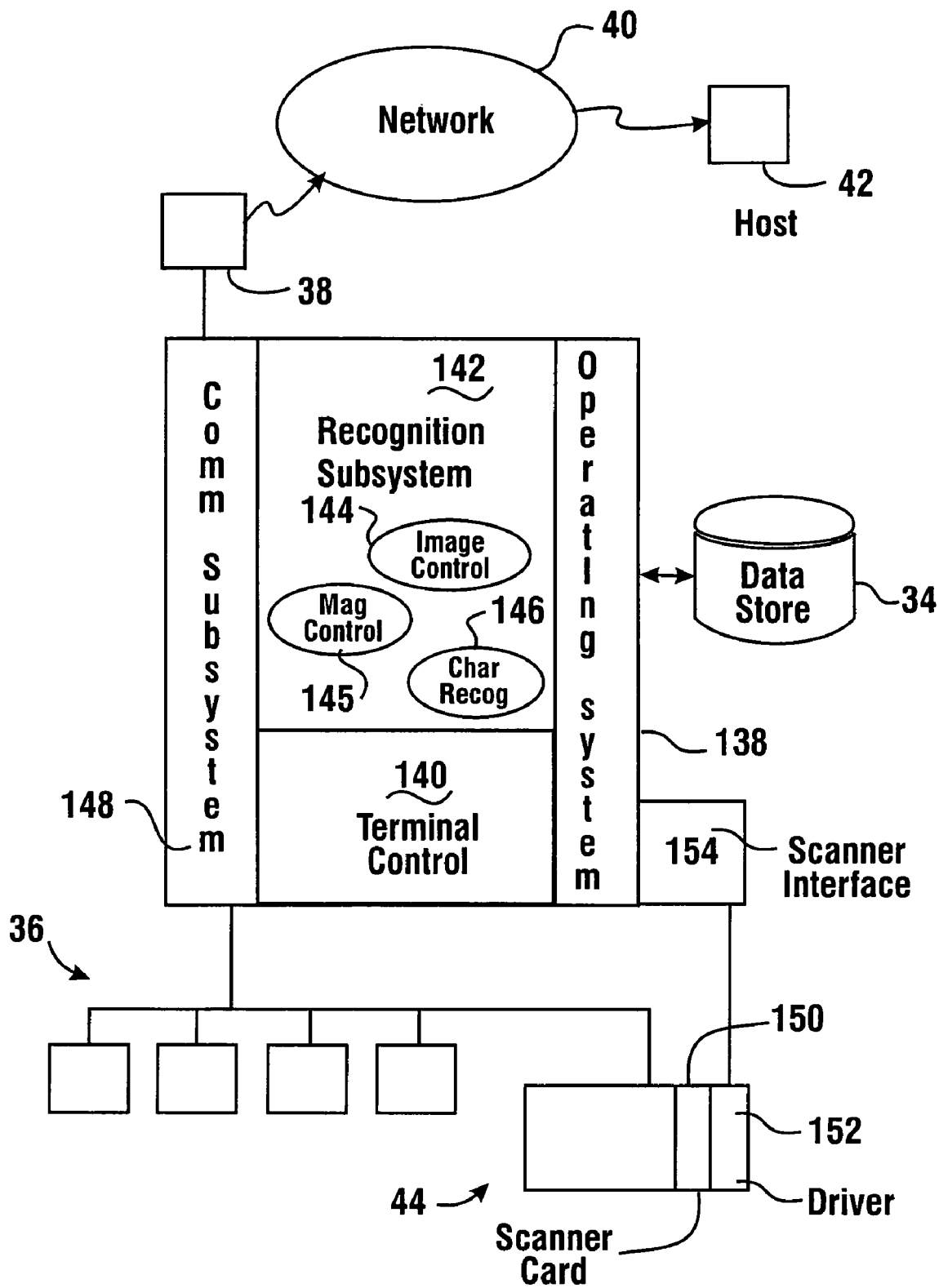
FIG. 19 is a schematic view of hardware and software components used in connection with the deposit accepting apparatus and the automated banking machine of the exemplary embodiment.

FIG. 19 shows the exemplary schematic components of the software in greater detail. As can be appreciated the operating system 138 in the terminal processor is in operative connection with one or more data store 34. The data store may include the information concerning programs, transactions and other data or program logic which are necessary to control the operation of the ATM. In addition the data store includes the data used in connection with analyzing and verifying documents. As later discussed the data store may also include image data corresponding to the images of documents that have been accepted by the system. The software in connection with the exemplary terminal processor also includes a communication subsystem layer 148. The communication subsystem layer enables communication between the various software components of the system. The communication subsystem layer also communicates with the various transaction function devices 36 through appropriate interfaces or drivers. In addition communication layer 148 in the exemplary embodiment also enables communication through appropriate interfaces 38 to one or more communications networks 40 and the host computers 42 which are operatively connected thereto.

In the exemplary embodiment the IDM 44 includes an onboard computer processor which resides on a scanner card 150. The scanner card 150 further receives and operates upon data from the optical scanning sensors 132 on the analysis module 62. The scanner card further has included thereon a driver schematically indicated 152. The driver is operative to communicate through a scanner interface 154 with the operating system 138 and the data store 134. The driver 152 is also operative to control the scanning activity which is carried out by the scanner card 150. In the exemplary embodiment the driver is also operative to control the allocation of memory for use in the scanner operation. This assures that adequate memory is available in RAM to carry out the capture, storage and analysis of the scanning data as required to analyze and authenticate documents which may be input in the machine.

Figure 20:
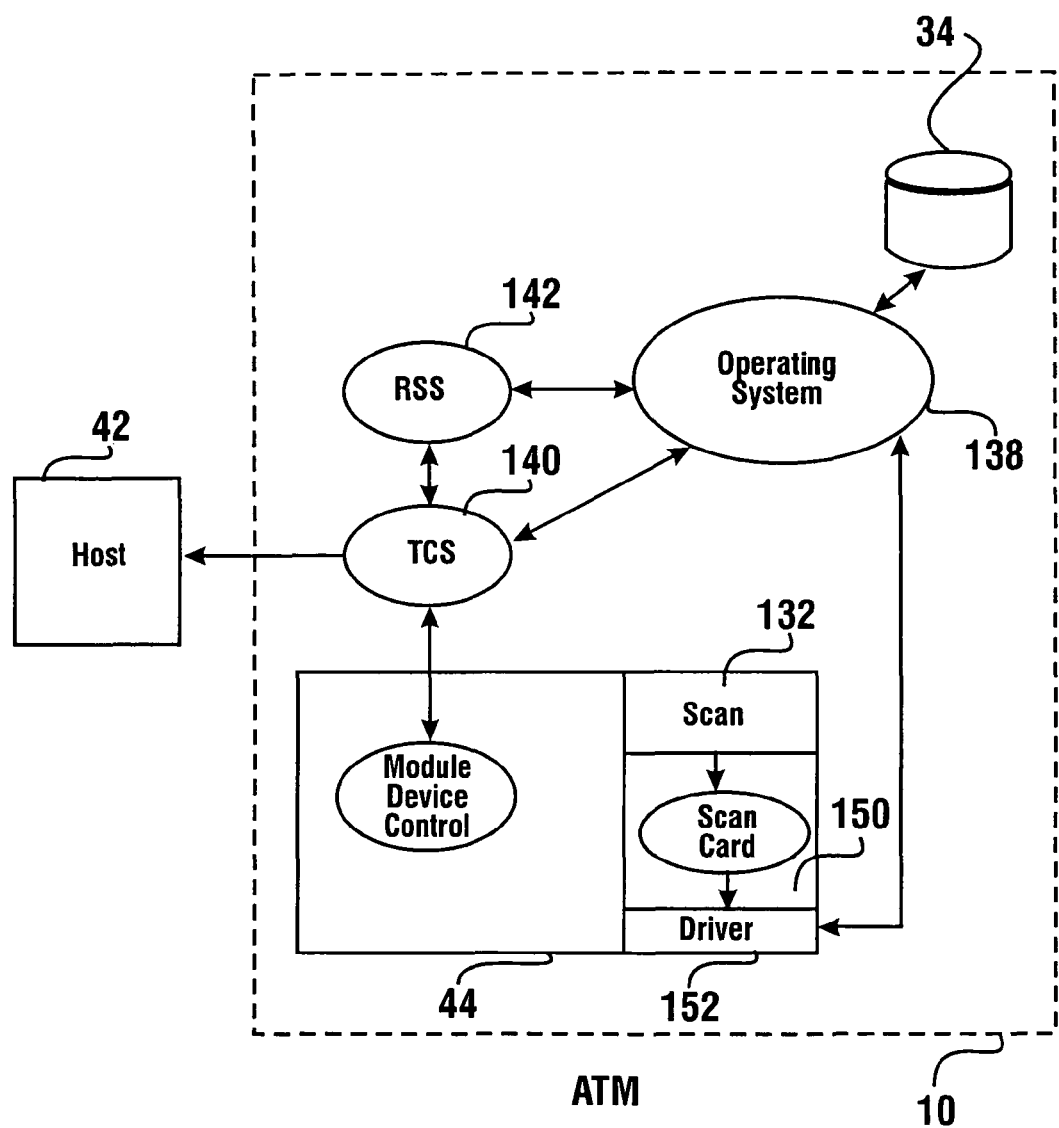
FIG. 20 is a schematic view of the interaction of components used in connection with accepting documents in the deposit accepting mechanism.

As represented in FIG. 20 in the exemplary embodiment, when a document is to be scanned the terminal control software 140 causes the particular document to be moved as desired in the IDM 44. This is done by controlling the various devices which sense and move documents in and through the module. The terminal control software 140 operates in conjunction with the recognition subsystem 142 which provide instructions to the scanner card 150 to scan documents using the optical scanning sensors 132 during the appropriate time periods. The data from the scanning process and magnetic sensing operations is returned through the operating system to memory. The data is then recovered from memory and manipulated responsive to the image control and character recognition features of the recognition subsystem 142. The results of the manipulation and analysis of the scanned data is then communicated through the terminal control layer to a remote host 42. This is done in this exemplary embodiment using transaction request and authorization messages of a type that can be handled within the framework of ATM transaction processing systems. However it should be understood that in other embodiments of the invention other approaches to authenticating documents, verifying transactions and communicating with remote computers may be used.

The operation of exemplary embodiments will now be explained with reference to some exemplary deposit transactions. A first deposit transaction to be described will be the deposit of an envelope type deposit into the ATM 10. This is accomplished through the execution of the logic flow which is represented in FIG. 29.

In this exemplary transaction the ATM first acts to receive identifying data from the customer. This may include for example the input of an article such as a credit card which is read by a card reader in the machine. Such cards commonly include information such as a user's name and/or primary account number ("PAN"). This primary account number includes data which can be used to identify the user and/or the user's institution and account number. Further when the user is operating the ATM with a debit card the user is required to input further identifying data to verify that the user is authorized to access the account. Usually this verifying input includes a personal identification number ("PIN"). The PIN may be input through an input device such as a keypad. In alternative embodiments other types of identifying data may be input. This data may include for example biometric data such as iris scans, retina scans, thumbprints, facial features, voice prints or other features of a user or an article carried by the user that provides identifying data.

At the second step in the logic flow of the exemplary embodiment, the machine operates to receive from the user at least one input which corresponds to the transaction type that the user desires to conduct. Often this is done in response to the terminal processor presenting the user with an output on the display which corresponds to various transaction options. The user is then enabled to select a transaction by providing an input through one or more buttons or other input devices. In this example the user will indicate that the transaction type to be conducted is an envelope type deposit.

In a third step the ATM is operated to receive from the user an input amount that is associated with the deposit transaction. Generally this will be provided as an input in numeric form to a keypad or other input device on the machine. This numeric input which may be provided in response to a prompt on a display screen or other output device, will generally correspond to the value of the funds or other items included in the envelope deposit.

The terminal processor operating the ATM acts in a fourth step to cause an authorization request to be sent to the remote host computer. This authorization request in the exemplary embodiment includes data representative of the identifying data, the transaction type and the amount involved. This authorization request is sent through one or more networks to the appropriate host computer which may authorize the transaction. The host computer then operates in response to the authorization request to determine if the identifying data validly corresponds to an authorized user and/or account. The host computer also determines if the customer is authorized to conduct the requested transaction. The host computer then operates to formulate a transaction response which is sent from the network back to the ATM.

The ATM receives the response from the host computer at a fifth step. If the transaction is not authorized the instruction data included in the response message operates to cause the ATM to advise the customer that the transaction cannot be performed, and then the terminal processor performs steps to close the transaction. In this example it will be presumed that the response message returned includes instruction data indicating that the transaction is authorized and may proceed. In response to receiving the response message indicating that the transaction may go forward, the terminal processor operates in accordance with its programming to execute the steps necessary to cause the ATM to accept the envelope deposit. In a sixth transaction step the terminal processor is operative to cause the gate 52 to open at the inlet 48 to the transport section 46. This enables the user to access the transport section.

In a seventh step the terminal processor is operative to cause the deposit holding module 70 to move so that the envelope holding compartment 106 is in alignment with the outlet 50 of the transport section 46. The terminal processor is then operative to run the transport of the IDM 44 such that the envelope may be accepted therein. As previously explained sensors may be provided adjacent to the inlet to the transport such that the inlet transport section 58 provides limited slip engagement initially with the deposited envelope. Upon sensing that the envelope is entered further so that the envelope is substantially within the transport, the terminal processor may be operative to cause the envelope to be engaged more firmly with the moving members of the transport. Alternatively the envelope may be fully transported in limited slip mode.

The envelope is then moved between the moving members of a transport past the analysis module 62. In response to the at least one customer input which indicates that an envelope type item is being deposited the terminal processor of the exemplary embodiment does not operate the analysis module to read indicia on the envelope. The terminal processor operates in accordance with its programming to formulate the indicia comprising characters or other identifying data that will be printed on the deposited envelope. This identifying data may be human language characters or other data or character sets which are sufficient to identify the deposit as associated with a particular transaction or the user at the time of verifying the contents of the envelope. This data may be derived from customer inputs, the ATM, the host computer, or combinations thereof. It should be understood that characters as used herein is synonymous with digits, numerals, letters and other types of interpretable indicia.

In a ninth step the envelope is sensed as in a position where it is adjacent to the printer mechanism 114. In the exemplary embodiment the terminal processor operates in response to signals from sensor 120 that indicate that the leading edge of the envelope has passed the print head and will not be caught thereon if the print head moves to the print position. Upon sensing the envelope in the ninth step the terminal processor causes the printer to move into position adjacent the envelope and to print the identifying data on the envelope. The terminal processor continues to run the moving members in the transport until the envelope is sensed by appropriate sensors as having passed into the envelope compartment.

The terminal processor then operates in accordance with its programming to cause a transaction receipt to be printed and presented to the customer. The terminal processor in this exemplary transaction then operates in a next step to provide an output screen to prompt the user to indicate whether they wish to conduct a further transaction. For purposes of this example it will be presumed that the user declines such a further transaction.

In a fourteenth step the terminal processor operates in response to the user input declining further transactions to close the transaction. This may include for example returning the customer's card, presenting a "thank you" screen, storing a record of the transaction in memory and doing other things necessary to complete this transaction and to ready the machine to conduct another transaction. The terminal processor also operates in a fifteenth step to formulate and send a completion message to the host computer. The completion message preferably indicates whether the requested transaction was carried out successfully by the machine. The host computer in response will operate to include a record in an associated data store that the customer has made a deposit in a particular amount. Generally however such a deposit will not be credited to a user's account until the content of the envelope is verified. Of course this depends on the particular institution and their policies and practices.

The operation of the ATM 10 will now be described with reference to an exemplary transaction involving the deposit of a check or similar instrument. In this transaction the logic flow described in connection with FIGS. 30 through 33 is carried out.

In a first step shown in FIG. 30 the ATM operates to receive identifying data from the user in the manner previously discussed. In a second step the user identifies the particular transaction type to be associated with the transaction. In this case the user may indicate that they are depositing a check or alternatively that they are cashing a check or other document. Because both types of transactions are related, they will be described in connection with the exemplary logic flow as though the user had selected the option of cashing a particular check. It should be understood however that generally a user will be electing either to apply the amount of the deposited check to their account, or to cash the check.

At a third step in the transaction flow shown in FIG. 30 the user provides inputs corresponding to the amount associated with the transaction they wish to conduct. As optionally indicated in the fourth step, the institution operating the ATM machine may charge a check cashing fee or similar fee for the convenience of cashing the check. If this is the case, an appropriate message will be output to the user through the display of the ATM. The user may be requested to provide an input to indicate their acceptance of the transaction fee. If the user indicates that they do not wish to accept the fee or the user does not provide an input within a predetermined time period, the terminal processor may operate to close the transaction and return the machine to a ready state to conduct a transaction for another user. For purposes of this example it will be presumed that the user has indicated that they wish to proceed with the transaction.

In response to these inputs the terminal processor operates in accordance with its programming to open the gate 52 adjacent the opening to the transport section 46 of the IDM 44. The terminal processor also operates as indicated a sixth step to move the depository holding module 90 to a position in which an appropriate check holding compartment is in communication with the outlet 50 of the transport section.

Figure 26:
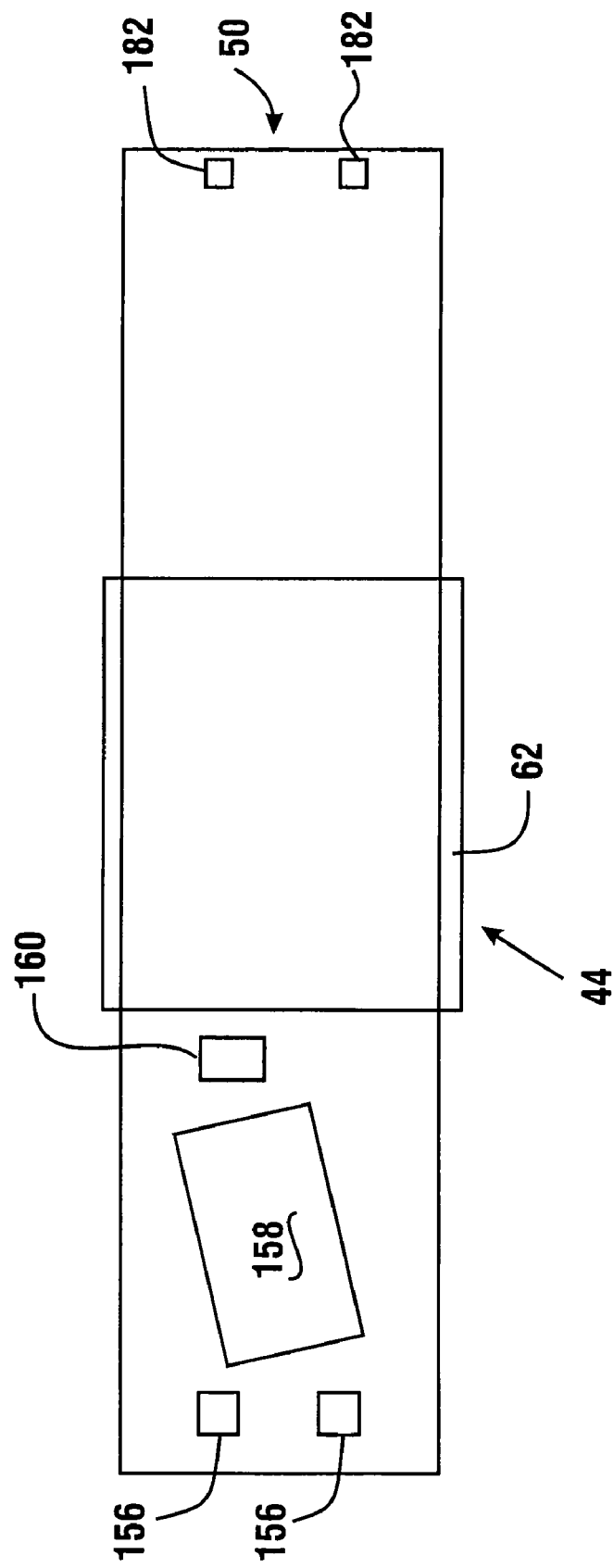
FIG. 26 is a top schematic view of the exemplary deposit accepting apparatus showing a document accepted therein in a skewed position.

The terminal processor next operates to cause the running of the moving members in the transport section to receive the document therein. As represented in FIG. 26 entry sensors 156 operate to sense an item, which in this case is check 158 entering the transport section. The sensing of the entered item by sensors 156 may be operative as previously discussed to cause the inlet transport section 58 to first run in a manner providing limited slip. Thereafter when the item has cleared the entry sensors 156 or otherwise moved further or substantially into the transport, the moving members more firmly engage the deposited item. As can be appreciated during the time of limited slip, the item may move angularly relative to the direction of movement longitudinally along the transport path as the result of the user holding the item or due to the guiding action of the walls bounding the opening or other guide device structure.

As represented in FIG. 26 the exemplary embodiment includes at least one throat sensor 160 adjacent to the analysis module 62. The terminal processor is operative in a ninth step to measure the document length. This is done for example based on the transport speed and the time that the document takes to pass the throat sensor 160. Because in the exemplary embodiment it can be assumed that generally no slippage of the document occurs after it has firmly engaged the transport, the time that the document blocks the throat sensor generally provides a relatively accurate indication of document length. Of course in other embodiments equivalent mechanisms such as encoders on driving members or other devices may be used. The document length is calculated in the exemplary embodiment by the terminal control software. It should be understood however that this technique is exemplary and in other embodiments of the invention other approaches may be used.

Figure 21:
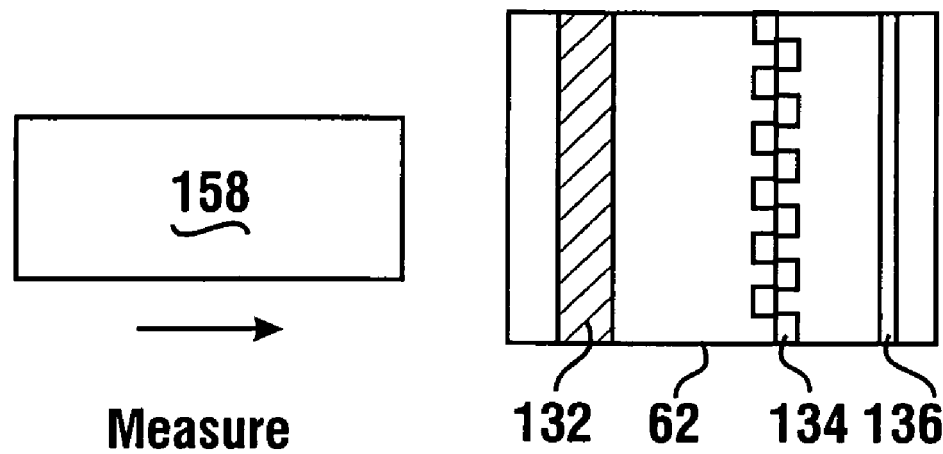
FIGS. 21-25 are schematic views representing a series of steps executed through use of the deposit accepting apparatus in connection with accepting a check in the machine.
Figure 22:
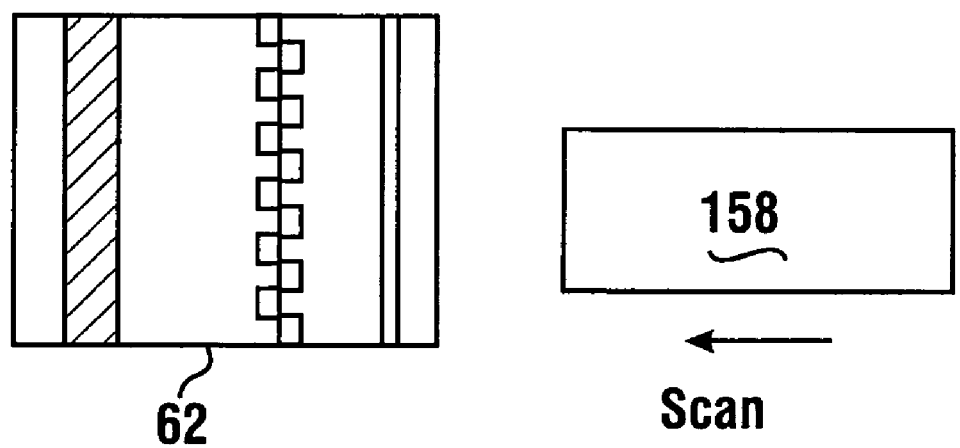
Figure 23:
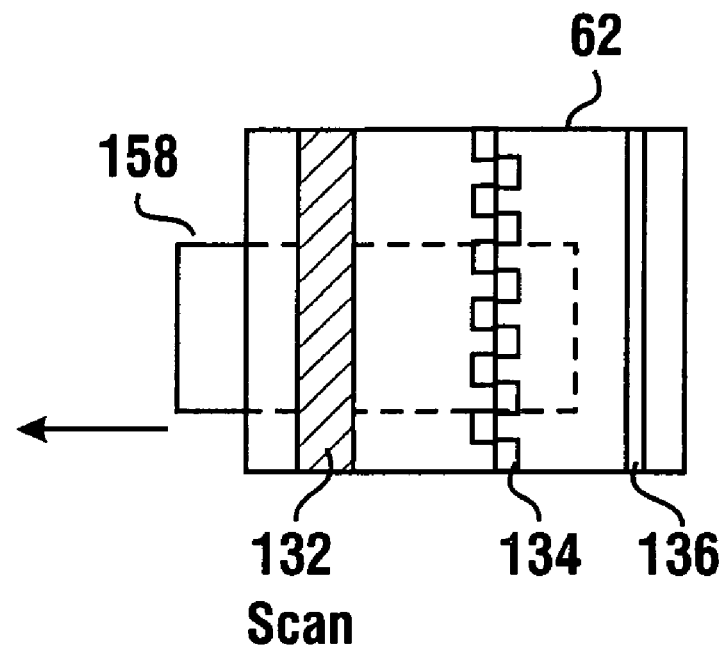
Figure 27:
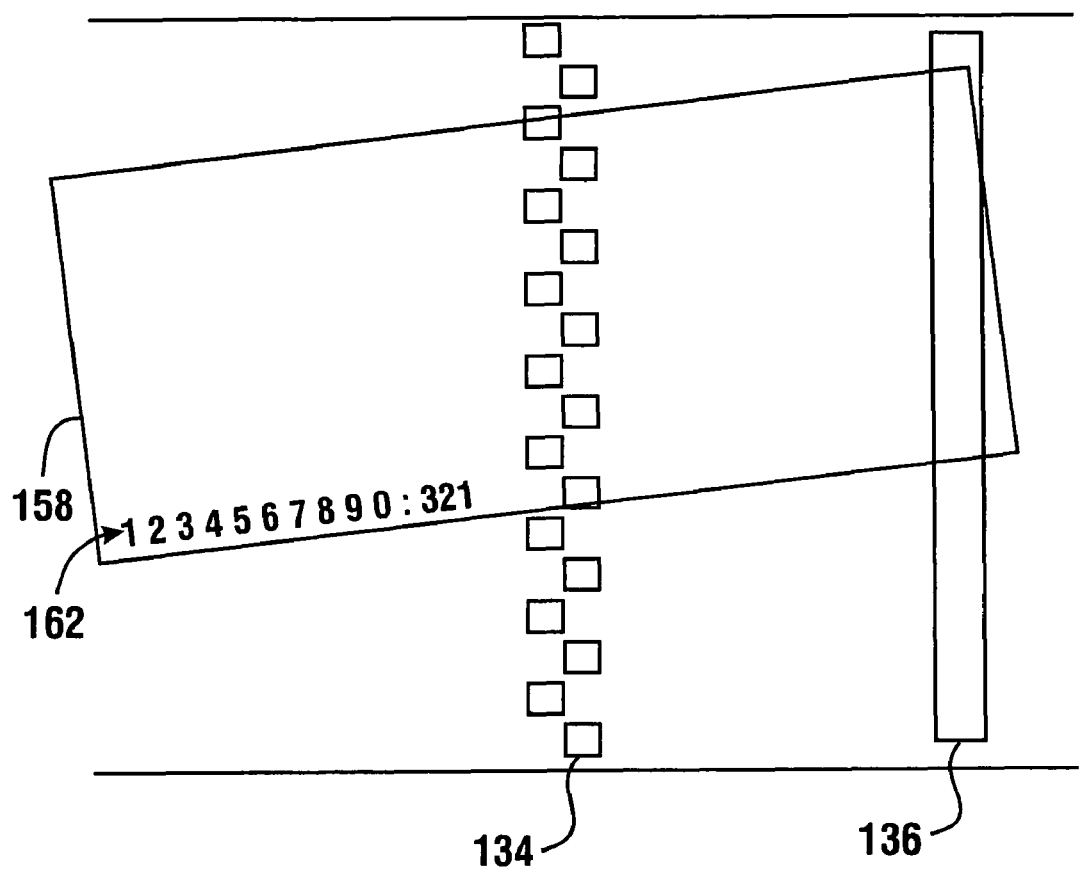
FIG. 27 is a schematic view of a check adjacent an analysis module in the deposit accepting apparatus of the exemplary embodiment and the devices used for sensing magnetic properties thereof.

As schematically represented in FIG. 21, during the step of measuring the document, the document is moved past the analysis module 62 to a position intermediate of the analysis module and the deposit holding module. This position of document 158 is represented in FIG. 22. The document at this point is in a "ready to scan" position. The terminal processor next operates in accordance with the eleventh step in FIG. 30 to move the document in the direction of the arrow shown in FIG. 22. The document is then moved past the optical and magnetic sensors in the analysis module 62 as represented in FIG. 23. As the document moves past the analysis module, the terminal control software and recognition subsystem software gather the image and profile data that is used to analyze and/or produce an electronic image of the document. As the check 158 passes the magnet 136 the magnetic ink thereon is magnetized. This magnetized ink is then sensed by the magnetic sensors 134 which provide a profile of the area in which magnetic ink is present. This is represented in greater detail in FIGS. 27 and 28. For example in the exemplary embodiment as shown in FIG. 27, check 158 includes a line 162 of micr coding. This line of micr coding (alternatively referred to herein as the micr line) causes signals to be produced by the magnetic sensing elements 134 as the characters pass such sensors. As represented in FIG. 27 document 158 may be skewed relative to the transport section through which it passes. However regardless of whether the document is straight or skewed it will produce a magnetic profile.

A magnetic profile associated with the document is indicative that the document is genuine. This is because photocopies or other simulated checks generally would not include magnetic coding. Thus the sensing of any magnetic coding on the document by the analysis module suggests that the document that has been inserted is a genuine check. However as later discussed alternative embodiments may include approaches for reducing the risk that the check is a forgery that has been produced using magnetic inks.

Figure 28:
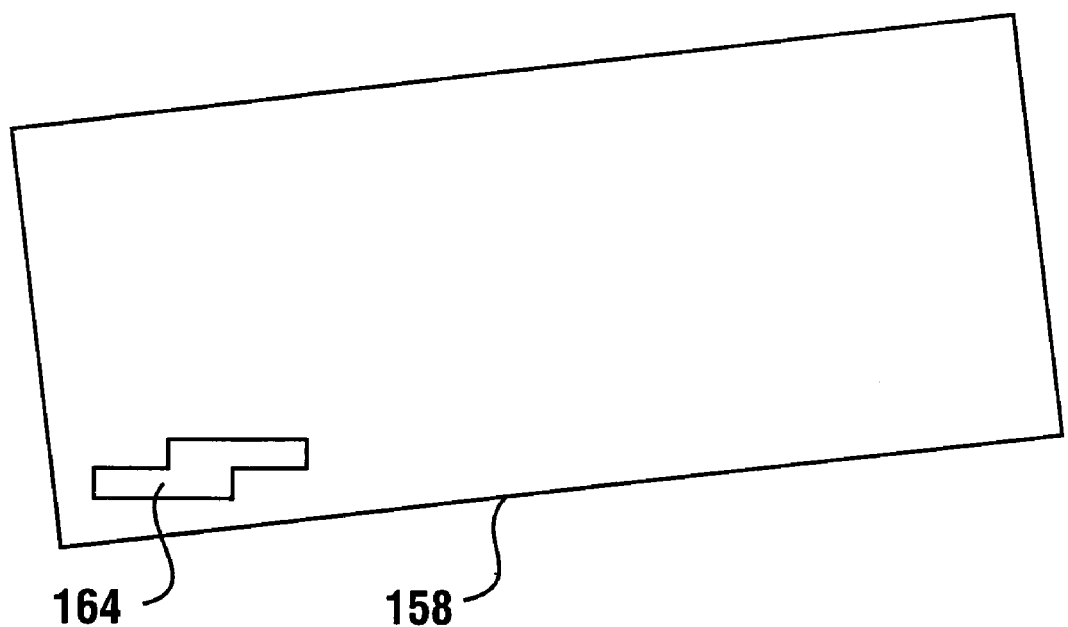
FIG. 28 is a schematic view of an exemplary magnetic profile generated by the document shown in FIG. 27.

FIG. 28 indicates specifically the magnetic profile sensed as the document passes the magnetic sensors. This magnetic profile indicated 164 includes data which indicates the magnetic areas on the check. This magnetic profile is correlated in the exemplary embodiment by the recognition subsystem with the optical profile to further verify that the check is genuine. Of course this technique is exemplary and in other embodiments other approaches may be used.

As also represented in FIG. 23 movement of the document past the scanning sensors 132 causes data to be produced which is indicative of the optical characteristics of the document passing in the transport section. This optical data comprises an electronic image of the check that is captured through operation of the scanner card and included in the data store associated with the ATM. The scanning process is continued as the check 158 moves past the analysis module 162 as shown in FIG. 4.

As indicated by the twelfth step in the logic flow in FIG. 30 the terminal processor next operates to apply the rules which are associated with the programs stored in memory concerning the particular type of document associated with the transaction. Generally at least one input by the customer indicating that they are making a check deposit may be correlated with certain stored data or rules which indicate the particular characteristics of the document that is to be received. In some cases the inputs may correspond to a particular sized document. Alternatively the rules may correspond to particular configurations or other characteristics. In this example the rules stored in memory are also indicative of "windows" or particular areas in the document landscape in which data which should be analyzed on the document may be found.

Figure 34:
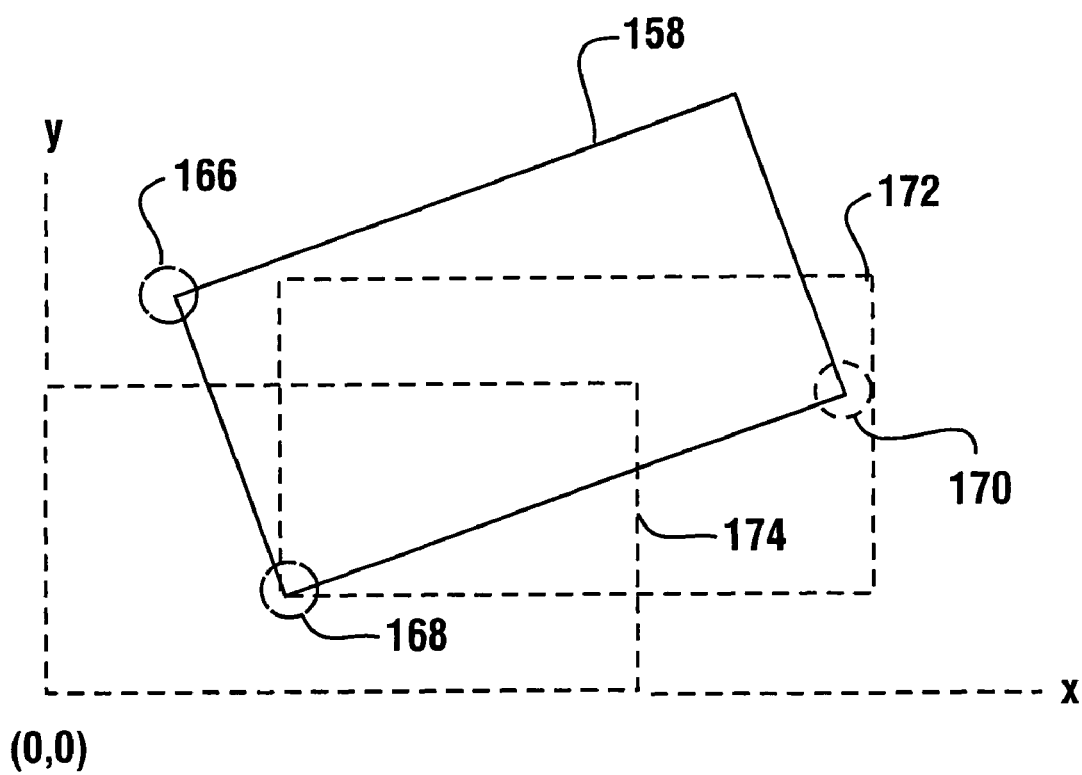
FIG. 34 is a schematic view showing how data representative of an image of a deposited instrument is modified and aligned in an exemplary embodiment for purposes of analysis.

In accordance with the exemplary embodiment which operates to analyze check 158, the terminal processor operates in accordance with the applicable rules recovered from memory as associated with a check deposit to deskew the data corresponding to the image and place it in registration with an imposed coordinate system. This is done in the exemplary embodiment through use of a programmed series of steps which finds the boundaries of the image data. This is done by comparing the pixels which make up the image and generating at least two of the lines which bound the document. By identifying these lines, one or more corners of the document may be identified. This process is represented in FIG. 34 by the skewed profile of check 158 which is shown in solid lines.

In the exemplary embodiment, after finding the two leading corners of the document 166 and 168 and the most closely adjacent trailing corner to a "x" coordinate 170, the terminal processor operates in accordance with its programming to adjust the data corresponding to the image. The exemplary terminal processor first operates to adjust the image by rotating the image data about corner 168. This causes the image to be "squared up" relative to the imposed coordinate system as represented by a phantom image 172. The computer next operates to shift the squared up image data to a reference point of the coordinate system. This shifting places the leading corner 168 at the origin of the imposed x and y coordinate system. The leading corner 166 is placed along the "y" axis while the trailing corner 170 is placed along the x axis. It should be understood that all of the pixels which make up the image data are correspondingly adjusted through this process to produce the shifted image 174 which is shown in phantom in FIG. 34.

Figure 35:
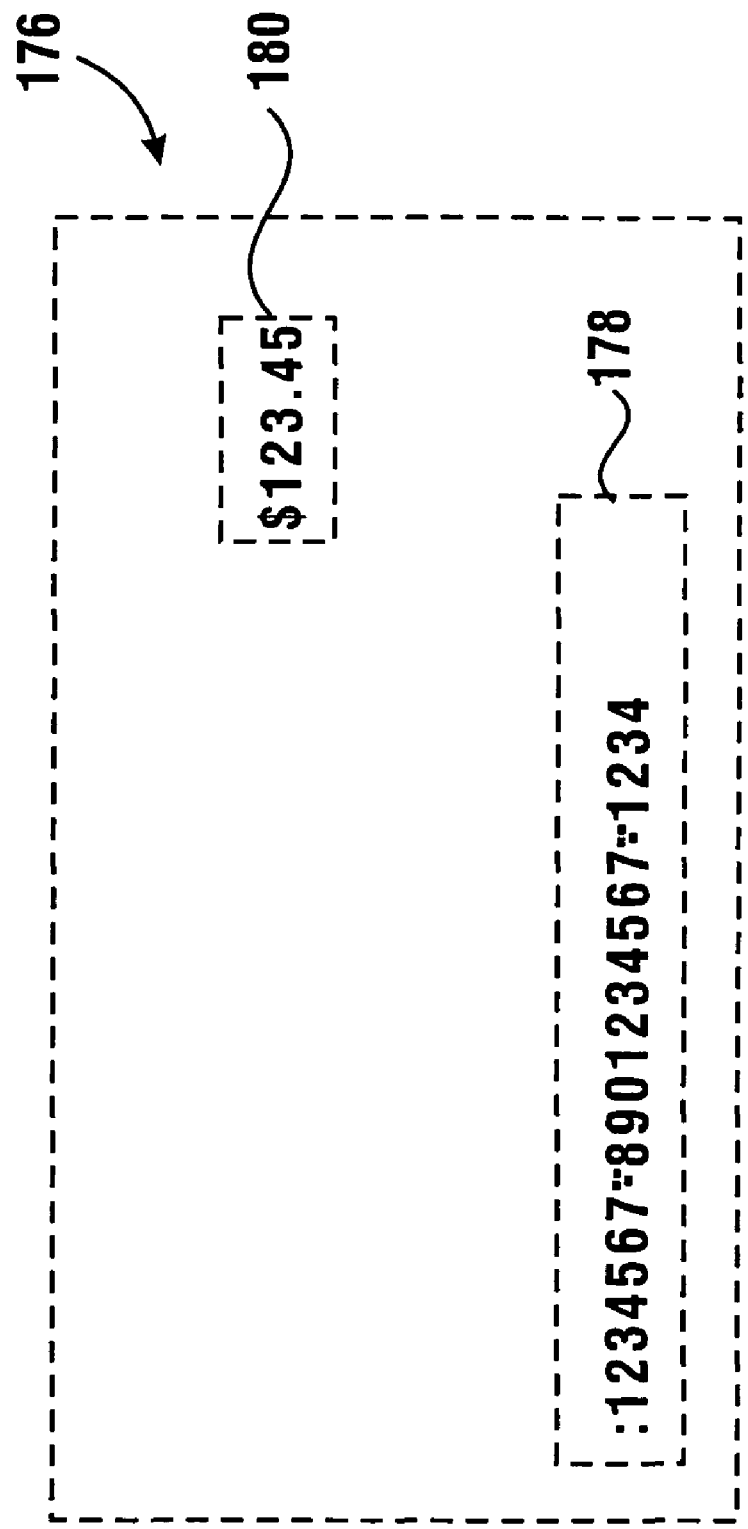
FIG. 35 is a schematic view of the application of a template for a particular type of deposited instrument to image data for an instrument deposited to the deposit accepting apparatus of an exemplary embodiment.

As represented by the fourteenth step shown in FIG. 31 the terminal processor next operates in accordance with its programming to apply template logic to the shifted image 174. The computer operates to recover from memory, data corresponding to at least one selected template. In exemplary embodiments a plurality of templates may be stored in memory and the selected one is recovered responsive to customer inputs to the machine, indicia read from the document or other data. In this step the computer operates to apply a template over the shifted image to identify for analysis "windows" within the image that contain data that is of interest. This is represented schematically in FIG. 35. In FIG. 35 a template is schematically indicated 176. Template 176 includes a first window 178 which generally corresponds to an area in which a micr line on a check may be located. Template 176 further includes a second window 180. Window 180 corresponds to an area of the landscape on the check where a courtesy amount which represents the value of the deposited check may be located. It should be understood that these windows are exemplary and in other embodiments other or additional windows may be included. Such windows may include, for example, a window for the so called legal amount which is the written or typed amount of the check. A window may also be provided for an "amount not to exceed" indicator, date, payee name, payor name or other information that appears on the check. It should further be understood that these processes for identifying windowed areas within shifted data are carried out through operation of the computer processor and the recognition subsystem software and that these graphic representations shown in the Figures merely serve to explain the nature of an exemplary form of the analysis that is carried out.

As represented in a fifteenth step shown in FIG. 41 the computer operates to analyze the data in the window of the template which corresponds to the potential location of the micr line. This is accomplished by the image control component 144 of the software analyzing data from the data store. It should be understood that the data within the particular window may or may not correspond to the micr line depending on the orientation of the document as well as whether the document itself is valid.

The computer then operates in accordance with a sixteenth step represented in FIG. 31 to pass the data extracted from the window 178. This character recognition software component is operative to apply the logic used for optically reading micr symbols. In the exemplary embodiment this is a logic associated with reading e-13B type characters. The character recognition software component 146 is operative to analyze the data and make evaluations in looking for known characters of the particular type. In the exemplary embodiment the characters represented which are resolved are processed to derive ASCII values corresponding to the characters.

In a next step as represented in FIG. 31, recognition subsystem 142 is operative to check the returned data for the presence of particular characters, in this case routing and transfer characters. Generally valid micr line data will include such characters and the detected presence thereof in the data analysis is an indicator that the micr line data has been properly found and read.

At a nineteenth step shown in FIG. 31 the recognition subsystem software 142 operates to determine if the degree of assurance or confidence as indicated by the character recognition component for the values returned, is above a threshold. The determination of the level of assurance is based on one or more values delivered by the pattern recognition algorithms in the character recognition software component used in the exemplary embodiment. In the exemplary embodiment the threshold is generally set at about a 70 percent assurance level. As indicated in FIG. 31 the computer operates in response to its programming to proceed based on whether the level of assurance is at or above, or below the threshold.

As indicated in FIG. 31 if the level of assurance in the determined micr values is indicated as below the threshold and/or if routing and transfer characters are not found, the recognition subsystem through operation of the image control software component, operates to further manipulate the image. In the exemplary transaction the computer operates to manipulate the data to essentially transpose and flip the image 180 degrees and to again read the data in the micr line window. It should be understood that in other embodiments the data corresponding to the image may be manipulated in other ways in order to attempt to translate the image so as to find appropriate data.

As indicated in the twenty-first step in FIG. 31 the translated image data now in the window 178 is again read and passed to the character recognition software component 146. This again causes the output of ASCII values based on the characters in the window. As indicated in the twenty-fourth step these values are then checked for the presence of routing and transfer values. As indicated in step twenty-five in FIG. 31, if the micr values read have an associated level of assurance at or above the threshold and routing and transfer characters are present the recognition subsystem is operative to proceed with further analysis of the image. However if the level of assurance remains below the threshold and/or there are no routing or transfer characters, this may be an indication that the document is not valid. In some embodiments the ATM may operate to further transpose the data and conduct additional analysis. This may be particularly appropriate in situations where both sides of the document are being scanned and the document may be in different orientations. In this case the terminal processor causes the ATM to operate to return the document to the customer and to close the transaction.

As represented in the logic flow which continues in FIG. 32, if the characters in the micr window are read with a level of assurance that is at or above the threshold and the routing and transfer characters are present, the terminal processor next operates to cause the courtesy amount data in the window 180 to be read. In the exemplary embodiment the recognition subsystem operates in response to landmark rules associated in memory with the document type to assist the analysis in finding the courtesy amount within the window. These techniques may include for example in the reading of a check, looking for the box or line on which the courtesy amount is written. In this case the value is a monetary amount. The amount may be printed or cursive characters. It may also look for known characters such as the dollar sign, the fraction sign, decimal point or star characters which are commonly included in printed checks to indicate places before the dollar amount. Of course it should be understood that the particular templates and landmark rules used will depend on the programming of the machine and the type of document involved. The machine may have access to stored data corresponding to a plurality of templates and/or rules, and may apply them to documents based on data derived from customer inputs, the document, memory data or combinations thereof.

As represented in a twenty-eighth step in FIG. 32 the terminal processor further operates responsive to the recognition subsystem to binarize the data in the courtesy amount window which essentially can be thought of as reducing the sensed data to black and white. This further assists in identifying the characters. The character recognition component 146 then applies its logic in looking for U.S. dollar type or other appropriate numerical characters within the data, and as represented in a twenty-ninth step in FIG. 32, the recognition subsystem outputs and ASCII values indicative of the courtesy amount. In some embodiments the level of assurance associated with the courtesy amount is also analyzed to determine if it is above a threshold to verify that the amount has been accurately read. Alternatively, or in addition, the derived courtesy amount may be compared to the data input by the customer concerning the amount of the check. In alternative embodiments the character recognition subsystem may operate to read the characters in the legal amount field and compare the legal amount to the courtesy amount. Alternatively or in addition, in some embodiments the micr line may include indicia representative of the amount of the check or an amount which the check is not permitted to exceed. In such cases the encoded micr data or the values to which it corresponds may be compared to the courtesy and/or legal amounts. Further in some embodiments the check may include a field that indicates a value which a check is not to exceed. This value may be read and compared through operation of one or more computers to the amount data found in the courtesy amount, legal amount, or micr line. Such comparisons may enable the machine to identify situations where the amount data is not consistent, which is indicative of an inability to properly read that check, and/or an unauthorized modification of the check data. If there is a discrepancy and/or the level of assurance is below the threshold the check may be returned and the transaction closed.

The exemplary recognition subsystem further operates in accordance with the thirtieth step represented in FIG. 32 to check for the presence of magnetic ink on the document in the proper location. This is done in the exemplary embodiments by component 145 determining the length and configuration of the magnetic profile associated with the document. This length and orientation data may be normalized in the manner of the image data based on the imposed coordinate system, and compared therewith to verify that the magnetic areas correspond to the optical data corresponding characters in the micr line. In addition certain documents may also include magnetic characters in other areas of the document. These other characters which may not necessarily be included within the optically analyzed data, may be further checked to provide an indication of the genuineness of the document. Of course in alternative embodiments as previously discussed, the mere presence of magnetic ink on the document may serve as a sufficient indication that the document is genuine.

In some alternative embodiments at least one computer in the automated banking machine may be operative to further verify the genuineness of a check presented to the machine by looking for evidence of magnetic indicia within the image data corresponding to the check in appropriate places or locations which suggest that the check may have been produced fraudulently. In such embodiments the computer may be operative to look for evidence of magnetic ink within pre-printed fields of one or more templates which would normally not include magnetic indicia. The presence of magnetic indicia in one or more of these fields may be indicative that the check may have been printed by a forger with a printer that prints in magnetic ink. This may be indicated, for example, by the data in a maker field, date field, maker signature line or other areas being presented in magnetic ink when no magnetic ink would normally be found in such areas. In some embodiments, for example, the recognition subsystem or other computer in connection with the machine may be operative to first locate the micr line within the image data in the manner previously discussed. Thereafter, the system may operate to disregard the magnetic indicia in the micr line and analyze other magnetic indicia and/or its location relative to the image data. Based on programmed parameters such as, for example, finding magnetic indicia in other printing on the check may cause the machine to identify the check as a potential forgery. In such circumstances the check will not be cashed by the machine. The check may be returned to the user or alternatively retained in the machine as a precaution to prevent the check being passed in another location. Of course these approaches are exemplary and in other embodiments other approaches may be used.

As indicated in the thirtieth step of the exemplary embodiment represented in FIG. 32, if the magnetic data sensed does not properly correspond to the document the terminal processor operates to identify the document as suspect. The terminal processor then operates to return the document to the customer and to close the transaction. However, if the document has an appropriate magnetic profile the terminal processor next moves to a step 31.

In the thirty-first step the terminal processor operates to configure and send an authorization message through the network to the host. This authorization message will generally include the data appropriately necessary in an ATM transaction message for purposes of authorizing the transaction. Such data may include customer identifying data such as PAN and PIN related data, the transaction type and the amount input. In addition the transaction data may include data derived from the document, such as data representative of the data corresponding to the characters in the micr line as well as the courtesy amount read from the check as determined by the recognition subsystem.

It should be appreciated that providing the data read from the check in numerical or other compatible format as part of an authorization message is useful for facilitating processing of the data in some systems compared to transmitting an entire image of a check to a host computer for analysis and authorization. In exemplary embodiments the check data may be included in a field in a Diebold 91x type transaction message or in a selected field in an ISO 8583 message. A host computer may readily determine the data included in such messages and analyze it for purposes of deciding whether or not to authorize the transaction.

In this exemplary transaction when the host receives the request message from the ATM, it operates to determine if the customer data corresponds to an authorized user as well as whether the user is authorized to conduct the transaction requested. The operator of the host computer may also be enabled to apply certain rules, including preventing particular users from cashing checks or limiting the amount of the deposited check which can be cashed. Various types of rules may be selectively applied depending on the particular user and the amount of the check. In addition the host computer may also analyze the account data on the check. This may include for example communicating with other systems or data stores to determine if the account upon which the check is drawn is valid and/or holds sufficient funds as represented by the courtesy amount on the check. The computer may also compare certain data such as the courtesy amount read, to data input by the customer concerning the value of the check. The computer may also compare data corresponding to the legal amount read from the check to the courtesy or amount or other monetary amount data based on the micr line or a maximum amount printed on the check. The computer may also analyze aspects of the data such as the institution or the location thereof, upon which the check is drawn for purposes of applying its programmed business rules and logic and in deciding whether to allow the user to deposit or cash the check. Of course in some embodiments business rules may be applied by the one or more computers operating in the ATM as well as through the operation of one or more remote host computers.

In accordance with its rules and logic the host in the exemplary embodiment returns a response message to the ATM. This is represented by a step 32. For purposes of this example it will be presumed that the user is authorized to deposit or cash the check. Of course if the check is not authorized to be deposited or cashed the response message includes data indicative thereof. The ATM will operate under control of the terminal processor in response to data indicative that the transaction is not authorized to return the check to the user and to close the transaction. Alternatively, if the check appears to be fraudulent, the ATM may capture and store the check.

As indicated by the thirty-third step in the exemplary embodiment the ATM operates in accordance with its programming to display a graphic image of the check deposited on its display 22. The terminal processor also operates in a thirty-fourth step in the sequence to store a copy of the image file in a data store at the ATM. In some embodiments this image file may be later recovered for purposes of tracking and documentation. Such image files may be compressed for purposes of saving storage space. In one exemplary embodiment the graphic image of the check is stored in memory as a PCX file. In other embodiments the image file may also be accessed from or downloaded to remote computers connected to the system. As previously discussed, such remote computers may be operative to process the check and to carry out settlement related thereto, using the electronic image document as a substitute for the paper check.

The computer next operates in accordance with a thirty-fifth step to print a receipt for the customer. In the exemplary embodiment because a graphic image of the check is available within the ATM, a graphic representation of the check may be included on the receipt provided to the customer. In addition the terminal may operate to print a similar graphic image on a journal printer or in other hard storage within the machine. Alternatively or in addition, in machines including a camera or other image capture device, an image of the user may be stored and/or printed in correlated relation with the check data, including on the receipt, on the check and/or on a journal.

Figure 24:
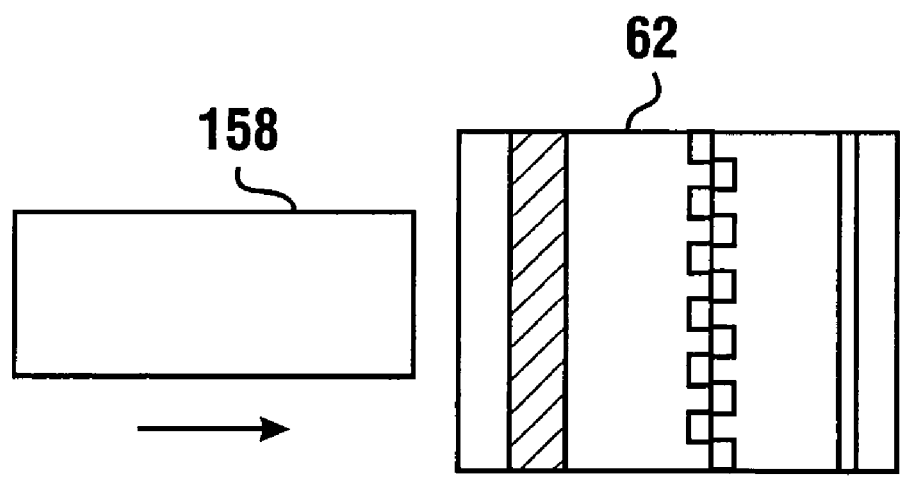
Figure 25:
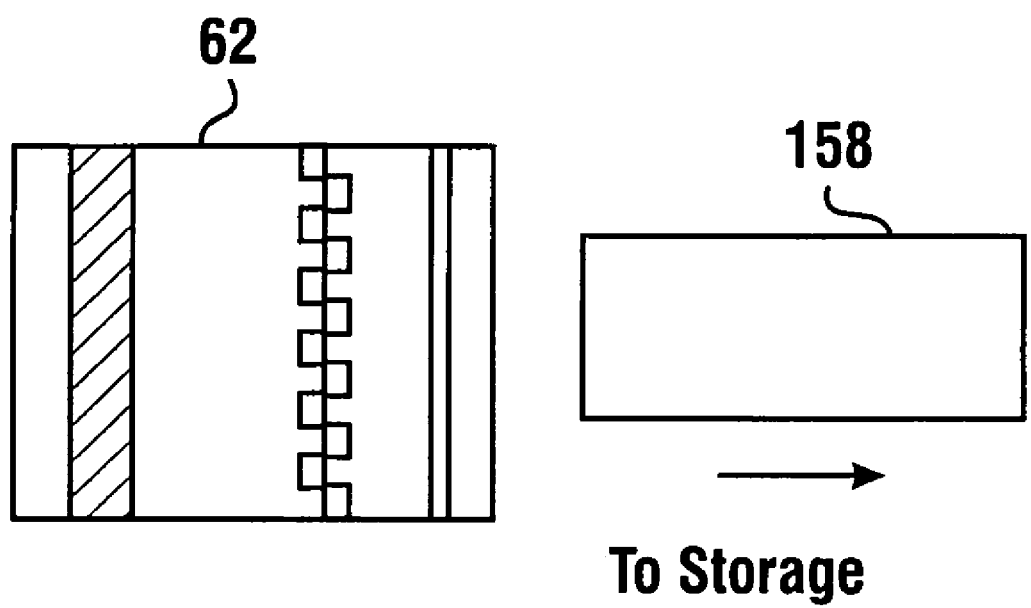

After printing the receipt the ATM next operates under control of the terminal processor to cancel and store the check. This is represented graphically in FIG. 24. As indicated by the thirty-sixth step in the sequence, the computer causes the transport section to again move check 158 in the direction of the arrow. The check is moved towards the deposit holding module. In addition the terminal processor operates to align the appropriate document compartment so that its opening is in communication with the outlet of the transport section.

As indicated in a thirty-seventh step the check 158 is moved until it is sensed adjacent to the printer mechanism 114. Upon sensing the check adjacent to the printer the terminal processor operates to print cancellation data on the check. This cancellation data is printed on the check as it moves in the transport. This may include for example information about the user and/or the transaction, including images. As indicated in a thirty-ninth step in the sequence, the transport continues to move the check until it is sensed as having passed into the storage compartment. Such activity may be sensed through sensors similar to those previously discussed positioned adjacent to the outlet 50 of the transport. This is schematically represented by sensors 182 shown in FIG. 26.

After moving the check into the document storage compartment the terminal processor operates the translation mechanism 94 associated with the deposit holding module to tamp the documents in storage. This is accomplished as indicated by the fortieth step by moving the tamping member 96 downward. This serves to assure that the documents in storage are compacted to the extent possible and assures that a larger number of documents may be accepted before the need for removal of documents from the storage compartment.

In some embodiments, the terminal may operate in accordance with its programmed instructions to provide the user with an output asking if they have further checks to deposit.

The user may respond with at least one input, and if so a portion of the transaction sequence can be repeated beginning with step 2 in the transaction sequence for example, to accept another check or other document. In such situations the value of the further check or other document may be added to the value of the prior items. In some embodiments items which are deposited may have different properties. For example, in some embodiments the machine may accept items that do not include magnetic coding. Such items may include other features such as verification codes, symbols or characters that are a function of other values or indicia on the items. Such items may include for example vouchers issued by the machine for a difference between an amount the user was entitled to receive and the value of cash dispensed that could not be dispensed in prior transactions. The machine in such embodiments is operative responsive to its programming to adjust the verification sequence to suit the particular document type being received. The particular document type being received may be based on the at least one input to the machine in the second step, indicia read from the document type, and/or other inputs or data.

In embodiments where a plurality of types of documents are accepted, the machine may operate in accordance with its programming to conduct an analysis of the indicia on the document that is appropriate to verify the particular document type. The document storage module may also include compartments for each type of item that is to be accepted. In this way different item types may be segregated to facilitate removal and sorting.

In some embodiments the receipt of successive documents from one user may continue for a plurality of checks, vouchers or other type items. If the items are verifiable as genuine by the machine and redeemable for cash or credit, the machine may operate to aggregate the value of all such items. The transaction sequence may continue to repeat based on instructions and inputs to the machine in the transaction sequence. It should be understood that for purposes of the exemplary transaction sequence there has been only one item deposited, and only one exemplary type analysis of a document which is a check has been described.

As indicated in the forty-first step if the customer has requested a deposit only transaction during the transaction selection step, the terminal processor causes the machine to go to the forty-fifth step in the transaction sequence. However if the customer has requested to dispense cash based on the value of a cashed check, the logic moves to the forty-second step. If the dispense transaction has been authorized, the terminal processor operates the cash dispenser to dispense an amount of cash. In some embodiments the amount of cash which may be dispensed may correspond exactly to the amount of the check (less transaction fees in some cases) that has been presented by the customer. This may be done for example in an ATM which includes a cash dispenser with coin dispensing capability. However in many embodiments the ATM may be capable of dispensing only certain denominations of currency. This may preclude the customer from receiving the exact amount of change to which they are entitled.

In circumstances where the customer cannot receive exact change the computer may operate to cause a voucher to be printed for the customer. The voucher may include for example a printed coupon or other item that can be redeemed for the amount of the change. This may include for example a coupon redeemable with a merchant for cash and/or services or merchandise. The user may be prompted through operation of the computer to provide at least one input which serves to select from several possible merchants from whom available vouchers are redeemable and in response to the user making a selection of a merchant the voucher is printed with the corresponding merchant name and amount. The system may then operate to provide a credit to the account of the merchant for the amount of the voucher. Such a voucher may include an image of the user for purposes of verification that the person presenting the item is the authorized person.

Alternatively the computer may operate to print and provide a check or other type negotiable instrument to the user. This negotiable instrument may be cashed like a check at the machine or at another location by the user. Such an instrument may be input by the customer to the machine in a subsequent transaction. For example the machine may operate in the subsequent transaction as previously discussed to accept several checks including the negotiable instrument previously dispensed. The user may elect to cash the amount of these checks or have them credited to an account.

The machine may include among its transaction function devices check or voucher printer devices. These printer devices may be supplied with a stock of check media with magnetic coding that may be similar to other types of checks. The coding may correspond to the account of the operator of the machine or other entity whose account is to be charged for the amount of change received by a machine user. In such embodiments the check is completed by a printing device with the amount of change for which the check may be redeemed. The check may be printed by the machine with the user's name as payee based on the transaction data received, or alternatively made out to cash. Images of the user may be printed on the check for authorization purposes as previously discussed.

The check once completed with the appropriate data and/or images may be dispensed from the machine to the user. The user may cash the check at the machine on the current session or in a subsequent transaction session, or at another location that accepts checks. In some embodiments the check stock provided in the machine may prominently display a statement of maximum value above which a check would not be valid. This may be for example, the smallest denomination currency bill dispensed by the machine. For example if the lowest denomination bill that the machine dispenses is a one dollar bill, the value of change would always be generally less than one dollar, and the statement of maximum value of one dollar which would conspicuously indicate to anyone redeeming the check that if it is above this amount it has been tampered with. Of course the maximum amount may vary depending on the machine and its capabilities. Also having such limited value checks in the machine reduces the risk to the machine operator in the event the machine is broken into and the check stock is otherwise stolen. Alternatively the maximum value statement on the check may in some embodiments be printed by the machine itself.

Checks issued by the machine on check stock may include micr coding. Such checks may be verified by the machine in the same manner as other checks. Alternatively the machine may include a transaction function device which provides vouchers, scrip or coupon material that is redeemable for cash, credit, services and/or merchandise. In some embodiments such items, which will be referred to as a voucher for purposes of brevity, may have unique indicia or characteristics that are indicative of authenticity. Such indicia or characteristics may include indicia readable by the machine. Such indicia may include a unique magnetic or visual characters and/or profile which is indicative that the voucher is genuine. Of course, such vouchers may in other embodiments include visible or non-visible indicia including images of the user, which are capable of being read and used to verify the authenticity of the voucher. As previously discussed, when such an item is presented to the machine to be redeemed, the machine adjusts the verification steps in accordance with its programming as appropriate for the particular type of document. This may be based on user inputs, information read from the document, or other data.

In alternative embodiments, the machine need not use any special media or paper to provide a voucher redeemable for cash (or credit and/or merchandise). In such embodiments a printing device in the machine may print the voucher on non-unique media. This printer used for printing the voucher may be a printer used for printing documents that are not redeemable for cash, such as the receipt printer. This may be accomplished by printing on the voucher one or more numerical codes and/or characters or symbols that are usable to verify the genuineness of the document. These may include for example numerical codes which are a function of at least one value associated with the transaction. For example the voucher may include verification indicia which is determined through use of an encryption function based on a transaction number, user ID, amount, machine ID, transaction time, other values, images, or combinations thereof.

The voucher including the verification indicia may be presented at the machine (and in some embodiments at other machines or establishments) to be redeemed. In the case of presentation of the item at the machine, the verification indicia may be read with other values from the voucher. Because in this example no magnetic coding is used, the programming of the machine would cause the machine to not reject the voucher for lack of magnetic coding. The machine would operate in accordance with its programming to determine the validity of the verification indicia. This would be done using the particular appropriate algorithms and data. This may include for example recovering data from one or more data stores. Such a data store may include for example, data concerning whether a voucher corresponding to the one presented has been previously redeemed. For example the machine may operate to store in one or more data stores when the voucher is issued, data indicative that the voucher has been issued. Such data may include data about the amount, the user, the verification indicia or other data. Then when the voucher is redeemed, either at a machine (the same machine that issued the voucher or another machine) or at another location such as a merchant location, further data is stored to indicate the voucher has been redeemed. Such procedures may help assure that reproductions of vouchers are not redeemed for cash. If the voucher is verified as genuine it is accepted for cash value in the manner previously discussed. Of course these approaches are merely exemplary and other approaches may be used.

Alternative embodiments may also provide other ways for the user to take or receive the benefit of an undispensed amount. This may include for example the user returning the change to an account with an institution. Alternatively the user may choose to apply the change to the amount of an existing credit card balance or loan that is held by the institution. In addition or in the alternative, the user may apply the undispensed amount to a particular charitable organization. The operator of the machine may track such donations over the year and send the user a statement for tax purposes. In addition the information may be used by the charities to provide such tax documents directly, and/or to solicit further donations from the particular user. This is accomplished in an exemplary embodiment by the machine providing the user with one or more options through output devices, and the user providing one or more inputs through input devices to select one or more of the options for application of the difference. Numerous options may be provided by the user in response to the programming associated with the terminal processor and other connected computers.

Alternatively in some embodiments one or more computers operating in connection with the machine may provide the user cashing the check with the closest amount that the ATM can dispense to the exact amount of the check. For example, if the ATM includes cash dispensers that dispense coin and the cash dispenser for dispensing pennies is not available because it is broken or is depleted, the machine may dispense an amount to the nearest next highest available currency denomination, which may be a nickel. Likewise if the cash dispenser for dispensing nickels is not available or depleted, (and the penny dispenser is not available) the machine may dispense to the nearest dime. These rules of rounding upwards may be applied in accordance with the programming associated with the machine to dispense the closest amount that the machine is capable of dispensing above the amount of the check presented. Of course in exemplary embodiments the excess above the amount of the check that the machine will dispense is limited in accordance with the programming of one or more computers within the machine. Thus, for example, the programming of the computer may establish the maximum additional amount that the user may receive above the amount of the check as $2.99. Thus if the machine cannot dispense an amount that is within $2.99 above the amount of the check, the machine will indicate that it is unable to process the transaction and return the check to the user. Of course this approach is exemplary and in other embodiments other approaches may be used.

It should be understood that in some exemplary embodiments one or more computers in operative connection with the one or more cash dispensers in the ATM is programmed to control the dispense of currency denominations in response to check cashing transactions. Such control may be operative to reduce the risk that the machine will run out of currency. Thus, for example, the computer may be operative to cause the ATM to dispense one denomination of currency as opposed to another in order to enable the machine to continue running longer and/or to maintain the capability of the ATM to fulfill check cashing transactions within the parameters which have been established by the system. Of course these approaches are exemplary and in other embodiments other approaches may be used.

As indicated at the forty-fourth step in the sequence the terminal processor operates to cause a receipt to be printed for the user indicating the amount of the cash dispensed. This receipt may also include other information including the amount of change that the user received and an indication of how the value associated with this change was either applied or provided to the user. Of course as previously discussed, in this printing step the terminal processor may also operate to print vouchers, coupons, negotiable instruments or other items that the user has requested to receive.

As indicated at the forty-fifth step the terminal processor next operates in accordance with its programming to prompt the user on whether they wish to conduct another transaction. For purposes of this example it will be assumed that the user declines another transaction. The terminal processor next operates the machine to close the transaction. This may include for example returning the card to the customer, outputting "thank you" messages or other appropriate steps associated with completing the transaction and/or readying the machine for a next customer.

In the forty-seventh step the terminal processor operates to send a completion message to the host. As previously discussed the completion message generally includes data indicative of whether the transaction was successfully carried out. In addition in some embodiments, the completion message may also include data representative of any change that was due to customer and how the customer chose to apply or receive the amount of change. The confirmation data included in the return message may also include data representative of the issuance of an item and/or the identity of the merchant or other entity to whom a credit is required to be issued in consideration of vouchers or coupons that were dispensed to the customer. The completion data may also include a transaction number or data that can be used to identify or authenticate a check or voucher issued to a user. Likewise the message may include data representative of loans, accounts or charities to whom the customer may have elected to apply their change balance. Other appropriate data indicative of the completion of the transaction may be included. The host computer operates in response to this message to appropriately close the transaction and to apply the funds accordingly and to store data in one or more data stores in operative connection with the host.

As can be appreciated from the foregoing description, the exemplary form of the deposit accepting apparatus and system and its methods of operation may provide advantages. The exemplary system reduces the need to manipulate documents. This results in increased reliability by reducing the risk of document jams or other malfunctions. The exemplary embodiment further reduces the need to achieve alignment of the document for purposes of reading or analyzing the data thereon. Generally as long as the particular document is presented in an appropriate transport direction the data may be analyzed and manipulated so as to achieve authorization of the document. It should be understood that while the exemplary embodiment shown analyzes indicia on only one side of a document, other embodiments may analyze indicia on both sides of documents. This may be accomplished for example by having analysis modules on both sides of the document path. Such arrangements in some embodiments may enable documents to be reliably read and analyzed regardless of orientation.

It should be understood that while the exemplary embodiment has been described as reading checks and vouchers, other embodiments may be used for reading other document types. Such other document types may include for example currency bills, statements of charges such as utility bills, credit card bills and other statements of charges. Embodiments may further be adapted to read other or additional types of coding such as one or two-dimensional bar codes, other character sets, alphabets of various languages or other characters. Embodiments of the invention may accept only one type of item, or a plurality of types of items. Further, while the exemplary embodiment accepts envelopes, other embodiments may not accept such items, or may accept other types of items.

It should be understood that the architecture of the computers and software described is exemplary. Other embodiments may use different computer and/or software architectures to accomplish the functions and methods described. Further the one or more computers operating in an automated banking machine may be programmed by reading through operation of one or more appropriate reading devices, machine readable articles which comprise media with computer executable instructions that are operative to cause the one or more computers (alternatively referred to herein as processors) in the machine to carry out one or more of the functions and method steps described. Such machine readable media may include for example one or more CDs, magnetic discs, tapes, hard disk drives, PROMS, memory cards or other suitable types of media.

Some exemplary embodiments further facilitate transaction processing by being able to verify and analyze document images within the ATM. This may avoid the need to transmit entire document images to a remote location for purposes of analysis. Further an exemplary embodiment enables the application of processing rules which facilitates analyzing required data and moving forward with transactions only when such data is read with a sufficient level of assurance that the data has been read accurately.

A further advantage of the described exemplary embodiment is the ability of a single mechanism to reliably handle both sheet type materials and envelopes. This avoids the need to include multiple depositories within a machine. In addition the embodiment also produces data representative of graphic images of items that have been placed into the depository. Such image data may be analyzed at the machine or forwarded to another device for verification and/or processing purposes. Embodiments may be used to conduct payor and/or payee signature analysis including analysis for the presence of signatures and/or for the genuineness of cursive signatures.

Another advantage of the exemplary embodiment is that items placed in the deposit accepting apparatus may be read through imaging or other methods and then returned to the customer. These may include items such as drivers' licenses, identification cards, passports or other articles that generally will not be retained within the machine. The exemplary depository also has the capability of receiving documents, reading and/or capturing images and printing on them for purposes of authentication or cancellation and then returning them to the customer. This may prove advantageous for example in the case of customer bills or payments where the customer is provided with a marking on the particular bill to indicate that payment has been made. In addition the exemplary embodiment may handle numerous different types of items and documents in this manner. For example embodiments of the invention may be used in applications such as issuing items such as drivers' licenses, license plate stickers, gaming materials, and other items. Embodiments may be used for redeeming items and issuing new or replacement items. Further advantages will be apparent, and those having skill in the relevant art may apply the principles of the claimed invention to numerous embodiments.

It should be understood that in exemplary embodiments an automated banking machine may operate to conduct transactions that involve the dispensing of cash to the user, in which the source of the value which is assessed to the user for the dispensed cash is a deposited check or other item, or alternatively, is an account associated with the user. In such embodiments the ATM may be operative to communicate with one or more host computers so as to indicate identifying information associated with the user. Based on inputs provided, the messages sent to the one or more host computers may also include an indication that the customer is requesting a dispense of cash and the amount of such dispense. The one or more remote computers to which the message is sent by the ATM are operative to determine if the user is permitted to conduct the transaction, and to return one or more messages to the ATM indicating whether the transaction is authorized. Responsive to such messages, the automated banking machine operates responsive to one or more processors to dispense cash through operation of the cash dispenser. Responsive to dispensing the cash, the automated banking machine and one or more processors thereof are operative to cause the value associated with the cash dispensed to be assessed to the user. This may include for example sending a message from the automated banking machine to one or more computers, which is operative to cause the value of the cash to be assessed against a user's account. Alternatively or in addition the automated banking machine may be operative to cause the value associated with the dispensed cash to be assessed to the user by offsetting the value of the cash dispensed against the value of one or more checks or other items that are deposited by the user in the machine. Alternatively the automated banking machine may be operative to assess the value associated with the cash dispensed to the user by operating so as to adjust or offset the value against other sources of value such as stored value represented in a data store on a smart card, mobile phone or other value source. Of course these approaches are exemplary and in other embodiments other approaches may be used.

An alternative embodiment of a deposit of an alternative exemplary embodiment will now be described.

Figure 81:
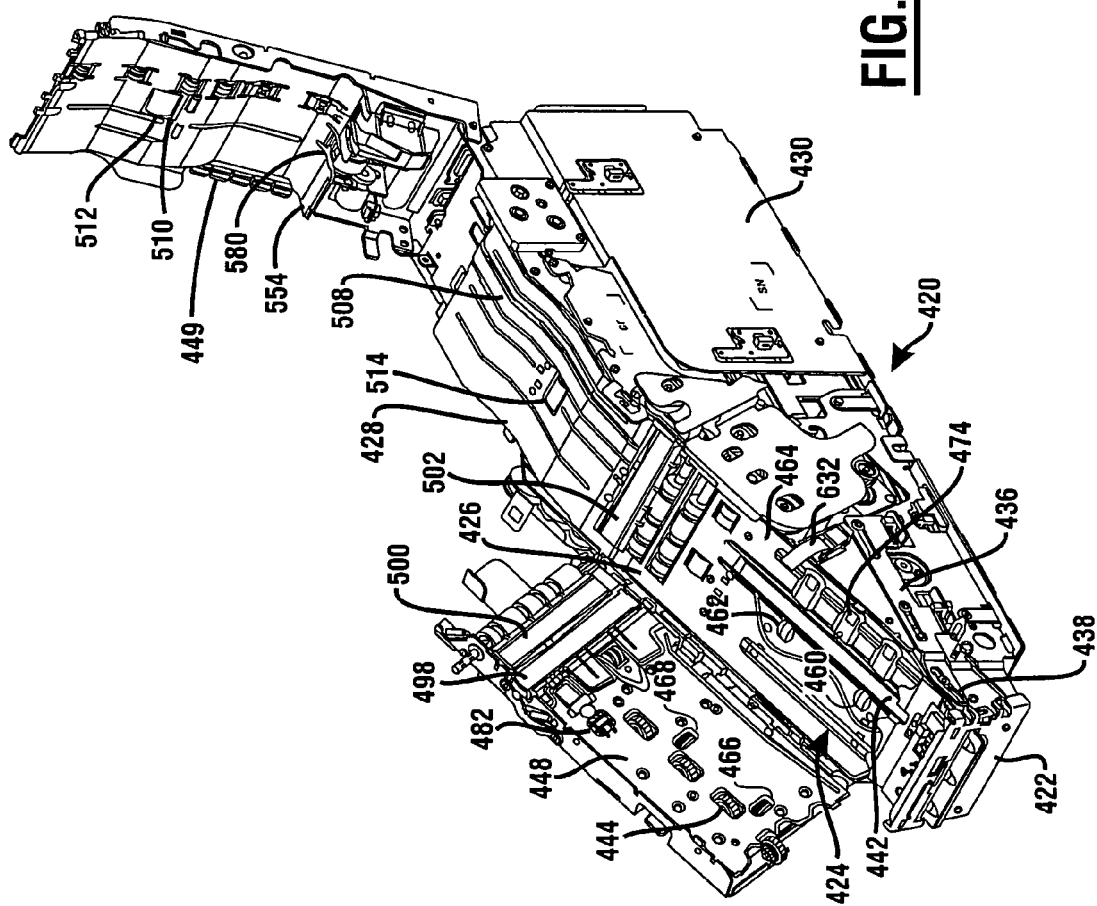
FIG. 81 is an isometric view of an alternative form of a deposit accepting apparatus shown in an open condition for servicing.

A deposit accepting device 420 of an exemplary embodiment and having the features described hereafter is shown in FIG. 81. The deposit accepting device is shown with the mechanism open so as to enable more readily describing its components. The deposit accepting mechanism would be open in the manner shown in FIGS. 81 and 82 only when the device is not in operation. Rather the device would be placed in the open condition for servicing activities such as clearing jams, cleaning, adjusting or replacing components. This can be readily done in this exemplary embodiment by a servicer as later described.

The deposit accepting device includes a document inlet opening 422. In the exemplary embodiment during operation the inlet opening is in communication with the outside of the housing of the automated banking machine. Documents received through the inlet opening travel along a transport path in the device. The transport path in the device further includes a document alignment area 424 in which documents are aligned to facilitate the processing thereof. The exemplary form of the unit further includes a document analysis area 426. The exemplary document analysis area includes scanning sensors and magnetic sensors for purposes of reading indicia from the documents.

The exemplary form of the device further includes an escrow area 428 along the transport path. In the escrow area documents that have been received are stored pending determination to either accept the documents or return them to the user. The exemplary deposit accepting device further includes a storage area 430 which operates to store documents that have been accepted for deposit within the deposit accepting device. Of course it should be understood that this structure is exemplary of arrangements that may be used.

In the exemplary embodiment documents are received through the opening and the presence of a document is sensed by at least one sensor 432. Sensing a document at the opening at an appropriate time during ATM operation (such as at a time when a user indicates through an input device of the machine that they wish to input a document) causes at least one processor to operate so as to control a gate 434. The processor operates upon sensing the document to cause the gate to move from the closed position to the open position. This is accomplished in the exemplary embodiment by a drive moving an actuator member 436 as shown in FIG. 81. The actuator member 436 includes a cam slot 438 which causes corresponding movement of the gate 434 to the desired position. In some embodiments the at least one sensor 432 or other sensor in the device is operative to sense properties that would indicate whether the document being inserted is a double or other multiple document. At least one processor in the ATM may operate in accordance with its programming to not accept multiple documents and to cause the ATM to provide at least one output to advise the user to insert a single document.

Figure 84:
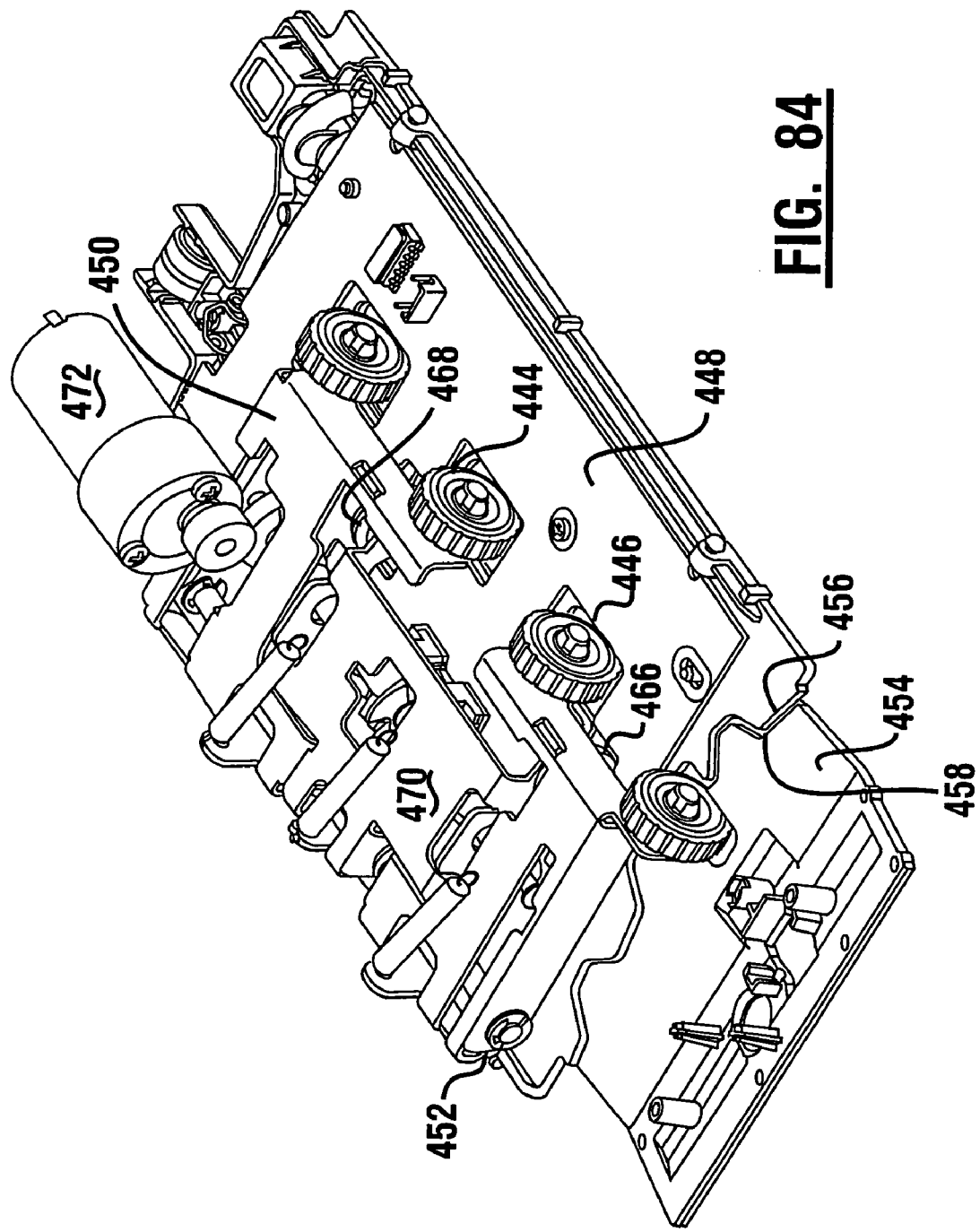
FIG. 84 is a top isometric view of a portion of an upper platen including elements of a first transport which moves documents in a first longitudinal direction in the deposit accepting apparatus and second transports which move documents in a direction transverse to the first direction.

Responsive to the sensing of the document and other conditions as determined by at least one processor, a first transport 440 operates to move the document into the document alignment area. In the exemplary embodiment the document is moved in engaged relation between a belt flight 442 and rollers 444. As best shown in FIGS. 81 and 84, rollers 444 extend in openings 446 in an upper platen 448 to engage or at least move in very close proximity to belt flight 442. As shown in FIG. 84, rollers 444 are mounted on a movable carriage 450. Carriage 450 is movable rotationally about a shaft 452. Movement of the carriage 450 enables selectively positioning of the rollers 444 to be in proximity to the surface of belt flight 442 or to be disposed away therefrom for reasons that are later discussed. After the document is sensed as having moved into the device the processor operates to cause the gate to be closed. Alternatively if a user has provided inputs through input devices on the machine indicating that they will be depositing more documents in the machine, the gate may remain open until the last document is deposited.

Figure 85:
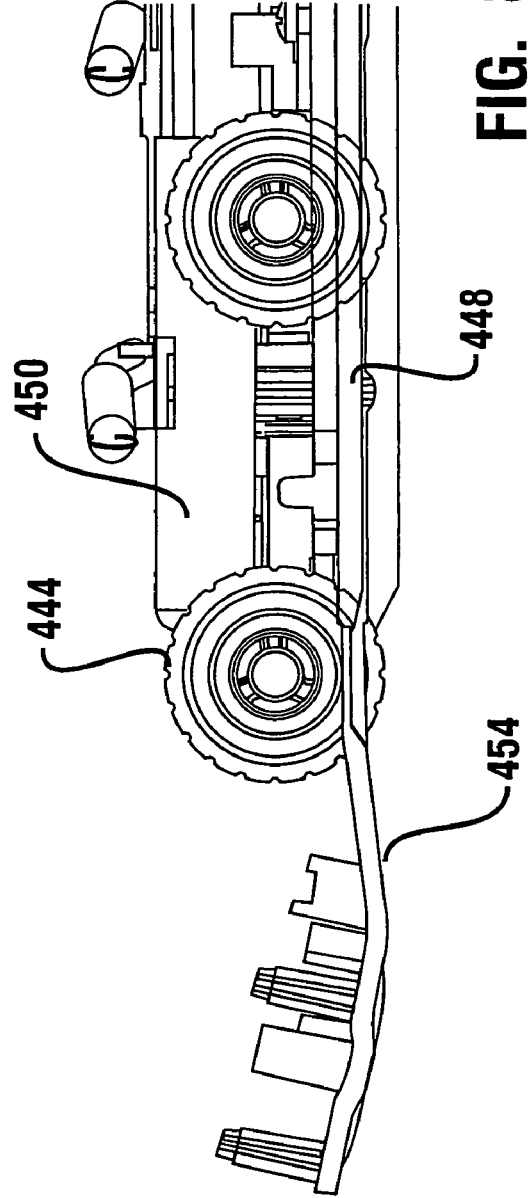
FIG. 85 is a side view of the platen and first and second drives shown in FIG. 84.
Figure 86:
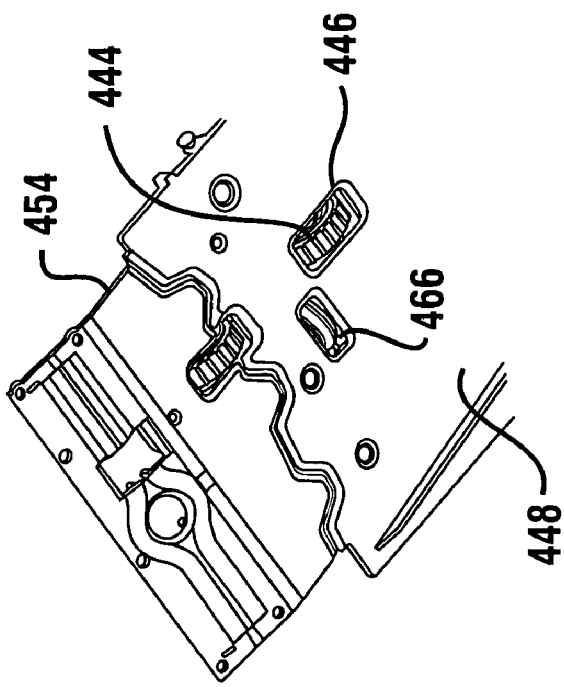
FIG. 86 is a bottom view corresponding to FIGS. 84 and 85 showing the platen with rolls of the first and second transports extending therethrough.

As shown in FIG. 84 through 86, platen 448 in the operative position is in adjacent relation with a lead in guide 454. Guide portion 454 and platen 448 include corresponding contoured edges 456, 458. The contoured edges of the exemplary embodiment are of a toothed contoured configuration. This configuration is used in the exemplary embodiment to reduce the risk that documents will become caught at the adjacent edges of the platen and the guide. The toothed contoured configuration of the adjacent surfaces helps to minimize the risk that documents catch or are folded or damaged as they pass the adjacent surfaces. Of course it should be understood that this approach is exemplary and in other embodiments other approaches may be used.

In the exemplary embodiment the document alignment area includes transverse transport rolls 460 and 462. The transverse transport rolls extend through apertures in the platen 464 that supports belt flight 442. The transverse transport rolls of the exemplary embodiment are configured to have axially tapered surfaces extending in each longitudinal direction from the radially outermost extending portion of the roll so as to minimize the risks of documents being caught by a surface thereof. In alternative embodiments transverse transport rolls may have simple or compound curved surfaces to minimize the risk of catching transversely moving documents, which configurations shall also be referred to as tapered for purposes of this disclosure. In the exemplary embodiment the upper surface of the transverse transport rolls are generally at about the same level as the upper surface of belt flight 442. In addition each of the transverse transport rolls are in operative connection with a drive device. The drive device of the exemplary embodiment enables the transverse transport rolls to move independently for purposes of aligning documents as later discussed.

In supporting connection with platen 448 are a pair of transverse follower rolls 466 and 468. The transverse follower rolls each extend in a corresponding opening in the platen 448. Transverse follower roll 466 generally corresponds to the position of transverse transport roll 460. Likewise transverse follower roll 468 corresponds to the position of transverse transport roll 462. As shown in FIG. 84, rolls 466 and 468 are supported on a movable carriage 470. Carriage 470 is rotatably movable about shaft 452. A drive 472 is selectively operative responsive to operation of one or more processors in the banking machine to cause the movement of carriage 470 and carriage 450. As a result, drive 472 of the exemplary embodiment is selectively operative to dispose rollers 444 adjacent to belt flight 442 or dispose the rollers therefrom. Likewise drive 472 is selectively operative to place transverse follower rolls 466 and 468 in adjacent relation with transverse transport rolls 460 and 462. These features are useful for purposes of aligning documents as will be later discussed. Of course this approach to a transverse transport for documents is exemplary and in other embodiments other approaches may be used.

The document alignment area 424 further includes a plurality of alignment sensors 474. In the exemplary embodiment non-contact sensors are used, which can sense the document without having to have any portion of the sensor contact the document. The exemplary alignment area includes three alignment sensors that are disposed from one another along the transport direction of belt flight 442. In the exemplary embodiment one sensor is aligned transversely with each of rolls 460 and 462 and a third sensor is positioned intermediate of the other two sensors. The alignment sensors of the exemplary embodiment are radiation type and include an emitter and a receiver. The sensors sense the documents that move adjacent thereto by detecting the level of radiation from the emitter that reaches the receiver. It should be understood that although three alignment sensors are used in the exemplary embodiment, other embodiments may include greater or lesser numbers of such sensors. Further while the alignment sensors are aligned along the direction of document transport in the exemplary embodiment, in other embodiments other sensor arrangements may be used such as a matrix of sensors, a plurality of transversely disposed sensors or other suitable arrangement.

The operation of the document alignment area will now be described with reference to FIGS. 88 through 98. In the exemplary embodiment when a document is sensed entering the device, carriage 450 which is controlled through the drive 472 is positioned such that rollers 444 are positioned in adjacent relation to belt flight 442. This position is shown in FIG. 88. In this document receiving position carriage 470 is moved such that the transverse follower rolls 466 and 468 are disposed away from the transverse transport rolls 460 and 462.

In response to sensing a document 476 being positioned in the inlet opening 422 and other appropriate conditions, the at least one processor is operative to cause the first transport 440 to move belt flight 442. If a double or other multiple document is sensed the first transport may not run or may run and then return the document to the user as previously discussed. Moving belt flight 442 inward causes the first document to be moved and engaged with the transport in sandwiched position between the rollers 444 and the belt flight as shown in FIG. 89. In this position the transverse transport and transverse follower rolls are disposed away from one another so that the document 476 can move in engagement with the first transport into the document alignment area. The tapered surfaces of the transverse transport rolls 460,462 facilitate the document moving past the rolls without snagging. It should also be noted that projections on the surface of platen 464 operate to help to move the document by minimizing the risk of the document snagging on various component features. Further the projections on the platen help to minimize the effects of surface tension that might otherwise resist document movement and/or cause damage to the document. Of course these approaches are exemplary, and other embodiments may employ other approaches.

Position sensors for documents are included in the document alignment area and such sensors are operative to sense when the document has moved sufficiently into the document alignment area so that the document can be aligned. Such sensors may be of the radiation type or other suitable types. When the document 476 has moved sufficiently inward, the first transport is stopped. In the stopped position of the transport, the drive 472 operates to move carriage 470 as shown in FIG. 92. This causes the transverse transport and follower rolls to move adjacent with the document 476 positioned therebetween so as to engage the document.

Figure 95:
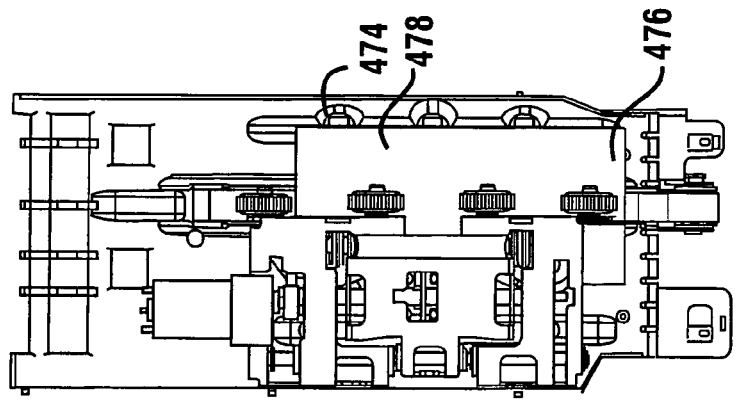
FIG. 95 is a view similar to FIG. 93 showing an edge of the document aligned with the non-contact sensors.
Figure 96:
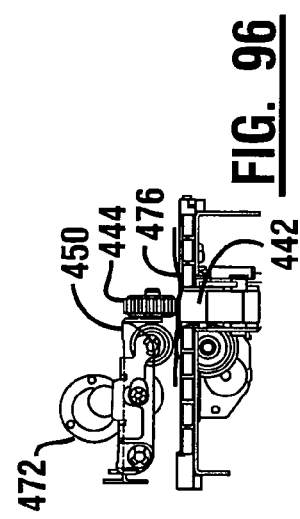
FIG. 96 corresponds to FIG. 95 and shows the positions of the first and second transports.
Figure 93:
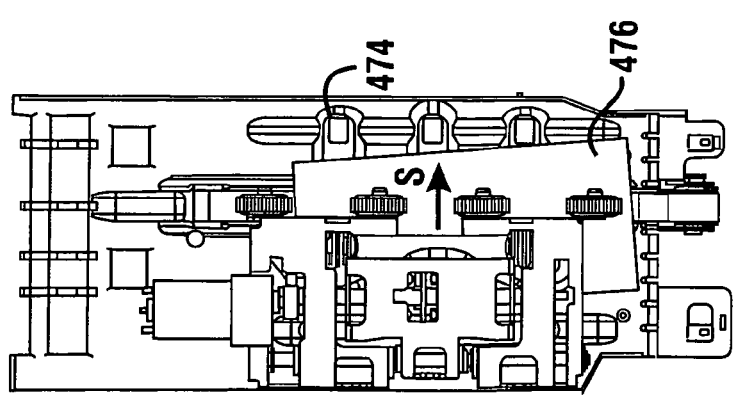
FIG. 93 is a view similar to FIG. 91 showing the document moved in a second direction transverse to the first direction.
Figure 94:
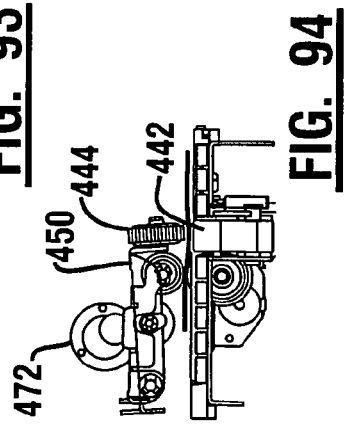
FIG. 94 is a front plan view showing the relative positions of the first and second transports when a document is moved in a transverse direction.

Thereafter as shown in FIGS. 93 and 94 the drive 472 is operative to move the carriage 450. This causes the rollers 444 to be disposed from belt flight 442 which disengages this transport with respect to the document. Thereafter the one or more drives which are operative to move the transverse transport rolls, operate responsive to at least one processor so as to move document 476 in a direction transverse to the direction of prior movement by belt flight 442 as well as to deskew the document. As shown in FIG. 95, the document 476 is moved sideways until a longitudinal edge 478 is aligned with the alignment sensors 474. In the exemplary embodiment the alignment sensors 474 provide a virtual wall against which to align the longitudinal edge of the document. The sensing of the document by the alignment sensors 474 enables precise positioning of the document and aligning it in a desired position which facilitates later reading indicia therefrom. In an exemplary embodiment in which the documents are checks, the precise alignment of the longitudinal edge enables positioning of the document and its micr line thereon so as to be in position to be read by a read head as later discussed. Of course in other embodiments other approaches may be used.

In some exemplary embodiments the alignment sensors are in operative connection with one or more processors so that the transports are controlled responsive to the sensors sensing a degree of reduction in radiation at a receiver from an associated emitter of a sensor as the document moves toward a blocking position relative to the sensor. The exemplary embodiment may be configured such that a drive operating the transverse transport roll may cease to further move the sheet transversely when the alignment sensor which is transversely aligned with the transport roll senses a certain reduction in the amount of radiation reaching the sensor from the emitter. Thereafter the other drive operating the other transverse transport roll may continue to operate until the alignment sensor that corresponds to that transport roll senses a similar degree of reduction. In this way the processor operating the independently controlled transverse transport rolls cause the longitudinal edge of the document to be aligned with the virtual wall produced through use of the sensors.

In alternative embodiments the apparatus may operate in accordance with its programming to cause the respective transverse transport rolls to move the document transversely such that a reduction in radiation from the respective emitter is sensed reaching the corresponding receiver until no further reduction occurs. This corresponds to a condition where the document fully covers the corresponding receiver. Thereafter the respective drive for the transverse transport roll may be reversed in direction to a desired level such as, for example, fifty percent of the total reduction which would indicate that the transverse edge is positioned to cover approximately fifty percent of the receiver. In this way this alternative embodiment may be able to align documents that have relatively high radiation transmissivity or transmissivity that is variable depending on the area of the document being sensed by the sensor. Alternatively a transverse linear array of sensors, such as CCDs may be used to determine the transverse position of a particular portion of the edge of the sheet. A plurality of spaced arrays may be used to sense the position of the sheet.

Of course these approaches are exemplary and in other embodiments other approaches may be used.

Once the document has been aligned and moved to the position shown in FIG. 95, the drive 472 operates to move the carriage 450 such that the rollers 444 are again moved adjacent to belt flight 442. Thereafter the drive moves the carriage 470 so as to dispose the transverse follower rolls 466 and 468 away from the transverse transport rolls. This position is shown in FIG. 88. Thereafter the now aligned document can be further moved along the transport path through movement of the first transport out of the document alignment area of the device to the document analysis area.

Figure 97:
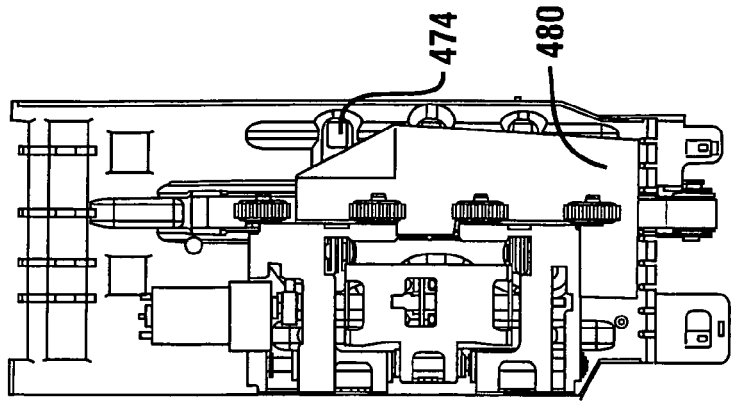
FIG. 97 is a view similar to FIG. 95 but showing an alternative document including a folded edge.
Figure 98:
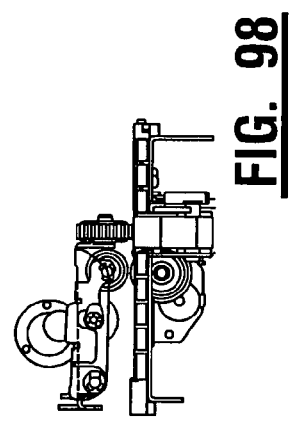
FIG. 98 is a front view of the first and second transports corresponding to FIG. 97.

FIGS. 97 and 98 disclose an operational feature of the exemplary embodiment where a document 480 has a folded edge. In this exemplary situation the folded edge is configured so that the alignment sensor 474 which corresponds to transverse transport roll 462 cannot sense a longitudinal edge of the document until the document is unduly skewed. However, in this situation the middle alignment sensor will be operative to sense the middle portion of the longitudinal edge as will the alignment sensor that corresponds to transverse transport roll 460 before sensor 474 senses the edge of the document. In the exemplary embodiment the at least one processor that controls the operation of the drives for the transverse transport rolls is operative to control movement of the document transversely when the middle alignment sensor senses the edge of the document even through one of the end sensors has not. This is true even for a folded document or a document that has been torn. The at least one processor controls each transverse roll to move the document transversely until two of the three sensors detect and edge of the document in the desired aligned position. In this way even such an irregular document is generally accurately aligned in the longitudinal direction from the transport.

It should be understood that the exemplary embodiment uses radiation type sensors for purposes of aligning the document in the alignment section. In other embodiments other types of sensors such as sonic sensors, inductance sensors, air pressure sensors or other suitable sensors or combinations thereof, may be used.

Once the document has been aligned in the document alignment area of the transport path, the deposit accepting device operates responsive to the programming associated with one or more processors, to cause the document to be moved along the transport path by the first transport into the document analysis area. In the exemplary embodiment the document analysis area includes at least one magnetic sensing device which comprises the magnetic read head 482. Magnetic read head 482 is in supporting connection with platen 448 and in the exemplary embodiment is movable relative thereto. The alignment of the document in the document alignment area is operative in the exemplary embodiment to place the micr line on the check in corresponding relation with the magnetic read head. Thus as the document is moved by the first transport into the document analysis area, the micr line data can be read by the magnetic read head. Of course in some alternative embodiments micr or other magnetic indicia may be read through other magnetic sensing elements such as the type later discussed, or optically, in the manner shown in U.S. Pat. No. 6,474,548, for example.

FIGS. 99 through 101 show an exemplary form of the movable mounting for the magnetic read head 482. In the exemplary embodiment the magnetic read head is positioned in a retainer 484. Retainer 484 includes a first projection 486 that extends in and is movable in an aperture 488. Retainer 484 also includes a projection 490 which is movable in an aperture 492. A tension spring 494 extends through a saddle area 496 of the housing 484. The saddle area includes two projections which accept the spring 494 therebetween. This exemplary mounting for the magnetic read head provides for the head to float such that it can maintain engagement with documents that are moved adjacent thereto. However, the movable character of the mounting which provides both for angular and vertical movement of the read head reduces risk of snagging documents as the documents move past the read head. Further the biased spring mounting is readily disengaged and enables readily replacing the magnetic read head in situations where that is required. Of course this approach is exemplary and in other embodiments other approaches may be used.

The exemplary document analysis area includes in addition to the read head a magnetic sensing element 498. The magnetic sensing element in some exemplary embodiments may read magnetic features across the document as the document is moved in the document analysis area. In some embodiments the magnetic reading device may be operative to read numerous magnetic features or lines so as to facilitate the magnetic profile of the document as discussed herein. In some embodiments the magnetic sensing element may sense areas of the document in discrete elements which provide a relatively complete magnetic profile of the document or portions thereof. In some embodiments the magnetic sensing capabilities may be sufficient so that a separate dedicated read head for reading the micr line of checks is not required. Of course these approaches are exemplary and may vary depending on the type of documents which are being analyzed through the system.

The exemplary document analysis area further includes a first scanning sensor 500 and a second scanning sensor 502. The scanning sensors are operative to sense optical indicia on opposed sides of the document. The scanning sensors in combination with at least one processor are operative to produce data which corresponds to a visual image of each side of the document. This enables analysis of visual indicia on documents through operation of at least one processor in the ATM. In the case of checks and other instruments the scanning sensors also enable capturing data so as to produce data which corresponds to image of a check which may be used for processing an image as a substitute check, and/or other functions.

In some embodiments, the data corresponding to images of the documents may be used by the ATM to provide outputs to a user. For example, an image of a check may be output through a display screen of the ATM so a user may be assured that the ATM has captured the image data. In some cases at least one processor in the ATM may apply digital watermarks or other features in the data to minimize the risk of tampering. In some embodiments at least one processor may operate in accordance with its programming to indicate through visual outputs to a user with the image that security features have been applied to the image data. This may include outputs in the form of words and/or symbols which indicate a security feature has been applied. This helps to assure a user that the ATM operates in a secure manner in processing the accepted check. Of course, this approach is exemplary of things that may be done in some embodiments.

In alternative embodiments the programming of one or more processors associated with the ATM may enable the scanning sensors, magnetic sensors and other sensing elements to gather data which is usable to analyze other types of documents. Other types of sensing elements may include, for example, UV, IR, RFID, fluorescence, RF and other sensors that are capable of sensing properties associated with document. Documents may include for example receipts, certificates, currency, vouchers, travelers checks, tickets or other document types. The data gathered from the sensors in the analysis area may be processed for purposes of determining the genuineness of such items and/or the type and character thereof. Of course the nature of the sensors included in the analysis area may vary depending on the type of documents to be processed by the device. Also some embodiments may operate so that if a micr line or other magnetic characters on the document are not aligned with the magnetic read head, the document can nonetheless be analyzed and processed using data from other sensors.

It should also be noted that documents are moved in the document analysis area through engagement with a plurality of driving rolls 504. The driving rolls 504 operate in response to one or more drives that are controlled responsive to operation of one or more processors in the ATM. The drives are operative to move documents into proximity with and past the sensors so as to facilitate the reading of indicia thereon. The document may be moved in one or more directions to facilitate the reading and analysis thereof.

Once a document has been moved through the document analysis area, the document passes along the transport path into escrow area 428. Escrow area 428 includes a third transport 506. Transport 506 includes an upper belt flight 508. The plurality of cooperating rollers 510 supported through platen 449 are positioned adjacent to belt flight 508 in the operative position. Documents entering the escrow area are moved in engagement with belt flight 508 and intermediate to belt flight and the rollers.

In the exemplary embodiment documents that have been passed through the document analysis area are moved in the escrow area where the documents may be stopped for a period of time during which decisions are made concerning whether to accept the document. This may include for example, making a determination through operation of the ATM or other connected systems concerning whether to accept an input check. If it is determined that the check should not be accepted, the direction of the transports is reversed and the check is moved from the escrow area through the document analysis area, the document alignment area and back out of the ATM to the user. Alternatively if the decision is made to accept the document into the ATM, the document is moved in a manner later discussed from the escrow area to the document storage area of the device.

In some exemplary embodiments the escrow area may be sufficiently large to hold several checks or other documents therein. In this way a user who is conducting a transaction involving numerous checks may have all those checks accepted in the machine, but the programming of the machine may enable readily returning all those checks if the user elects to do so or if any one or more of the documents is determined to be unacceptable to the machine. Alternatively or in addition, storage devices such as belt storage mechanisms, transports or other escrow devices may be incorporated into the transport path of a deposit accepting device so that more numerous documents may be stored therein and returned to the user in the event that a transaction is not authorized to proceed. Of course these approaches are exemplary.

It should be noted that the exemplary escrow area includes a lower platen with a plurality of longitudinal projections which extend thereon. The longitudinal projections facilitate movement of the document and reduce surface tension so as to reduce the risk of the document being damaged.

In the exemplary embodiment the escrow area further includes a stamper printer 512. In the exemplary embodiment the stamper printer is supported through platen 449 and includes an ink roll type printer which is described in more detail in FIGS. 105 through 107. The escrow area further includes a backing roll 514 which operates to assure that documents move in proximity to the stamper printer so that indicia can be printed thereon.

The exemplary form of the stamper printer is shown in greater detail in FIGS. 105 through 107. The exemplary printer includes an eccentric ink bearing roll 518 shown in FIG. 107. The eccentric shape of the ink bearing roll in cross section includes a flattened area 520 which is disposed radially closer to a rectangular opening 522 which extends in the roll, than a printing area 524 which is angularly disposed and in opposed relation thereof. The flattened area is generally positioned adjacent to documents when documents are moved through the escrow area and printing is not to be conducted thereon by the stamper printer. In the exemplary embodiment the ink roll 518 is encapsulated in plastic and is bounded by a plastic coating or cover about its circumference. Apertures or openings are cut therethrough in the desired design that is to be printed on the documents. As can be appreciated, the apertures which are cut in the plastic which encapsulates the outer surface of the ink bearing roll enables the ink to be transferred from the ink holding roll material underlying the plastic coating, to documents in the shape of the apertures. For example in the embodiment shown a pair of angled lines are printed on documents by the stamper printer. Of course this approach is exemplary and in other embodiments other types of inking mechanisms and/or designs may be used.

In the exemplary embodiment the ink roll 518 is supported on a first shaft portion 526 and a second shaft portion 528. The shaft portions include rectangular projections that are generally rectangular in profile 523, that extend in the opening 522 of the ink roll. The shaft portions include flanged portions 530 and 532 that are disposed from the radial edges of the roll. Shaft portions 526 and 528 include an interengaging projection 525 and access 527, as well as a tab 529 and recess that engage and serve as a catch, which are operative to engage and be held together so as to support the roll.

Shaft portion 526 includes an annular projection 534. Annular projection 534 is adapted to engage in a recess which is alternatively referred to as a slot (not separately shown) which extends generally vertically in a biasing tab 536 as shown in FIG. 105. Biasing tab 536 is operative to accept the projection in nested relation and is operative to provide an axial biasing force against shaft portion 526 when the first shaft portion is positioned therein. This arrangement enables holding the shaft portion in engaged relation with the biasing tab. However, when it is desired to change the stamper printer and/or the ink roll therein, the biasing tab may be moved such that the annular projection may be removed from the interengaging slot by moving the projection 534 upward in the recess so as to facilitate removal of the printer and ink roll. The biasing tab is supported on a bracket 538 that is in supporting connection with the platen which overlies the escrow area.

Second shaft portion 528 includes an annular projection 540. Projection 540 includes on the periphery thereof an angled radially outward extending projection 542. Projection 542 has a particular contour which is angled such that the transverse width of the projection increases with proximity to the flange portion 542. This configuration is helpful in providing a secure method for moving the ink roll but also facilitates changing the ink roll and stamper printer when desired.

In the exemplary embodiment the ink roll 518 is housed within a housing 544. Housing 544 is open at the underside thereof such that the printing area 524 can extend therefrom to engage a document from the escrow area. Housing 544 also includes two pairs of outward extending ears 546. Ears 546 include apertures therein that accept housing positioning projections 545 on the associated mounting surface of the device and are operative to more precisely position the housing and the ink roll on the supporting platen and to facilitate proper positioning when a new ink roll assembly is installed. Housing 544 also includes apertures 543 through which the shaft portions extend. A flange portion is positioned adjacent to each aperture.

In the exemplary embodiment shaft portion 528 is driven through a clutch mechanism 548. Clutch mechanism 548 of the exemplary embodiment is a wrap spring clutch type mechanism which is selectively actuatable through electrical signals. The clutch is driven from a drive through a gear 550. The clutch 548 outputs rotational movement through a coupling 552. Coupling 552 includes the annular recess that corresponds to projection 540 and a radial recess which corresponds in shape to projection 542. Thus in the exemplary embodiment the force of the biasing tab enables the coupling 552 to solidly engage shaft portion 528.

During operation gear 550 which is operatively connected to a drive provides a mechanical input to the clutch 548. However, the ink roll generally does not rotate. Transport 506 is operative to move a document in the transport in the escrow area responsive to signals from a processor. Sensors such as radiation sensors in the escrow area are operative to indicate one or more positions of the document to the processor. When the document is to be marked with the stamper printer it is positioned adjacent to the ink roll by operation of a processor controlling the transport in the escrow area. A signal is sent responsive to the processor to the clutch 548. This signal is operative to engage the coupling 552 which causes the shaft portions 528 and 526 to rotate the ink roll 518. As the ink roll rotates the printing area 524 engages the surface of the document causing ink markings to be placed thereon. The ink roll rotates in coordination with movement of the document. The clutch is operative to cause the coupling to carry out one rotation such that after the document has been marked, the printing area is again disposed upward within the housing. The flattened portion 520 of the ink roll is again disposed in its initial position facing the document. Thus documents are enabled to pass the stamper printer 512 without having any unwanted markings thereon or without being snagged by the surfaces thereof.

It should be understood that when it is desired to change the stamper printer ink roll because the ink thereon has become depleted or alternatively because a different type of marking is desired, this may be readily accomplished. A servicer does this by deforming or otherwise moving the biasing tab 536 and moving the shaft portion 526 upward such that the annular projection 534 no longer extends in the slot in the biasing tab. This also enables projection 534 to be moved upward and out of a stationary slot 554 in the bracket 538. As the annular projection 534 is moved in this manner the annular projection 540 and radial projection 542 are enabled to be removed from the corresponding recesses in the coupling 552. This enables the housing 544 to be moved such that the ears 546 on the housing can be separated from the positioning projections which help to assure the proper positioning of the ink roll when the housing is in the operative position. Thereafter a new housing shaft and ink roll assembly can be installed. This may be accomplished by reengaging the projections 540 and 542 with the coupling 552 and engaging the projection 534 in the slot of biasing tab 536. During such positioning the positioning projections are also extended in the ears 546 of the housing, to locate the housing and reliably position the ink roll.

It should further be understood that although only one ink roll is shown in the exemplary embodiment, alternative embodiments may include multiple ink rolls or multiple stamper printers which operate to print indicia on checks. Such arrangements may be used for purposes of printing varied types of information on various types of documents. For example in some situations it may be desirable to return a document that has been processed through operation of the device to the user. In such circumstances a stamper printer may print appropriate indicia on the document such as a "void" stamp or other appropriate marking. Of course the type of printing that is conducted may vary as is appropriate for purposes of the particular type of document that is being processed. In other embodiments alternative approaches may be used.

Figure 109:
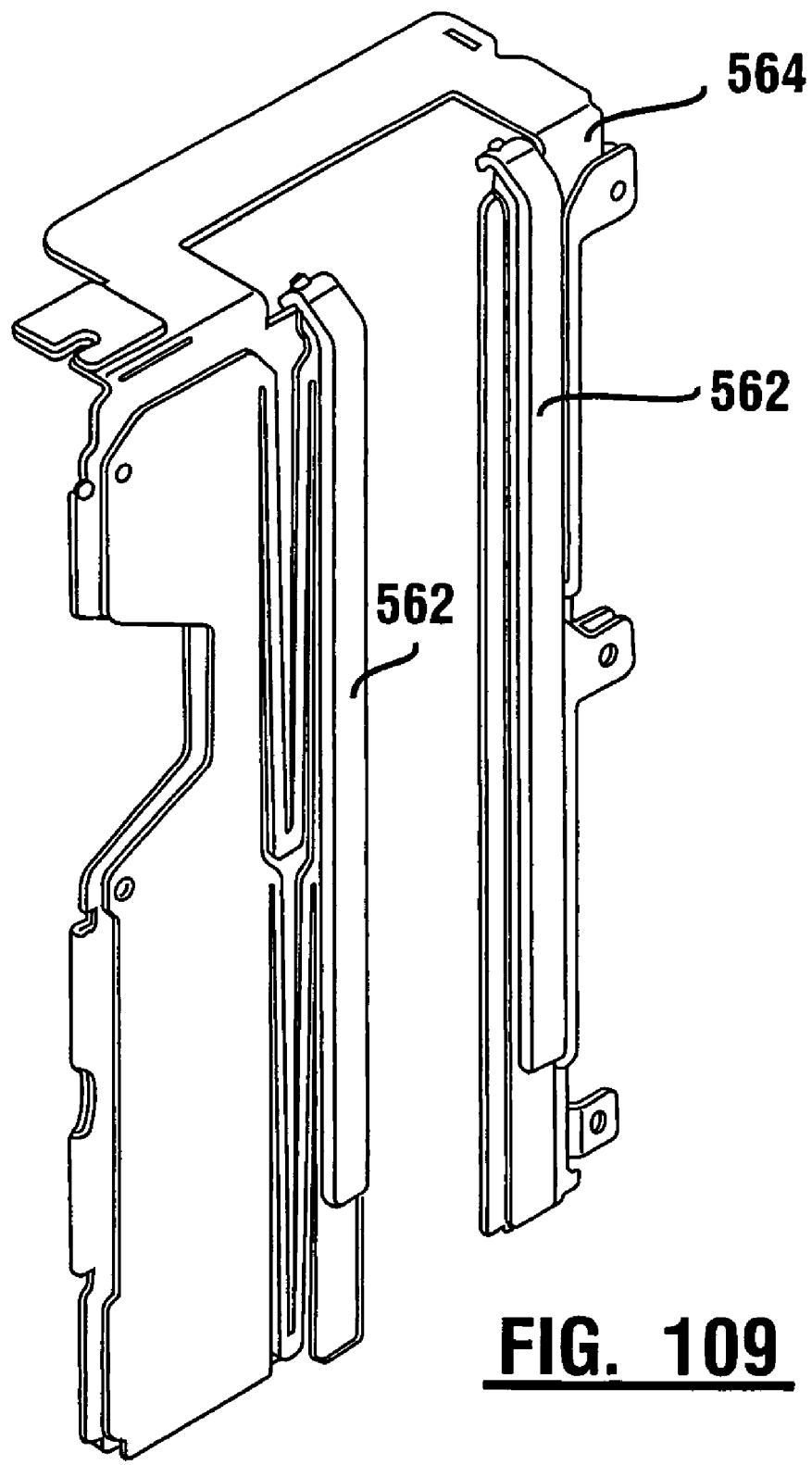
FIG. 109 is an isometric view of the guide of the vertically extending transport that extends in the storage mechanism.
Figure 110:
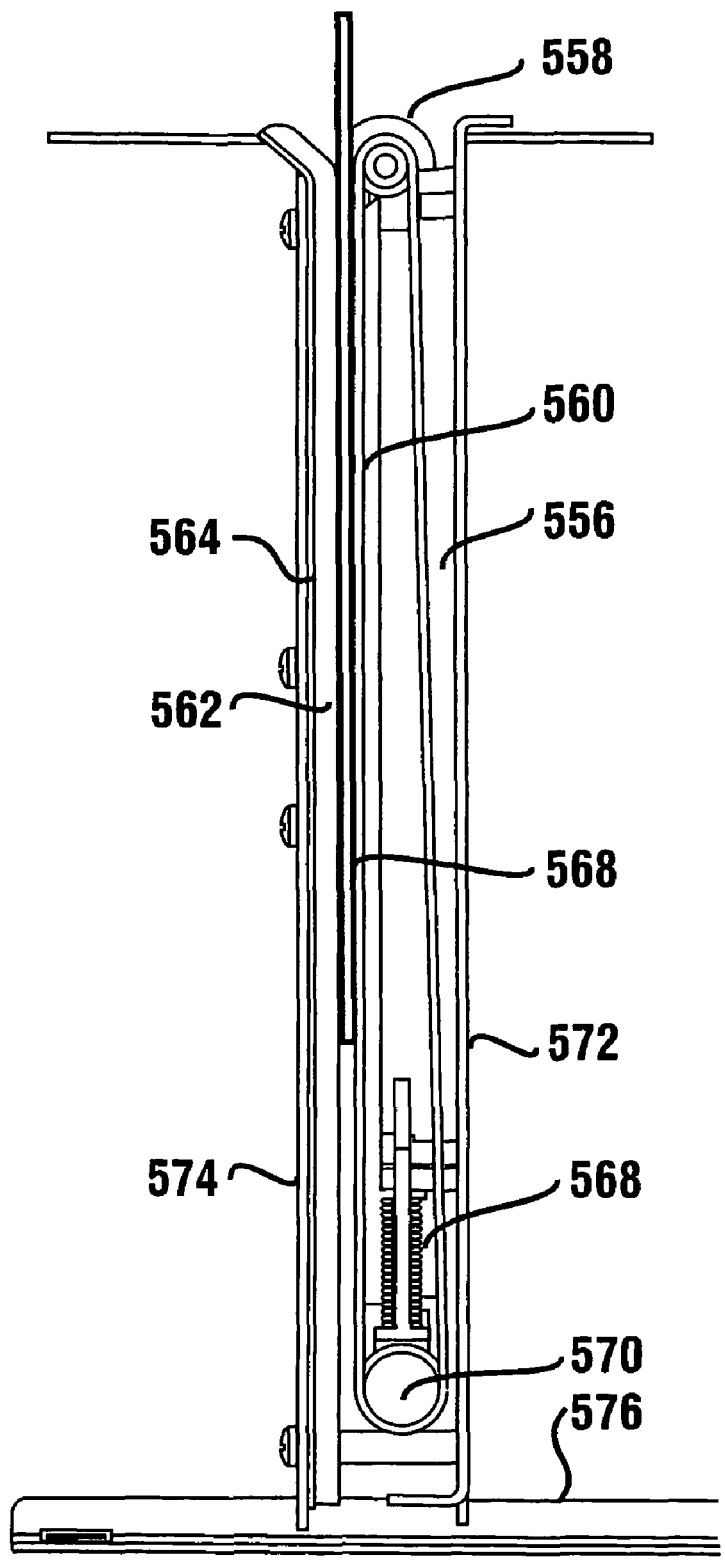
FIG. 110 is a side view of the vertically extending transport that extends in the storage area of the alternative deposit accepting apparatus.
Figure 111:
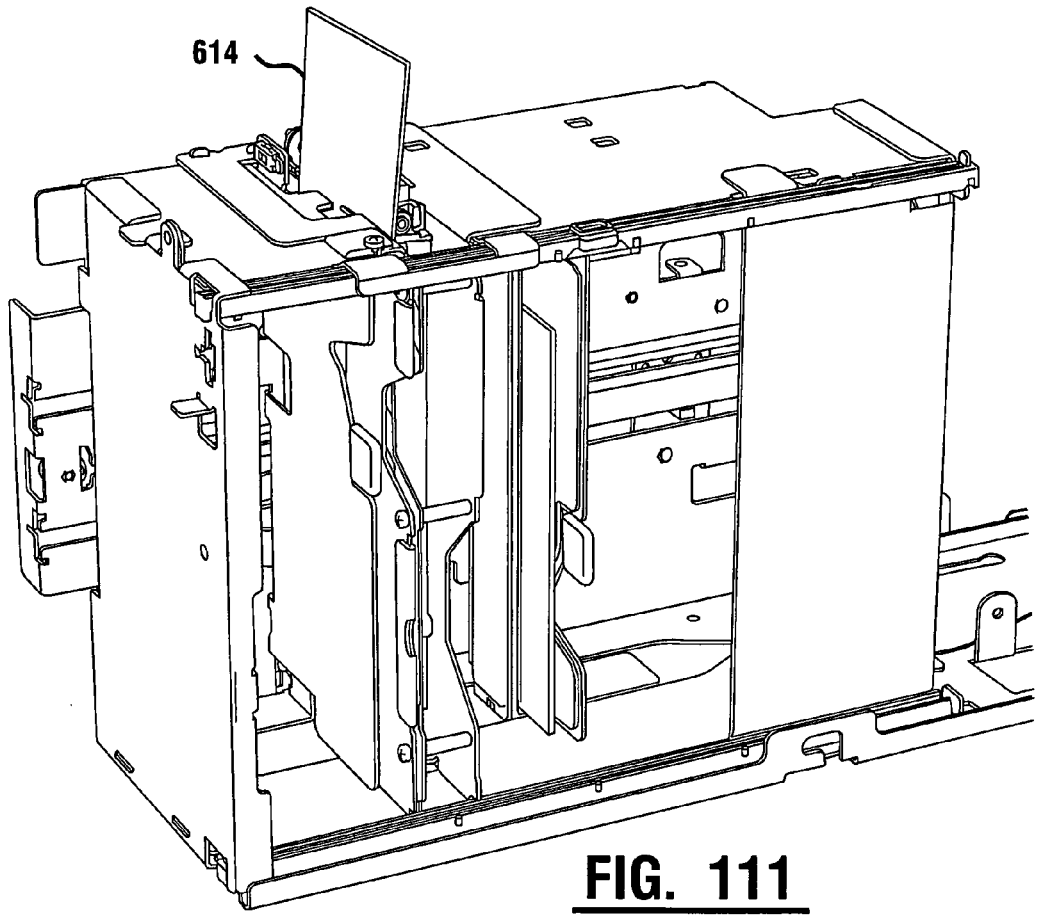
FIG. 111 is an isometric view of the apparatus shown accepting a document into the vertically extending transport.

In the exemplary embodiment a document that is to be moved from the escrow area can be more permanently stored in the machine by moving the document to a storage area 430. Documents are moved from the escrow area toward the storage area by moving the document in engagement with belt flight 508 so that the document engages a curved deflector 554. Deflector 554 causes the document to engage a vertical transport 556 that extends in the storage area 430. As best shown in FIG. 110 vertical transport 556 includes two continuous belts that are driven by a drive 558. The transport 556 includes a pair of disposed belts, each of which has a belt flight 560. Each belt flight 560 extends in generally opposed relation of a corresponding rail 562 of a vertical guide 564. As shown in FIG. 109 guide 564 of the exemplary embodiment is constructed so that the rails 562 are biased toward the belt flights by a resilient material. This helps to assure the document can be moved between the belt flights and the rails in sandwiched relation. Such a document 568 is shown moving between the rails and the belt flights in FIG. 110.

It should also be noted that in the exemplary embodiment the drive 558 includes a spring biasing mechanism 568. The biasing mechanism acts on lower rolls 570 to assure proper tension is maintained in the belt flights 560.

Further in the exemplary embodiment the transport belts are housed within a housing which includes a pair of spaced back walls 572. As later discussed, back walls 572 serve as support surfaces for stacks of documents that may be stored in a first section or location of the storage area of the device. Similarly guide 564 includes a pair of transversely disposed wall surfaces 574. Wall surfaces 574 provide support for a stack of documents disposed in a second section or location of the storage area. Also as shown in FIG. 110, the vertical transport 556 moves documents to adjacent a lower surface 576 which bounds the interior of the storage area. Document sensing devices are provided along the path of the vertical transport so that the drive 558 can be stopped through operation of at least one processor once the document has reached the lower surface. This helps to assure that documents are not damaged by movement in the drive. Of course these approaches are exemplary and in other embodiments other approaches may be used.

In the exemplary embodiment when at least some documents are moved from the escrow area into the vertical transport, the device operates to print indicia thereon. This may be indicia of various types as described herein, as would be appropriate for the types of documents being processed. In the exemplary embodiment printing on the documents is carried out through operation of an inkjet printer 578. The inkjet printer includes a removably mounted printhead that is adjacent to documents as they are moved in the vertical transport portion of the sheet path. The inkjet printer includes nozzles which are operative to selectively expel ink therefrom toward the sheet path and shoot ink onto the adjacent surface of the document. The nozzles of the inkjet printer operate in accordance with the programming of a processor which is operative to drive the inkjet printer to expel ink selectively therefrom to produce various forms of characters on the documents as may be desired. For example in an exemplary embodiment the printer may be operative to print indicia on checks so as to indicate transaction information and/or the cancellation of such checks. In the exemplary embodiment the print head is releasably mounted through moveable members to enable ready installation and removal.

The exemplary embodiment further includes an ink catching mechanism 580 which is alternatively referred to herein as an ink catcher. In the exemplary embodiment the ink catching mechanism is operative to capture ink that may be discharged from the printhead at times when no document is present. This may occur for example if a document is misaligned in the transport or if the machine malfunctions so that it attempts printing when no document is present. Alternatively the inkjet printer may be operated responsive to at least one processor at times when documents are not present for purposes of conducting head cleaning activities or other appropriate activities for assuring the reliability of the inkjet printer. Further the exemplary embodiment of the ink catcher mechanism is operative to tend the printhead by wiping the nozzles so as to further facilitate reliable operation. Of course it should be understood that the exemplary ink catcher shown and described is only one of many ink catcher configurations that may be used.

Figure 103:
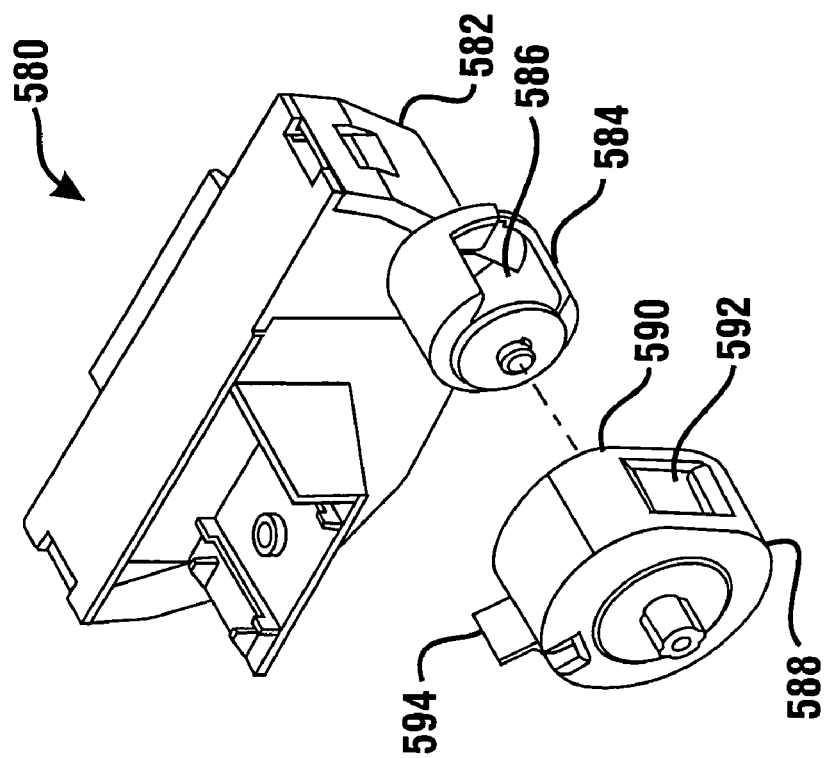
FIG. 103 is a partially exploded view showing the movable head disposed from the body of the ink catcher.
Figure 102:
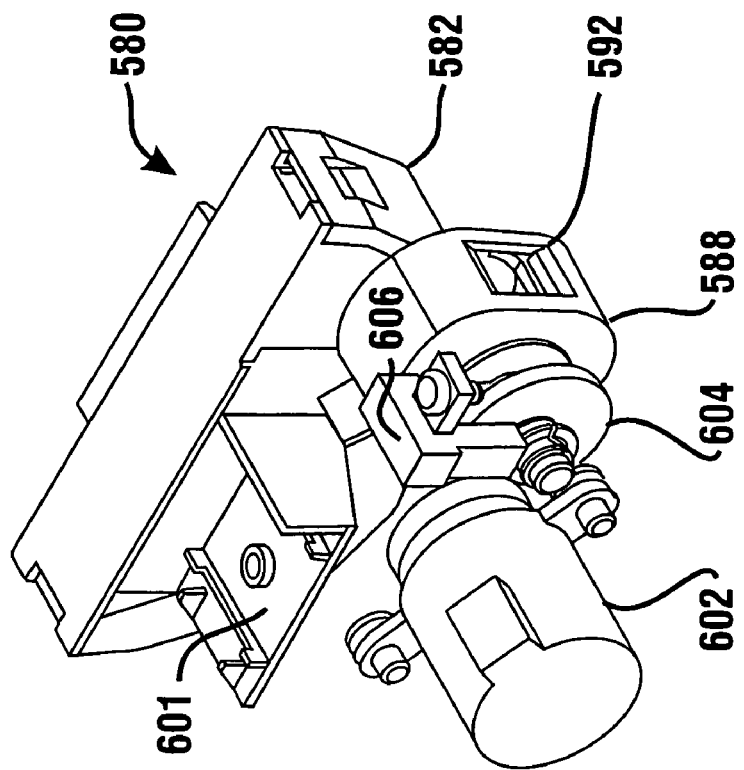
FIG. 102 is an isometric view showing an ink catcher mechanism of an exemplary embodiment.
Figure 104:
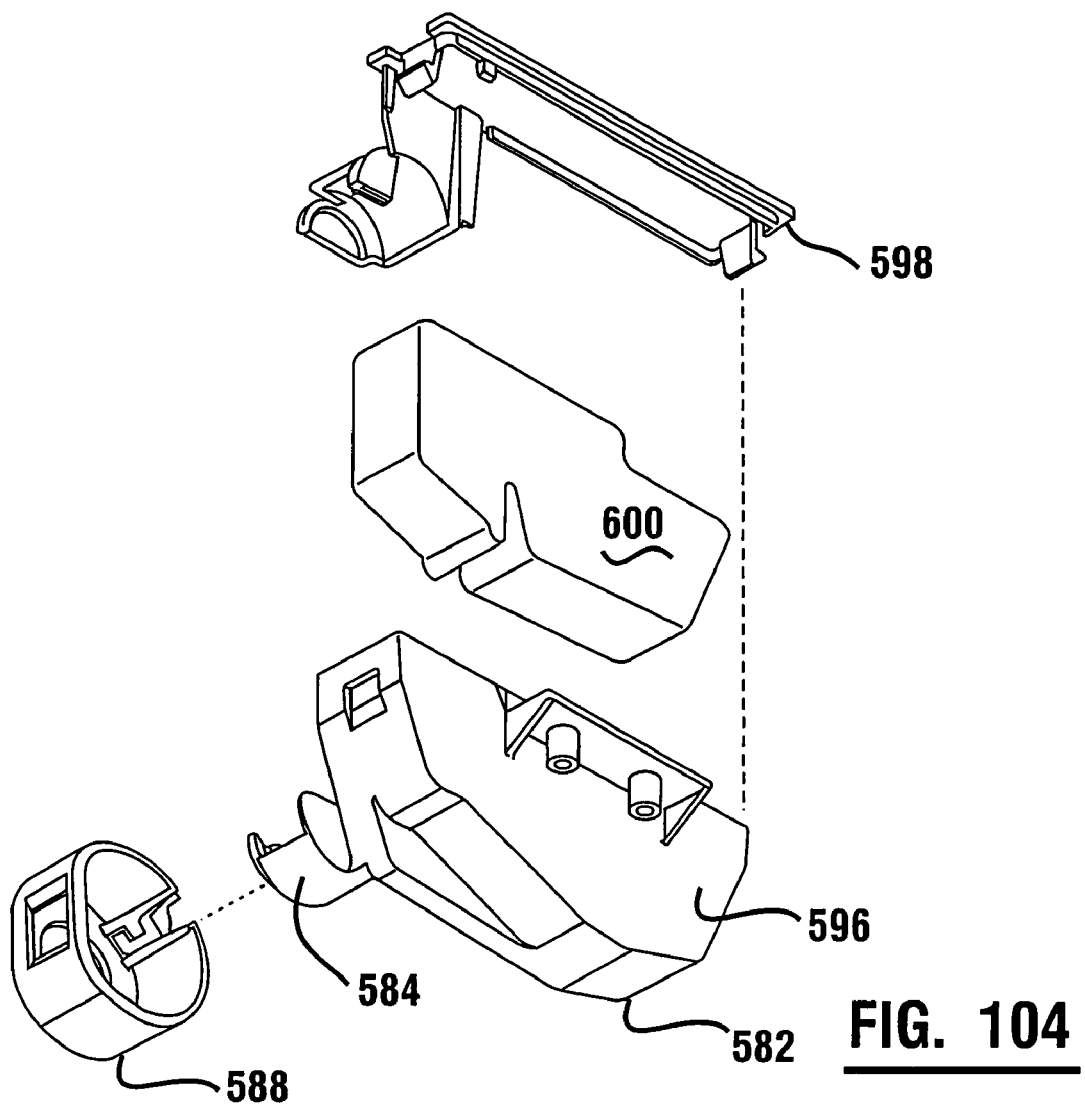
FIG. 104 is an exploded isometric view showing the body of the ink catcher of FIG. 102.

An exemplary form of the ink catching mechanism is shown in FIGS. 102 through 104. The ink catching mechanism includes an ink holding body 582 with an ink holding area therein. Body 582 has thereon an annular projecting portion 584. Projecting portion 584 has an opening 586 therein. Opening 586 of the projecting portion is in fluid communication with the ink holding interior area of the main portion of the body. Of course this body configuration is merely exemplary.

A head portion 588 is comprised of a body portion configured to extend in overlying relation of the projecting portion 584. Head portion 588 of the exemplary embodiment comprises a generally annular body member that includes a flattened area 590 which has an opening 592 therein. Head portion 588 also has in supporting connection therewith a resilient wiper member 594 extending radially outward therefrom in an area disposed angularly away from the opening 592.

As shown in FIG. 104 the exemplary embodiment of body 582 is of a generally clamshell construction and includes a lower portion 596 and an upper portion 598. The upper and lower portions fit together as shown to form the body, including the annular projecting portion. Also housed within the interior of the exemplary embodiment of the body is an ink absorbing member 600. The ink absorbing member is operative to absorb ink which passes into the interior of the body through opening 586. The body is releasably mounted in the machine through a mounting portion 601 which accepts suitable fasteners or other holding devices.

In the operative condition the head portion 588 extends in overlying generally surrounding relation of the projecting portion 584. The head portion is enabled to be selectively rotated through operation of a drive 602 that is operatively connected therewith. A disk member 604 and sensor 606 are operative to sense at least one rotational position of the head portion 588.

In operation of the exemplary form of the device the head portion 588 is generally positioned as shown in FIG. 102 with the opening 592 of the head portion in aligned relation with the opening 586 in the projecting portion of the body. The projecting portion extends within an interior area of the rotatable head portion. In this position ink expelled from the inkjet printhead which does not strike a document, passes into the interior of the body through the aligned openings. Thus for example if the programming of the machine calls for the machine to periodically conduct a head cleaning operation in which the nozzles of the inkjet printhead are fired, the ink can be transmitted through sheet path in the area of the transport where documents are normally present and into the body of the ink catcher mechanism. Thereafter or periodically in accordance with the programming of the machine, a processor in operative connection with the drive is operative to cause the drive 602 to rotate the head portion 588. Rotation of the head portion is operative to cause the flexible wiper member 594 to engage the print head and wipe over the openings of the inkjet nozzles. This avoids the buildup of ink which can prevent the efficient operation of the inkjet printer. Once the wiper has moved across the nozzles the head returns to the position so that excess ink is accepted within the body. This is done in the exemplary embodiment by having the head portion rotate in a first rotational direction about a full rotation. In this way the head portion rotates from the position where the openings in the head portion and projecting portion are aligned with the print head. The head portion is rotated so the openings are no longer aligned and the flexible wiper member engages the print head and wipes across the nozzles thereof. The head portion continues to rotate until the openings are again aligned.

In the exemplary embodiment the drive operates responsive to the at least one processor to rotate the head portion in the first rotational direction about 360 degrees and then stops. In other embodiments the drive may reverse direction and/or operate the head portion to undergo multiple rotations. In other embodiments the movable member may include multiple openings and wiper members and may move as appropriate based on the configuration thereof. In other embodiments the movable member may include multiple openings and wiper members and may move as appropriate based on the configuration thereof.

In some embodiments the at least one processor may operate the print head periodically to clean or test the print head, and may operate the ink catcher to wipe the nozzles only after such a cleaning or test. In some alternative embodiments wiping action may be done after every print head operation or after a set number of documents have been printed upon. Various approaches may be taken in various embodiments.

In exemplary embodiments suitable detectors are used to determine when the print head needs to be replaced. At least one processor in operative connection with the print head may operate to provide an indication when the print cartridge should be changed. Such an indication may be given remotely in some embodiments, by the machine sending at least one message to a remote computer. In the exemplary embodiment a servicer may readily remove an existing print cartridge such as by moving one or more fasteners, tabs, clips or other members. A replacement cartridge may then be installed, and secured in the machine by engaging it with the appropriate members. In the exemplary embodiment electrical contacts for the print head are positioned so that when the cartridge is in the operative position the necessary electrical connections for operating the print head are made. The new cartridge is installed with the print head thereof positioned in aligned relation with the opening in the head portion of the ink catcher so that ink from the print head will pass into the ink catcher and be held therein if there is no document in the sheet path between the print head and the ink catcher at the time ink is expelled therefrom.

In the exemplary embodiment after a new ink cartridge has been installed a servicer may test the operation of the printer. This is accomplished by providing appropriate inputs to the machine. A servicer moves a sheet into the sheet path. This may be done in some cases manually and in other cases by providing and moving a sheet in the sheet path through one or more transports. One or more inputs from the servicer to input devices of the machine causes the processor to operate the printer to expel ink from the print head toward the sheet path. If the sheet is present ink impacts the sheet to print thereon. In some cases the processor operates the print head to print an appropriate pattern such as one that tests that all the nozzles are working. In other embodiments other indicia may be printed. Of course if no sheet is present in the sheet path, the ink from the print head passes into the body of the ink catcher through the opening in the head portion. Of course this approach is exemplary, and in other embodiments other approaches and processes may be used.

In some embodiments after printing is conducted the machine may operate to wipe the nozzles of the print head. This may be done in response to the programming associated with the processor and/or in response to an input from a servicer. In such a situation the drive operates to rotate the head portion 588 about the projecting portion 584 so that the flexible wiper member engages the print head. In the exemplary embodiment the wiper member wipes across the print head as the head portion of the ink catcher makes about one rotation from its initial position. The head portion rotates responsive to the drive until the head portion is again sensed as having the opening therein aligned with the print head. This is sensed by the sensor 606 sensing the rotational position of the disk member 604. In response to sensing that one head portion is in the position for capturing ink from the print head, the processor is operative to cause the drive to cease operation. Of course these approaches are exemplary and in other embodiments other approaches may be used.

In an exemplary embodiment when the ink catching mechanism has become filled with ink it is possible to replace the body by disengaging one or more fasteners that hold it in position and install a new one in the operative position. Alternatively in some embodiments the body may be opened and the ink absorbing member 600 removed and replaced with a new member.

In the exemplary embodiment the body is disengaged from the machine by disengaging the one or more fasteners or other devices that hold the mounting portion 601 to the adjacent housing structure of the document accepting device. Once this is done the body 580 is moved so that the projecting portion 584 no longer extends within the interior area of the movable head portion 588. Once this is done the body can be discarded. Alternatively, the body may be opened, the ink absorbing member 600 removed, a new ink absorbing member installed and the body again closed.

A new body or one with a new ink absorbing member is installed by extending the projection portion 584 thereof within the interior area of the head portion 588. The body is then fastened in place through the mounting portion. In response to appropriate inputs to an input device of the machine from a servicer, the processor operates to cause the drive 602 to rotate the head portion 588. The processor may operate in accordance with its programming to rotate the head portion 588 only as necessary to align the opening 592 with the print head. Alternatively the processor may operate the drive to make one or more rotations before stopping the rotation of the head portion. In some embodiments the processor may operate the printer to test its operation as previously discussed, and may then rotate the head portion to wipe the nozzles of the print head. Of course these approaches are exemplary and in other embodiments other approaches may be used.

Thus as can be appreciated the exemplary embodiment of the ink catching mechanism provides an effective way for the printer to be operated so as to avoid the deposition of excess ink within the ATM as well as to enable the print nozzles to be maintained in a suitable operating condition so that printing may be reliably conducted.

In the exemplary embodiment documents such as checks are moved into the storage area 430 through the vertical transport 556. Such documents are held initially between the rails 562 of the guide 564 and the belt flights 560 of the vertical transport. In the exemplary embodiment such documents may be selectively stored in one of two available sections (alternatively referred to herein as locations) of the storage area. These include a first storage location 608 positioned on a first side of the vertical transport and a second storage location 610 positioned on an opposed transverse side of the vertical transport. Selective positioning of documents into the storage locations is accomplished through use of a movable plunger member 612 which operates responsive to one or more processors to disengage documents from the vertical transport and move the documents into either the first storage location or second storage location of the storage area.

Figure 112:
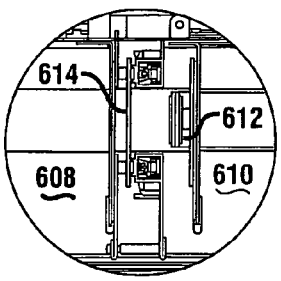
FIGS. 112 through 115 show the sequential movement of the plunger member as it operates to move a document held in the vertically extending transport into a storage location positioned on the left side of the storage mechanism as shown.

FIGS. 111 through 115 show the operation of the exemplary plunger member to move a document 614 into storage location 608. As shown in FIG. 112 when the document 614 has moved downward into the storage area, the plunger 612 has been positioned to the right of the document as shown in storage location 610. In the exemplary embodiment movement of the plunger member is accomplished through use of a suitable drive and movement mechanism such as a rack drive, worm drive, tape drive or other suitable movement device. Such a drive is represented schematically by drive 616 in FIG. 83.

Figure 113:
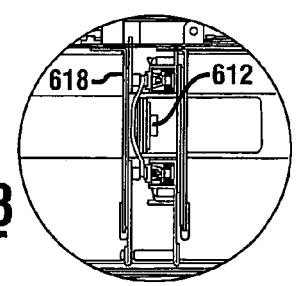
Figure 114:
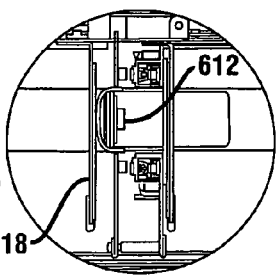

Once the document has been moved to the proper position and the vertical transport is stopped, the plunger 612 moves from the position shown in FIG. 112 to the left so as to engage the document. Such engagement with the document deforms the contour of the document as shown and begins to pull the document transversely away from engagement with the belt flights and the guide rails. A spring biased backing plate 618 which may have additional documents in supporting connection therewith, is moved by the action of the plunger as shown in FIGS. 113 and 114. Backing plate 618 is biased by a spring or other suitable device so that documents in supporting connection with the backing plate are generally trapped between the backing plate and the wall surfaces 574 of the guide.

Figure 115:
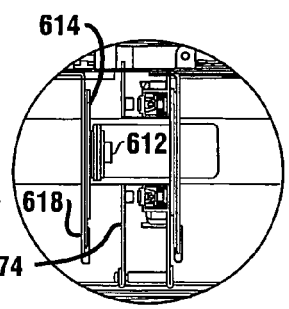
Figure 116:
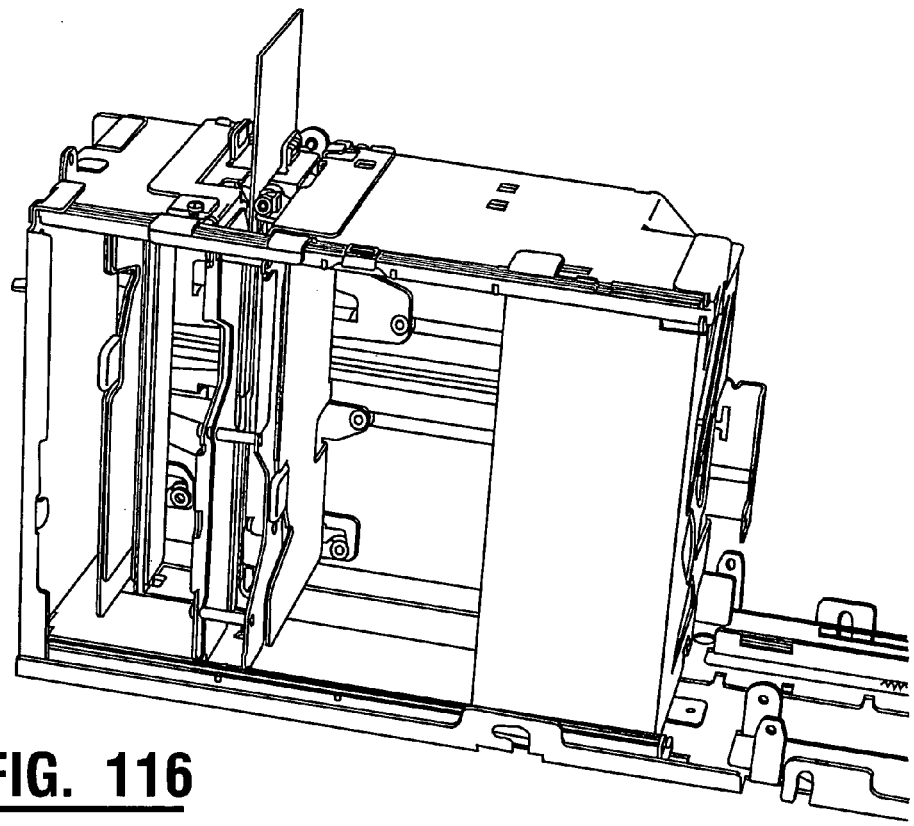
FIG. 116 is an isometric view similar to FIG. 111 showing the vertical transport of the accepting a document therein.

As represented in FIGS. 114 and 115 as the plunger 612 moved further toward the storage location 608, the document disengages from the rails and belts so that the document is eventually held in supported relation with the backing plate 618 by the plunger. Once the document 614 has reached this position as shown in FIG. 115 the plunger may be moved again to the right as shown such that the document 614 is integrated into the document stack supported on backing plate 618. Further as the plunger 612 returns toward its original position, the documents supported on the backing plate are held in sandwiched relation between the wall surfaces 574 of the guide and the backing plate. Thus the document 614 which was moved into the storage area has been selectively moved through operation of the plunger into the storage location 608.

Figure 117:
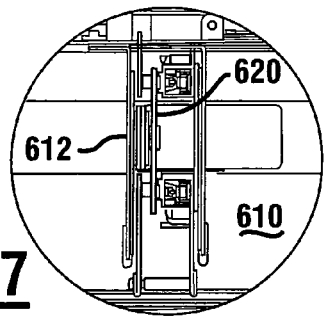
FIGS. 117 through 120 show the sequential movement of the exemplary plunger member to move a document in the vertical transport to a storage location on the right side of the vertical transport as shown.
Figure 119:
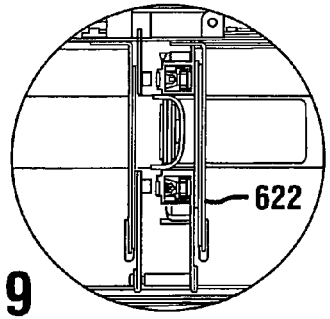
Figure 118:
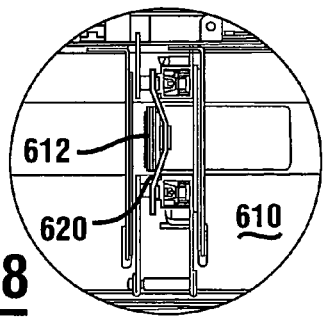
Figure 120:
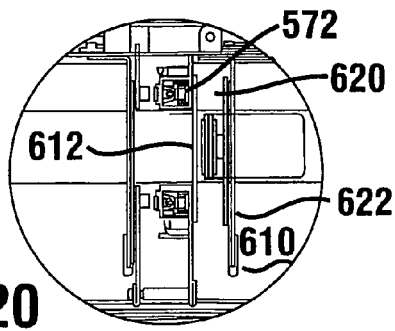

FIGS. 116 through 120 show operation of the plunger member to store a document in storage location 610. As shown in FIG. 117 a document 620 is moved into the vertical transport and because this document is to be stored in storage location 610 the plunger member 612 is positioned responsive to operation of the processor to the left of the document as shown. As shown in FIGS. 118 and 119 movement of the plunger member 612 toward the right as shown disengages the document from the transport and brings it into supporting connection with a spring loaded backing plate 622. Backing plate 622 is biased by a spring or other suitable biasing mechanism toward the left as shown in FIGS. 119 and 120.

Movement of the plunger 612 to the extent shown in FIG. 120 causes the document 620 to be supported in a stack on the backing plate 622. In this position the plunger may be again moved to the left such that the documents in the stack in storage location 610 are held in sandwiched relation between the back walls 572 of the vertical transport and the backing plate.

As can be appreciated in the exemplary embodiment documents can be selectively stored in a storage location of the device by positioning and moving the plunger so that the document is stored in the storage location as desired. This enables documents to be segregated into various document types. For example in some embodiments the ATM may be operated such that checks that are drawn on the particular institution operating the machine are stored in one storage location of the storage area 430 while others that are not drawn on that institution are stored in the other storage location. Alternatively in some embodiments where the mechanism is used to accept checks and currency bills, bills which have been validated may be stored in one storage location while bills that have been determined to be counterfeit or suspect may be stored in another storage section. In still further alternative embodiments where the device is operated to accept checks and bills, currency bills may be stored in one storage location while checks are stored in another.

In alternative embodiments additional provisions may be made. For example in some embodiments one or more aligned vertical transports may be capable of transporting documents through several vertically aligned storage areas. In such situations a document may be moved to the vertical level associated with a storage area that is appropriate for the storage of the document. Once at that level a plunger may move transversely so as to place the document into the appropriate storage location on either side of the vertical transport. In this way numerous types of documents can be accepted and segregated within the ATM.

In still other alternative embodiments the storage mechanism may be integrated with a document picker mechanism such as shown in U.S. Pat. No. 6,331,000 the disclosure of which is incorporated by reference. Thus documents which have been stored such as currency bills may thereafter be automatically removed through operation of the picker mechanism and dispensed to users of the ATM machine. Various approaches may be taken utilizing the principals of the described embodiments.

Figure 82:
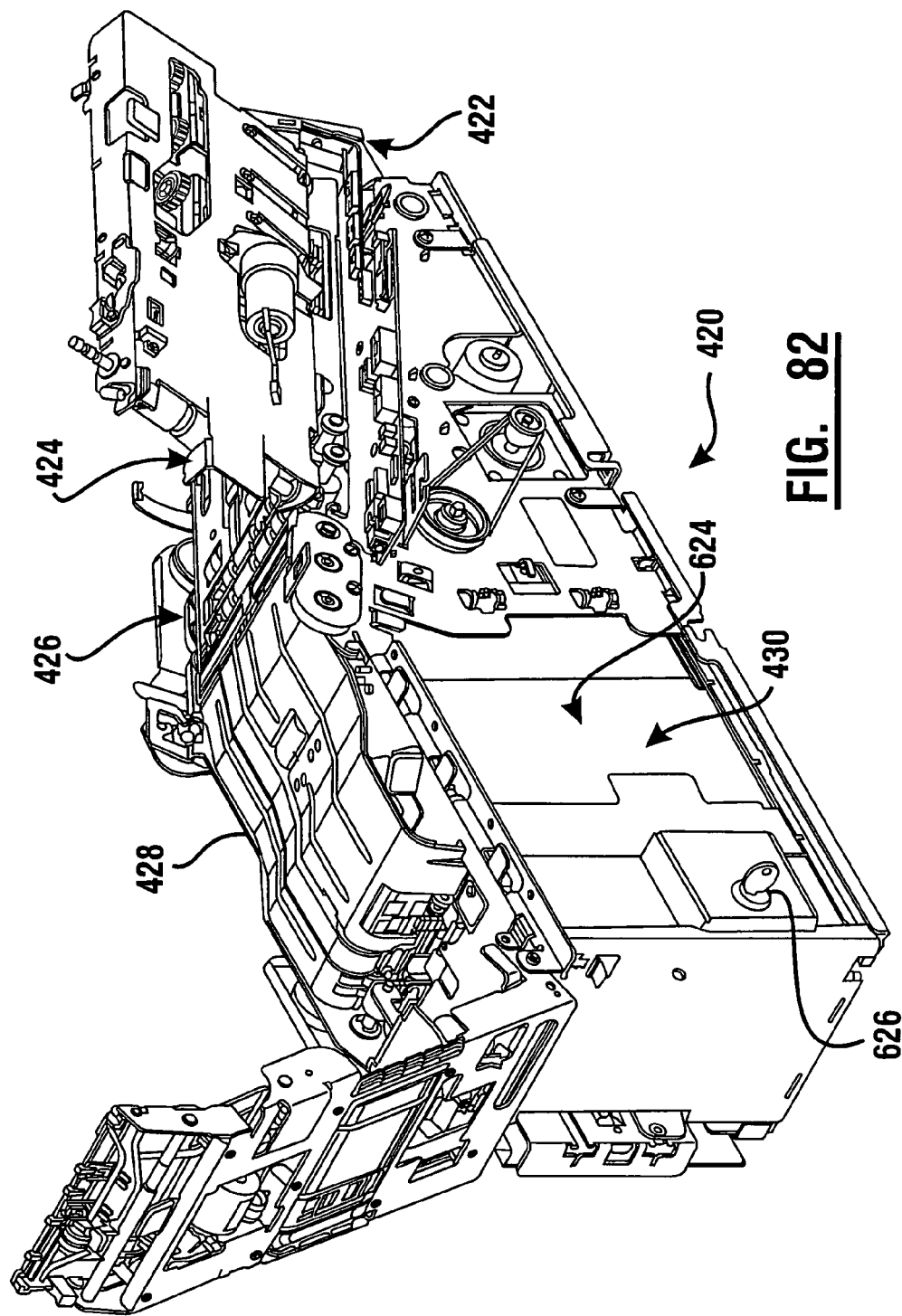
FIG. 82 is an opposite hand isometric view of the deposit accepting apparatus shown in FIG. 81.
Figure 108:
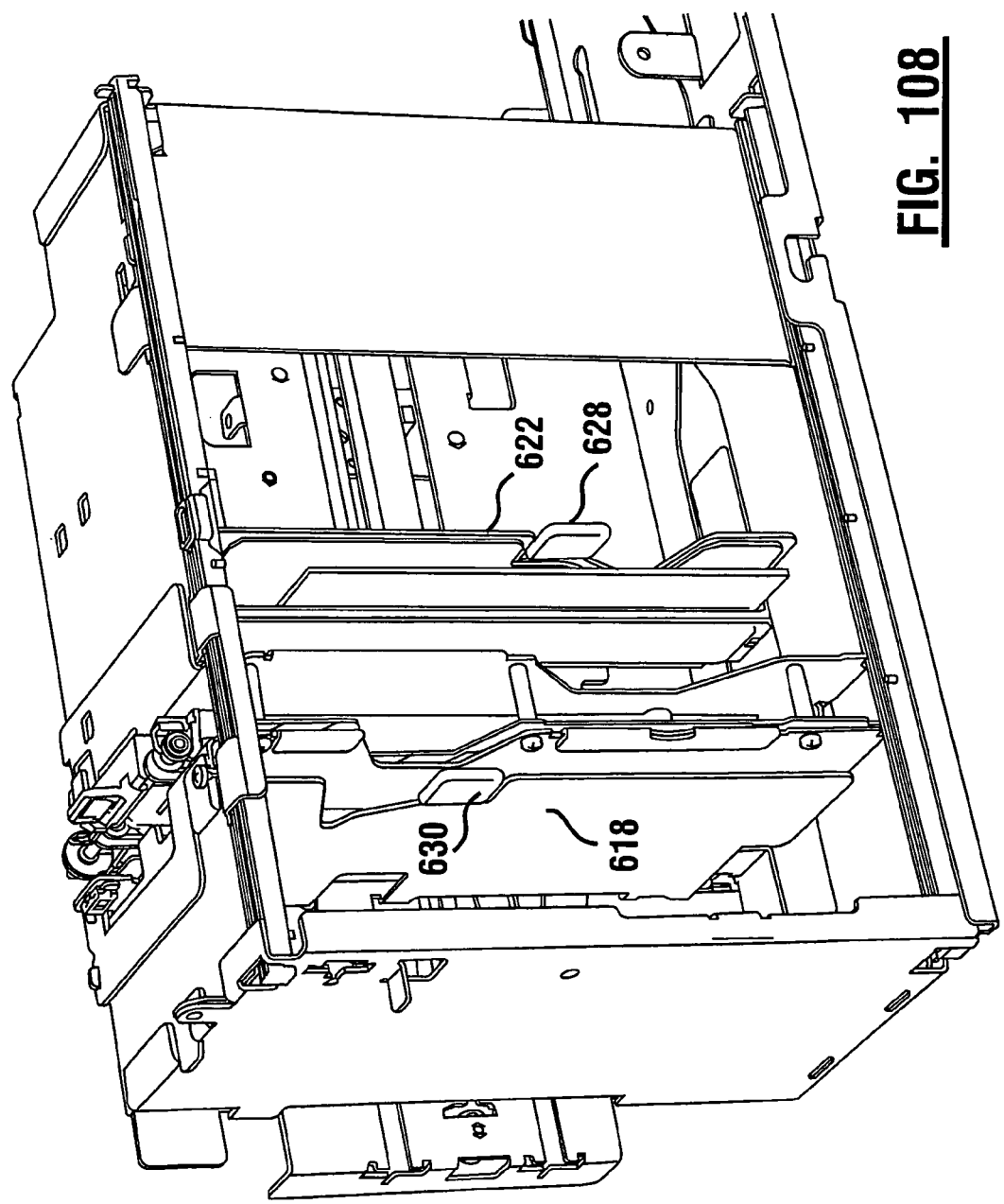
FIG. 108 is an isometric view of the storage compartment of the alternative deposit accepting mechanism shown with the storage compartment having its access door in an open position.

As shown in FIG. 82 exemplary storage area 440 is generally held in a closed position such that the items stored therein are not accessible even to a servicer who has access to the interior of the ATM. This is accomplished through use of a sliding door 624 which in the exemplary embodiment is constructed of collapsible sections. The door is enabled to be moved such that access to documents stored in the storage area can be accessed such as is shown in FIG. 108. In an exemplary embodiment the ability to open door 624 is controlled by a lock 626. In the exemplary embodiment lock 626 comprises a key lock such that authorized persons may gain access to the interior of the storage area if they possess an appropriate key.

In some exemplary embodiments the deposit accepting device may be mounted in movable supporting connection with structures in the interior of the housing of the banking machine. This may be done in the manner shown in U.S. Pat. No. 6,010,065 the disclosure of which is incorporated herein by reference. In some exemplary embodiments a servicer may access the interior of the banking machine housing by opening one or more external doors. Such doors may require the opening of one or more locks before the interior of the housing may be accessed. With such a door open the servicer may move the deposit accepting device 420 while supported by the housing so that the storage area of the device extends outside the housing. This may make it easier in some embodiments to remove documents from the storage area.

In the exemplary embodiment persons authorized to remove documents from the storage area may open the lock and move the door 624 to an open position so as to gain access to the interior of the storage area. Documents that have been positioned in the storage locations can be removed by moving the backing plates 622 and 618 against the spring biasing force of the respective springs or other biasing mechanisms 617, 619, that holds the stacks of stored documents in sandwiched relation. Manually engageable tabs 628 and 630 are provided in the exemplary embodiment so as to facilitate the servicer's ability to move the backing plates against the respective biasing force. With the respective backing plate moved horizontally away from the vertical transport, the stack of documents between the backing plate and vertical transport can be removed. Each backing plate can be moved to remove document stacks on each horizontal side of the vertical transport. Once the stored documents have been removed, the backing plates can return automatically to the appropriate position to accept more documents due to the biasing force. Likewise the door 624 can be closed and the lock returned to the locked position. If the deposit accepting device is movably mounted so that the storage area is outside the machine, it can be moved back into the interior of the housing. The housing can then be secured by closing the doors and locks thereon. This construction of the exemplary embodiment not only facilitates the removal of checks, currency or other documents, but is also helpful in clearing any jams that may occur within the vertical transport.

The exemplary embodiment also provides advantages in terms of clearing jams within the document alignment, analysis and/or escrow areas. For example as shown in FIGS. 81 and 82, the device may be opened such that the entire transport path for documents up to the point of the vertical transport may be readily accessed. As a result in the event that the document should become jammed therein, a servicer may unlatch a latch which holds a platen in position such as for example latch 632 shown in FIG. 81 and move the platen 448 rotationally and the components supported thereon to the position shown so as to enable exposing the document alignment area and document analysis area. As can be appreciated platen 448 is mounted through hinges which enable the platen to rotate about an axis through the hinges so as to facilitate the opening thereof. Likewise the portions of the platen 449 supporting the mechanisms overlying the escrow area can be opened as shown to expose that area of the document transport path so as to facilitate accessing documents therein. As shown in FIGS. 81 and 82, platen 449 is rotatable about an axis that extends generally perpendicular to the axis about which platen 448 is rotatable. Further in the exemplary embodiment, platens 448 and 449 are configured so that platen 448 must be moved to the open position before platen 449 can be opened. Likewise platen 449 must be closed before platen 448 is closed. This exemplary construction enables the use of a single latch to secure the platens in the operative positions, and to enable unsecuring the single latch so that the platens can both be moved to expose the document alignment, document analysis and escrow areas of the document transport path in the device. Of course, this approach is exemplary and in other embodiments other approaches may be used.

In servicing the exemplary embodiment of the deposit accepting device 420 which for purposes of this service discussion will be described with regard to checks, a servicer generally begins by opening a door or other access mechanism such as a fascia or panel that enables gaining access to an interior area of the housing of the ATM. In an exemplary embodiment the check accepting device 420 is supported on slides, and after unlatching a mechanism that normally holds the device in operative position, the device can be moved, while supported by the housing to extend outside the ATM. Of course in some situations and depending on the type of service to be performed, it may not be necessary to extend the device outside the ATM housing. Alternatively in some situations a servicer may extend the device outside the housing and then remove the device from supporting connection with the ATM housing completely. This may be done for example, when the entire device is to be replaced with a different device.

The servicer may disengage the latch 632 and rotate platen 448 about the axis of its hinges. This exposes the areas of the transport path through the device in the document alignment area 424 and document analysis area 426. It should be noted that when the platen 448 is moved to the open position the toothed contoured edges 456,458 shown in FIG. 84, are moved apart.

With the platen 448 moved to expose the document alignment and document analysis areas, any checks which have become caught or jammed therein can be removed by the servicer. The servicer can also conduct other activities such as cleaning the scanning sensors or the magnetic read head. Such cleaning may be done using suitable solvents, swabs or other materials. The servicer may also clean, align, repair or replace other items in the exposed areas of the transport path.

Figure 83:
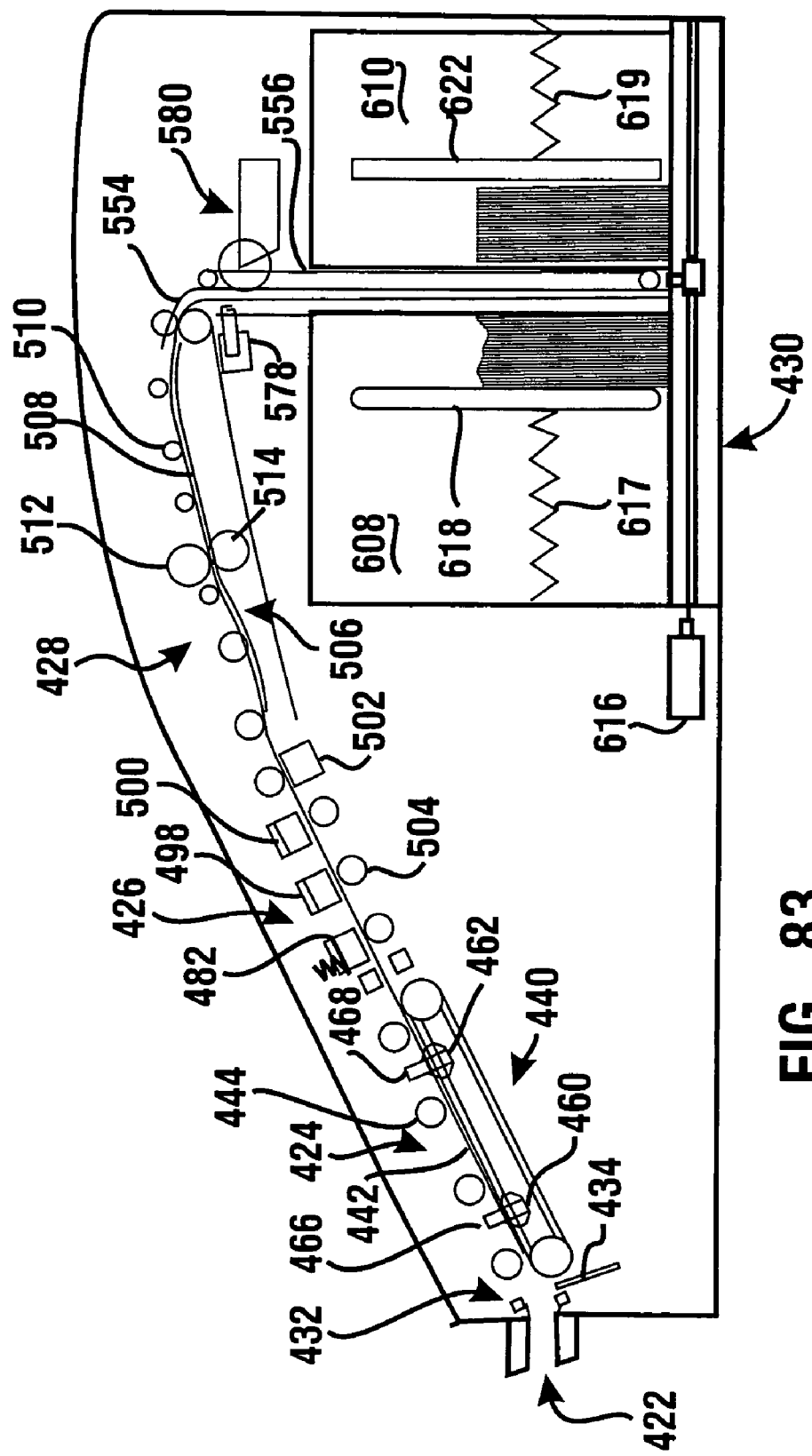
FIG. 83 is a schematic view of the devices included in the alternative deposit accepting apparatus.

With platen 448 in the open position a servicer may also move platen 449 from the closed position to the open position shown in FIGS. 82 and 83. Rotating platen 449 about the axis of its supports to the open position, exposes the escrow area 428 of the transport path. A servicer may then clear any jammed documents from the escrow area. The servicer may also clean, align, repair or replace other components that are exposed or otherwise accessible in the escrow area.

Upon completion of service the platen 449 is rotated to the closed position. Thereafter the platen 448 is rotated to the closed position. This brings the contoured edges 456, 458 back into adjacent alignment. With platen 448 in the closed position the latch 632 is secured to hold both platens in the closed positions, the check accepting device can then be moved back into the operating position and secured therein. The servicer when done, will then close the door or other device to close the interior of the ATM housing. Of course these approaches are exemplary.

Upon closing the housing the ATM may be returned to service. This may include passing a test document through the transport path through the deposit accepting device 420 and/ or reading indicia of various types from one or more test documents. In an exemplary embodiment a servicer inputs to the machine a non-negotiable test document. The test document may include visual indicia such as characters, symbols, designs or other items. The document may also include magnetic indicia which can be sensed and interpreted by the machine. These may include RFID tags, IR, UV or other features. Of course in exemplary embodiment other or different features may be included on the test document.

To test the ATM of an exemplary embodiment the servicer provides one or more inputs to the machine to indicate that a test of the deposit accepting device is to be conducted. The ATM then operates in accordance with its programming to accept the test document into the deposit accepting device and read indicia from the test document through the magnetic sensors, scanning sensors, RFID reader and/or other sensors.

The exemplary ATM then operates to analyze the signals from one or more of the sensors through operation of the at least one processor in the machine. The at least one processor of the exemplary embodiment includes character recognition software and other software that is operative to determine what characters, data, symbols, designs or other indicia correspond to the types of indicia sensed on the test document.

The at least one processor in the ATM of the exemplary embodiment operates to provide one or more outputs which indicate how the ATM interpreted the indicia on the test document. In the exemplary embodiment the ATM provides one or more outputs through the display that include interpretation information. For example, the ATM may output numerical characters which represent how the ATM interpreted visual data on the test document. The ATM may also output micr characters that indicate how the ATM interpreted micr or other magnetic indicia on the test document. The ATM may also output other data which corresponds to tag data which shows how the machine interpreted data sensed from an RFID tag on the document. Other outputs indicating how the ATM interpreted other indicia on the tagged document may be output.

The at least one processor in the ATM of the exemplary embodiment operates to provide one or more outputs which indicate how the ATM interpreted the indicia on the test document. In the exemplary embodiment the ATM provides one or more outputs through the display that include interpretation information. For example, the ATM may output numerical characters which represent how the ATM interpreted visual data on the test document. The ATM may also output micr characters that indicate how the ATM interpreted micr or other magnetic indicia on the test document. The ATM may also output other data which corresponds to tag data which shows how the machine interpreted data sensed from an RFID tag on the document. Other outputs indicating how the ATM interpreted other indicia on the tagged document may be output.

In some embodiments the ATM may display a visual image of the test document as imaged by the scanning sensors to the servicer. This apparatus may include the ATM displaying outputs adjacent to portions of the image indicating how the ATM interpreted the types of indicia on the document. This may enable a servicer to visually check and compare the interpretation made by the machine with regard to indicia on the test document. In some embodiments the interpretation information may be output for multiple indicia simultaneously. Other embodiments may enable a servicer to use a pointing device such as a mouse to select characters and other features of the output image. In response to selection of a feature the ATM may output data which indicates how it interpreted that indicia, such as by indicating visually or through sounds or other output types, how the particular indicia was interpreted. The outputs may include for example, outputting a numerical value, micr character, symbol name or other identifier. Of course this approach is exemplary of approaches that may be used.

In some embodiments the ATM may operate to provide outputs to the servicer which indicate one or more levels of assurance associated with the ATM's interpretation of indicia on the test document. The level of assurance may include an indication of how closely the sensed indicia corresponds to values, characters or other items the ATM can interpret. The level of assurance data may indicate how confident the software in the ATM is of the interpretation indicated. Such output information may be useful to the servicer in indicating how well the ATM is operating. For example, in some embodiments the test document may include deliberately ambiguous indicia in some areas to verify the ATM interprets such indicia as not capable of being interpreted with a sufficiently high level of assurance to be acceptable. Various approaches may be used depending on the nature of the types of indicia analyzed.

In some embodiments the ATM may operate in accordance with its programming to recover data from one or more data stores corresponding to the test document. Such data may be used to provide the servicer with one or more outputs from the ATM indicative of whether the ATM was able to properly interpret the test document. In other embodiments indicia is included on the test document itself and may be used by one or more processors in the ATM to indicate to the servicer any deficiencies or problems. Of course other approaches may be used.

In the event a problem is detected, the servicer in some embodiments may be able to retry the analysis using the same test document. This may be done by the ATM in response to one or more inputs from the servicer. Alternatively the servicer may retest with another test document.

In an exemplary embodiment, in response to a successful test and/or one or more inputs from the servicer, the test document is moved to the storage area. This helps to assure the transport path is open. In some embodiments the ATM may operate to print on the test document using the stamper printer and/or inkjet printer to assure operation. The servicer then opens the ATM and retrieves the test document from the storage area. If everything is satisfactory the servicer may then close the ATM and return the machine to normal operation. Of course it should be understood that these approaches are exemplary and in other embodiments other approaches may be used.

Thus the deposit accepting apparatus and system of the exemplary embodiments achieve at least some of the above stated objectives, eliminate difficulties encountered in the use of prior devices and systems, and attain the useful results described herein.

In the foregoing description certain terms have been described as exemplary embodiments for purposes of brevity, clarity and understanding. However no unnecessary limitations are to be implied therefrom because such terms are used for descriptive purposes and are intended to be broadly construed. Moreover the descriptions and illustrations herein are by way of examples and the invention is not limited to the features shown or described.

Further, in the following claims any feature described as a means for performing a function shall be construed as encompassing any means known to those skilled in the art as being capable of carrying out the recited function, and shall not be deemed limited to the particular means shown or described for performing the recited function in the foregoing description, or mere equivalents thereof.

Having described the features, discoveries and principles of the invention, the manner in which it is constructed and operated, any of the advantages and useful results attained; the new and useful structures, devices, elements, arrangements, parts, combinations, systems, equipment, operations, methods, processes and relationships are set forth in the appended claims.

We claim:

1. Apparatus comprising:
an automated machine adapted to receive currency bills from machine users, wherein the machine includes:
at least one processor,
a currency bill receiving area,
a currency bill alignment area,
wherein the currency bill alignment area includes a plurality of disposed non-contact sensors extending along a first direction,
wherein the sensors are in operative connection with the at least one processor,
wherein the currency bill alignment area includes at least two alignment transports operative to move a currency bill in a second direction generally transverse of the first direction,
wherein the at least two alignment transports are in operative connection with the at least one processor,
a currency bill analysis area,
wherein the currency bill analysis area includes at least one sensing device,
wherein the at least one sensing device is operative to sense data involving a currency bill,
wherein the at least one processor, responsive at least in part to the at least one sensing device of the currency bill analysis area is operative to distinguish between a valid currency bill and a suspected counterfeit currency bill,
an escrow holding area,
a valid currency bill storage area,
a suspect currency bill storage area,
wherein the suspect currency bill storage area differs from the valid currency bill storage area,
at least one currency bill transport device,
wherein the at least one currency bill transport device is in operative connection with the at least one processor,
wherein the at least one processor is operative to cause the at least one currency bill transport device to move a currency bill from the currency bill receiving area to the currency bill alignment area,
wherein the at least one processor is operative responsive to the sensors, to cause the at least two alignment transports to move at least part of the currency bill in the second direction to cause the currency bill to be substantially aligned in the first direction,
wherein the at least one processor is operative to cause the at least one currency bill transport device to move the currency bill aligned in the currency bill alignment area, from the currency bill alignment area to the at least one sensing device of the currency bill analysis area,
wherein the at least one processor is operative to cause the at least one currency bill transport device to move the currency bill from the currency bill analysis area to the escrow holding area prior to distinguishment by the at least one processor of the currency bill as one of a valid currency bill and a suspected counterfeit currency bill, wherein the at least one processor is operative, responsive to distinguishment of the currency bill as a valid currency bill, to cause the at least one currency bill transport device to move the valid currency bill from the escrow holding area to the valid currency bill storage area, wherein the at least one processor is operative, responsive to distinguishment of the currency bill as a suspected counterfeit currency bill, to cause the at least one currency bill transport device to move the suspected counterfeit currency bill from the escrow holding area to the suspect currency bill storage area.

2. The apparatus according to claim 1 wherein the machine includes a cash dispenser operative to dispense cash from the machine.

3. The apparatus according to claim 2 wherein the machine comprises an automated banking machine, wherein the automated banking machine includes both a card reader device and a biometric reader device in operative connection with the at least one processor, wherein the at least one processor is operative to enable cash to be dispensed from the machine to an authorized machine user responsive to correspondence between identifying data read by the card reader device and biometric identifying data read by the biometric reader device.

4. The apparatus according to claim 3 wherein the card reader device is operative to read both smart cards and RFID tokens, wherein the biometric reader device includes both a retina scan device and an iris scan device.

5. The apparatus according to claim 1 wherein the machine is adapted to accept currency bill deposits from machine users, wherein the at least one processor is operative to cause a user account to be credited an amount corresponding to a currency bill deposit accepted by the machine.

6. The apparatus according to claim I wherein the at least one processor is operative to cause the at least one currency bill transport device to move the currency bill in the first direction from each of:

the currency bill receiving area to the currency bill alignment area, the currency bill alignment area to the currency bill analysis area, and the currency bill analysis area to the escrow holding area 7. The apparatus according to claim 1 wherein the at least one sensing device includes an optical reading device.

8. The apparatus according to claim 7 wherein the optical reading device comprises a scanner device.

9. The apparatus according to claim 7 wherein the optical reading device is operative to detect a presence of fluorescent ink on a currency bill.

10. The apparatus according to claim 7 wherein the optical reading device is operative to detect a presence of a hologram on a currency bill.

11. A method comprising:

(a) receiving a currency bill into a currency bill receiving area of an automated machine adapted to receive currency bills from machine users;

(b) operating at least one currency bill transport device to move the currency bill from the currency bill receiving area to a currency bill alignment area of the machine, wherein the currency bill alignment area includes a plurality of disposed non-contact sensors extending along a first direction, wherein the currency bill alignment area includes at least two alignment transports operative to move a currency bill in a second direction generally transverse of the first direction;

(c) operating the at least two alignment transports to move at least part of the currency bill in the second direction to cause the currency bill to be substantially aligned in the first direction;

(d) subsequent to step (c), operating the at least one currency bill transport device to move the currency bill from the currency bill alignment area to a currency bill analysis area of the machine, wherein the currency bill analysis area includes at least one sensor, wherein the at least one sensor is operative to sense data involving the currency bill;

(e) operating at least one processor of the machine responsive at least in part to the at least one sensor to determine whether the currency bill is one of a valid currency bill and a suspected counterfeit currency bill;

(f) subsequent to step (d), operating the at least one currency bill transport device to move the currency bill from the currency bill analysis area to an escrow holding area;

(g) subsequent to step (f), operating the at least one currency bill transport device to move the currency bill from the escrow holding area to either;

a valid currency bill storage area, responsive to the currency bill being determined a valid currency bill in step (e), or a suspect currency bill storage area, responsive to the currency bill being determined a suspected counterfeit currency bill in step (e);

wherein step (f) occurs prior to step (e).

12. The method according to claim 11 wherein the machine includes a cash dispenser operative to dispense cash from the machine.

13. The method according to claim 12 wherein the machine comprises an automated banking machine, wherein the automated banking machine includes at least one processor and both a card reader device and a biometric reader device in operative connection with the at least one processor, wherein the at least one processor is operative to enable cash to be dispensed from the machine to an authorized machine user responsive to correspondence between identifying data read by the card reader device and biometric identifying data read by the biometric reader device, and further comprising:

(h) operating the card reader device to read identifying data;

(i) operating the biometric reader device to read biometric identifying data;

(j) operating the at least one processor to cause a determination of authorized user correspondence between the identifying data and the biometric identifying data; and (k) responsive to the correspondence determined in step (j), operating the at least one processor to enable cash to be dispensed from the machine to the authorized user.

14. Apparatus comprising:

an automated machine operative to receive currency bills from machine users, wherein the machine includes:

at least one processor, at least one currency bill transport, a currency bill receiving area, a currency bill alignment area, a currency bill analysis area, an escrow holding area, and at least one currency bill storage area,
- wherein the at least one currency bill transport is operative to move a currency bill from the currency bill receiving area to the currency bill alignment area,
- wherein the currency bill alignment area includes at least one currency bill alignment device in operative connection with the at least one processor, wherein the at least one currency bill transport is operative to move the currency bill to the currency bill analysis area, wherein the at least one processor is operative to cause a determination to be made whether the currency bill is one of a valid currency bill and a suspected counterfeit currency bill, wherein the at least one processor is operative to cause the at least one currency bill transport to move the currency bill to the escrow holding area prior to the determination, wherein the at least one currency bill storage area includes a valid currency bill storage area and a suspect currency bill storage area,
- wherein responsive at least in part to a determination that the currency bill is a valid currency bill, the at least one processor is operative to cause the at least one currency bill transport to move the currency bill to the valid currency bill storage area,
- wherein responsive at least in part to a determination that the currency bill is a suspected counterfeit currency bill, the at least one processor is operative to cause the at least one currency bill transport to move the currency bill to the suspect currency bill storage area.

15. The apparatus according to claim 14 wherein the at least one processor is operative to determine whether the currency bill is one of a valid currency bill and a suspected counterfeit currency bill.

16. The apparatus according to claim 15 wherein the at least one processor is operative to determine whether the currency bill is one of a valid currency bill and a suspected counterfeit currency bill while the currency bill is located in the escrow area.

17. The apparatus according to claim 14 wherein the at least one processor is operative to cause the determination to be made whether the currency bill is one of a valid currency bill and a suspected counterfeit currency bill while the currency bill is located in the escrow area.

18. The apparatus according to claim 17 wherein responsive at least in part to a determination that the currency bill is a valid currency bill, the at least one processor is operative to cause the at least one currency bill transport to move the currency bill from the escrow holding area to the valid currency bill storage area.

19. The apparatus according to claim 17 wherein responsive at least in part to a determination that the currency bill is a suspected counterfeit currency bill, the at least one processor is operative to cause the at least one currency bill transport to move the currency bill from the escrow holding area to the suspect currency bill storage area.

20. The apparatus according to claim 14 wherein the machine includes a housing, wherein the machine includes a deposit accepting module mounted in the housing,
- wherein the deposit accepting module comprises the currency bill receiving area, the currency bill alignment area, the currency bill analysis area, the escrow holding area, and the at least one currency bill storage area,
- where the deposit accepting module is movable as a unit.

* * * * *